United States Patent [19]

Insalaco et al.

[11] Patent Number: 5,305,448
[45] Date of Patent: Apr. 19, 1994

[54] SHARED ACCESS SERIALIZATION FEATURING SECOND PROCESS LOCK STEAL AND SUBSEQUENT WRITE ACCESS DENIAL TO FIRST PROCESS

[75] Inventors: Joseph S. Insalaco, Pleasant Valley; Michael D. Swanson, Poughkeepsie, both of N.Y.

[73] Assignee: International Business Machines Corp., Armonk, N.Y.

[21] Appl. No.: 122,620

[22] Filed: Sep. 16, 1993

Related U.S. Application Data

[63] Continuation of Ser. No. 548,516, Jul. 2, 1990, abandoned.

[51] Int. Cl.⁵ .................. G06F 13/00; G06F 13/14
[52] U.S. Cl. ........................ 395/425; 395/725; 364/245.3; 364/268.9; 364/269.2; 364/DIG. 1
[58] Field of Search .................. 395/425, 725

[56] References Cited

U.S. PATENT DOCUMENTS 4,823,261 4/1989 Bank et al. .................. 395/200
4,979,105 12/1990 Daly et al. .................. 395/575

Primary Examiner—Thomas C. Lee
Assistant Examiner—Paul R. Lintz
Attorney, Agent, or Firm—William B. Porter

[57] ABSTRACT

A Shared Data Access Serialization mechanism for sharing data among a plurality of systems while maintaining data integrity. User data is maintained on a primary and optionally an alternate data store. Each data store contains a set of lock blocks, one for each system sharing the data. The contents of the lock blocks, normally a time-of-day value, indicate system ownership status of the associated data. "Lock Rules" are disclosed for determining resource ownership, as well as a "lock stealing" mechanism for obtaining resource ownership from a temporarily stopped system. Suffix records and check records are used to insure data integrity. Error indications deduced from inconsistent suffix and/or check records are used to trigger a data recovery mechanism, and the recovery mechanism can synchronize a primary and secondary data store without the necessity of suspending access to the primary during the synchronization process.

11 Claims, 46 Drawing Sheets

SUFFIX RECORD OR CHECK RECORD

| | |
|---|---|
| SEQUENCE NUMBER-SYSTEM 1 | 602A |
| SEQUENCE NUMBER-SYSTEM 2 | 602B |
| | |
| SEQUENCE NUMBER-SYSTEM m | 602C |
| TIME OF DAY VALUE (TOD) FOR MULTI-RECORD WRITES | 603 |
| TIME OF DAY VALUE (TOD) FOR SINGLE RECORD WRITES | 604 |

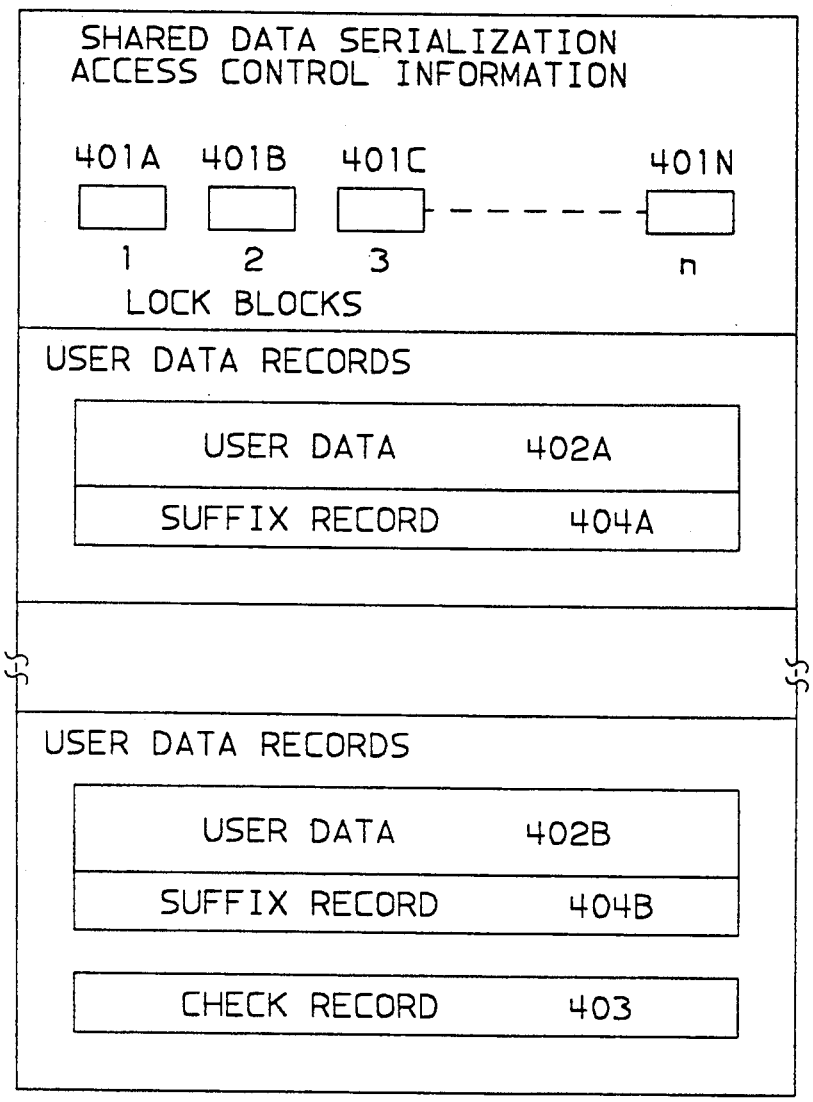
FIG. 4
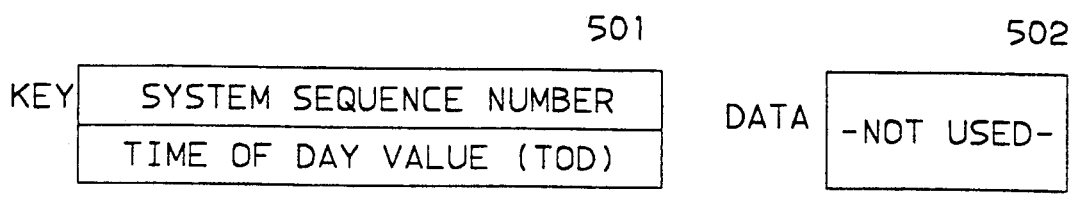
FIG. 5 ACCESS CONTROL INFORMATION-LOCK BLOCK

READ REQUEST

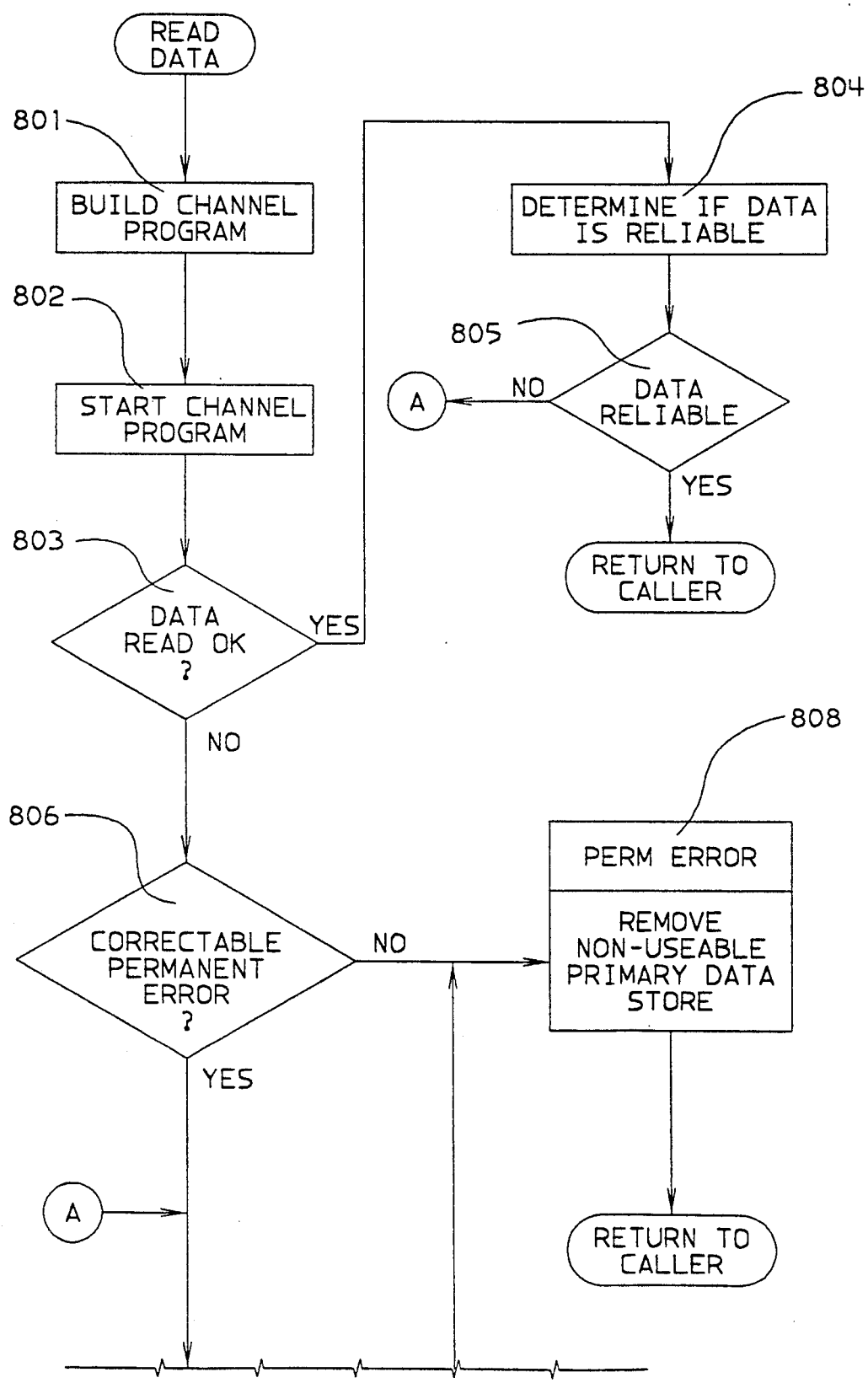

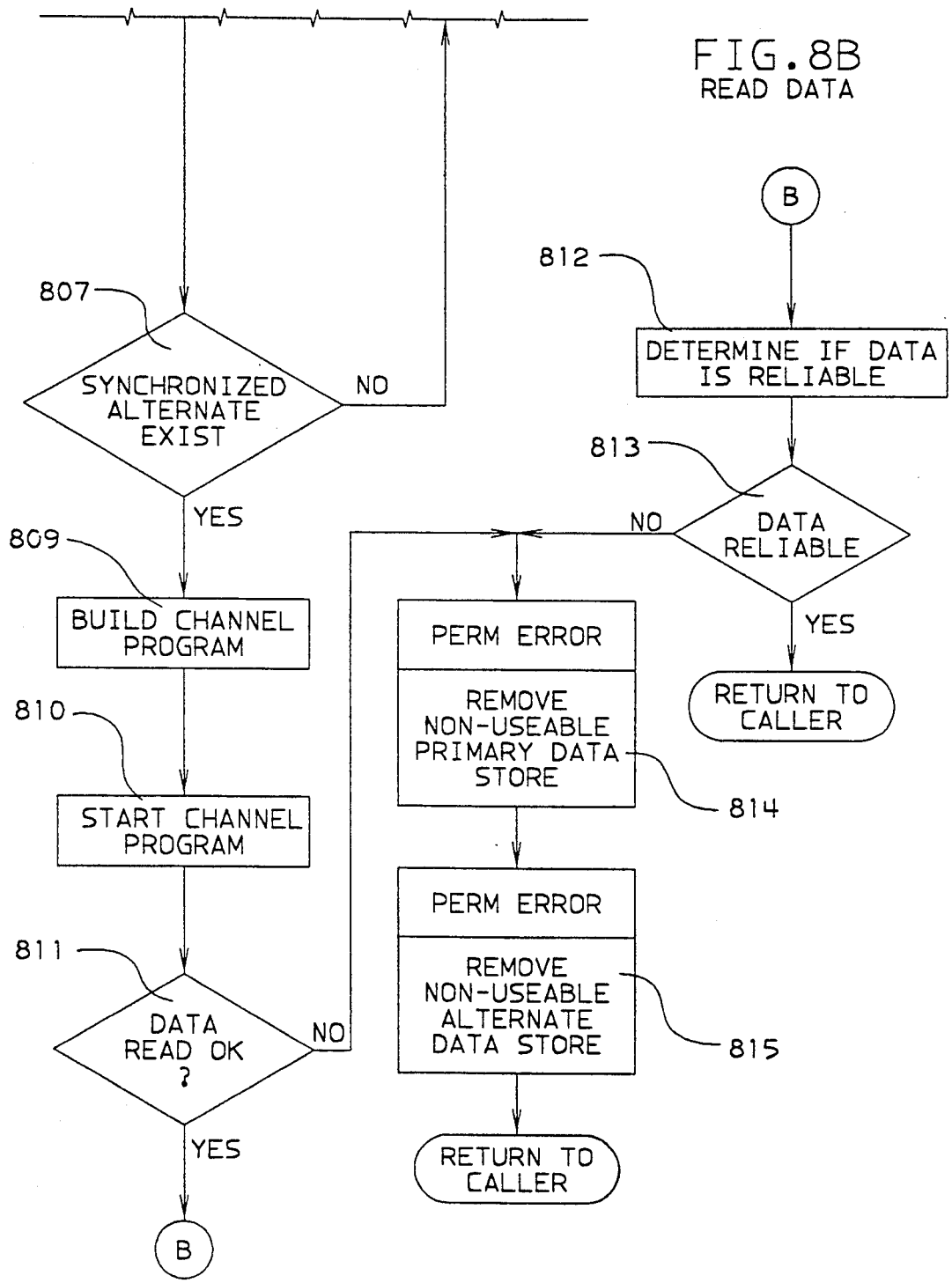

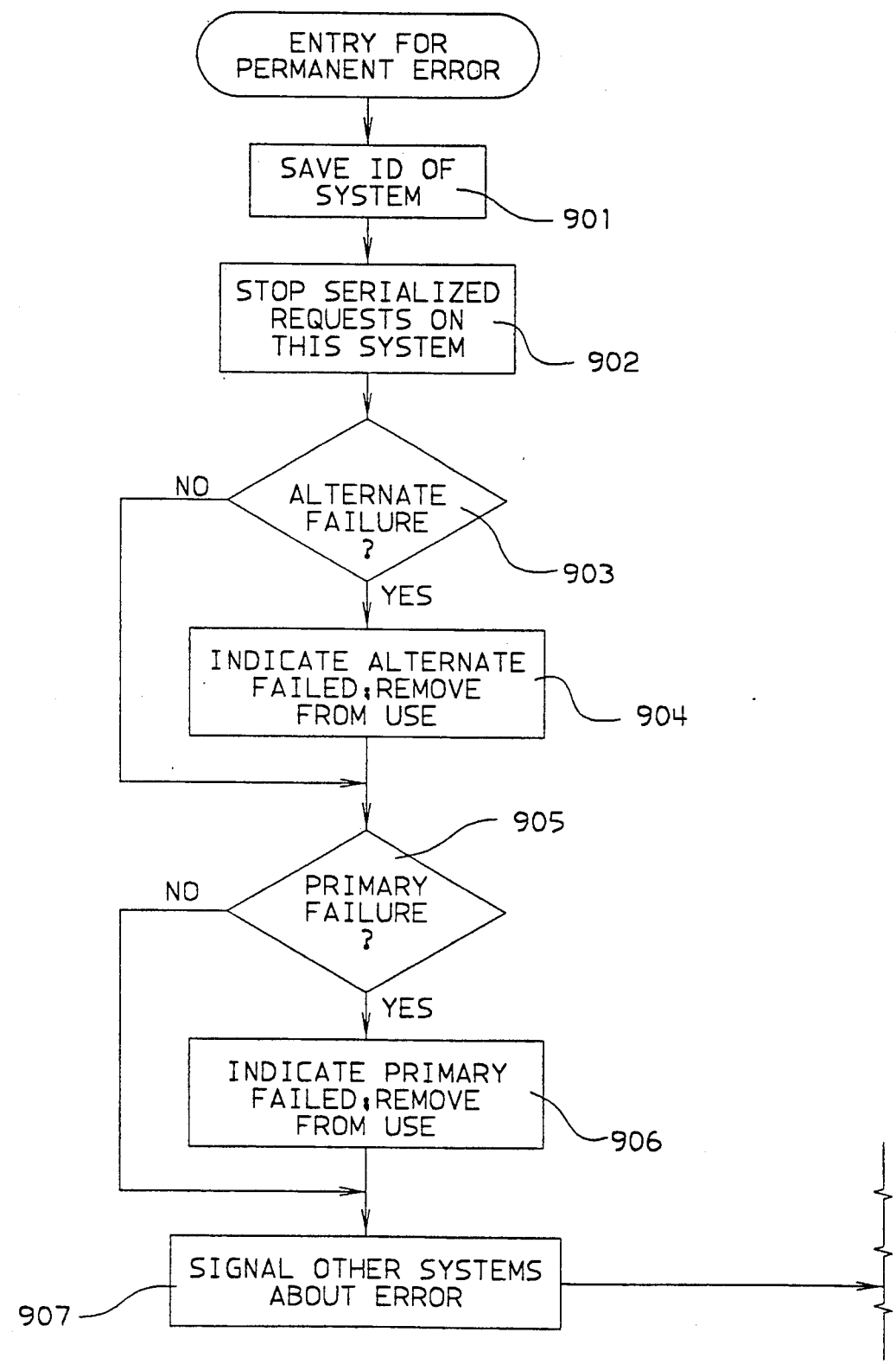

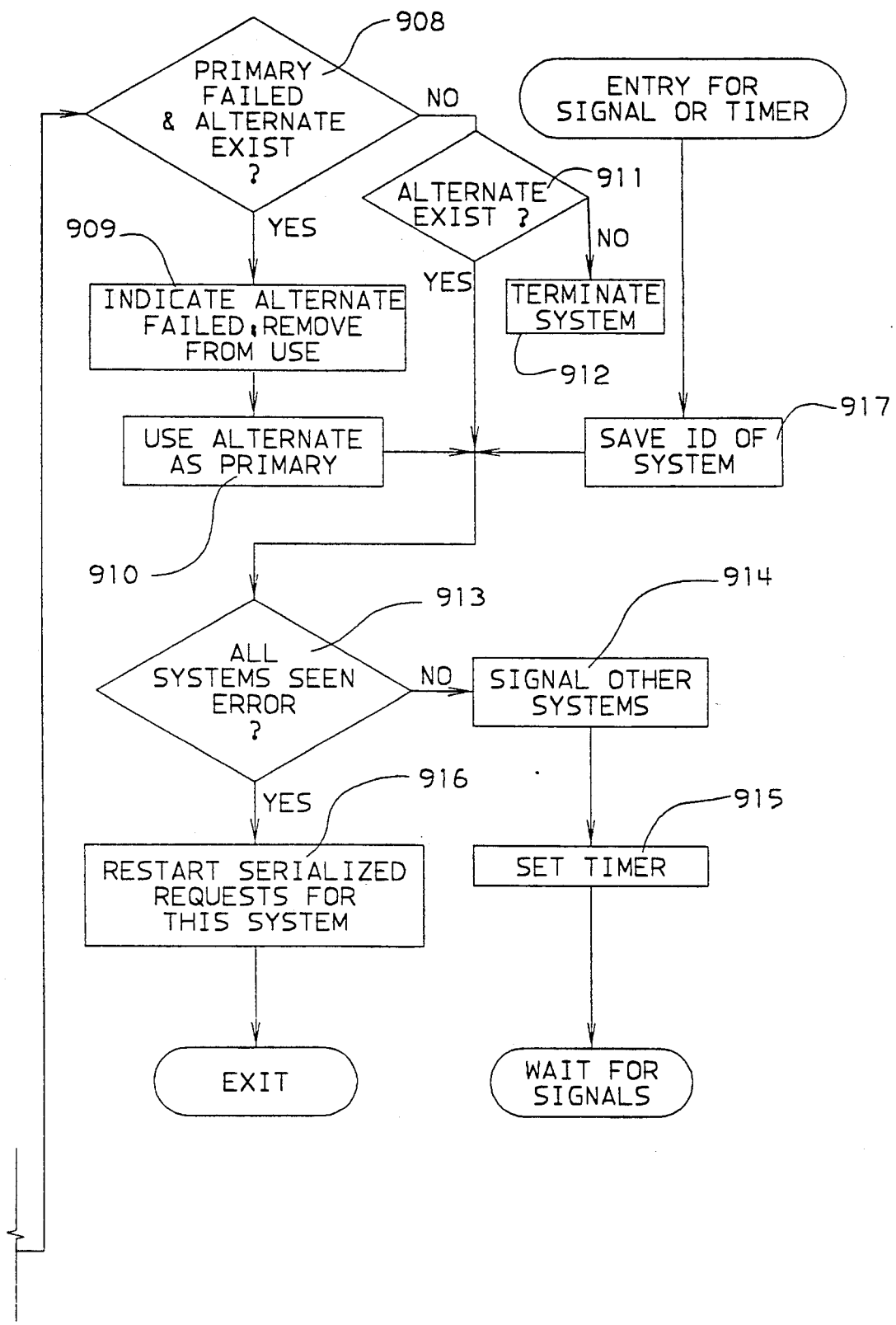

READ SERIALIZED REQUEST

READ SERIALIZED REQUEST

READ SERIALIZED REQUEST

READ LOCK BLOCKS

FIG. 12 FIX LOCK BLOCKS PROCESSING

WRITE LOCK BLOCK

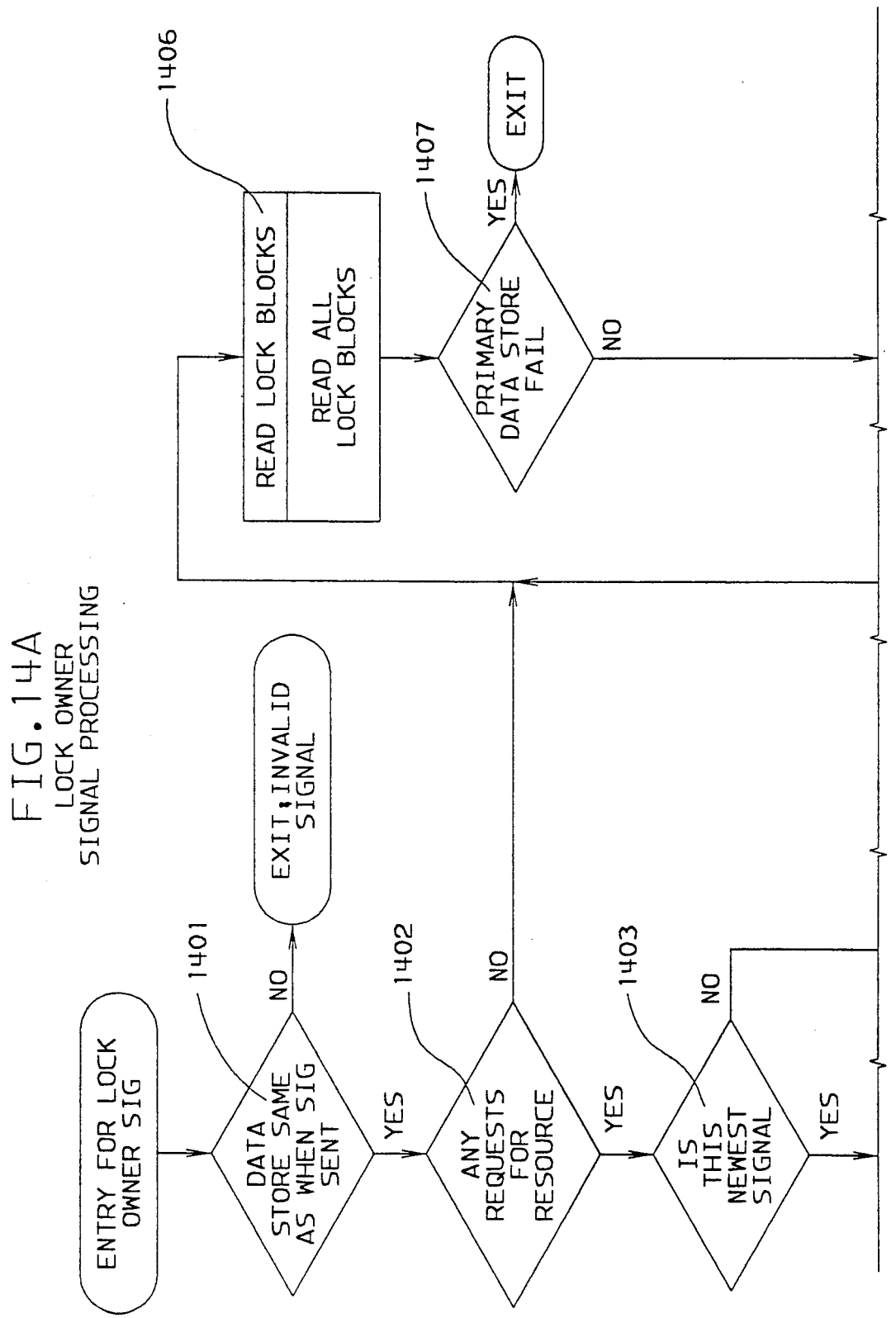

LOCK OWNER SIGNAL PROCESSING

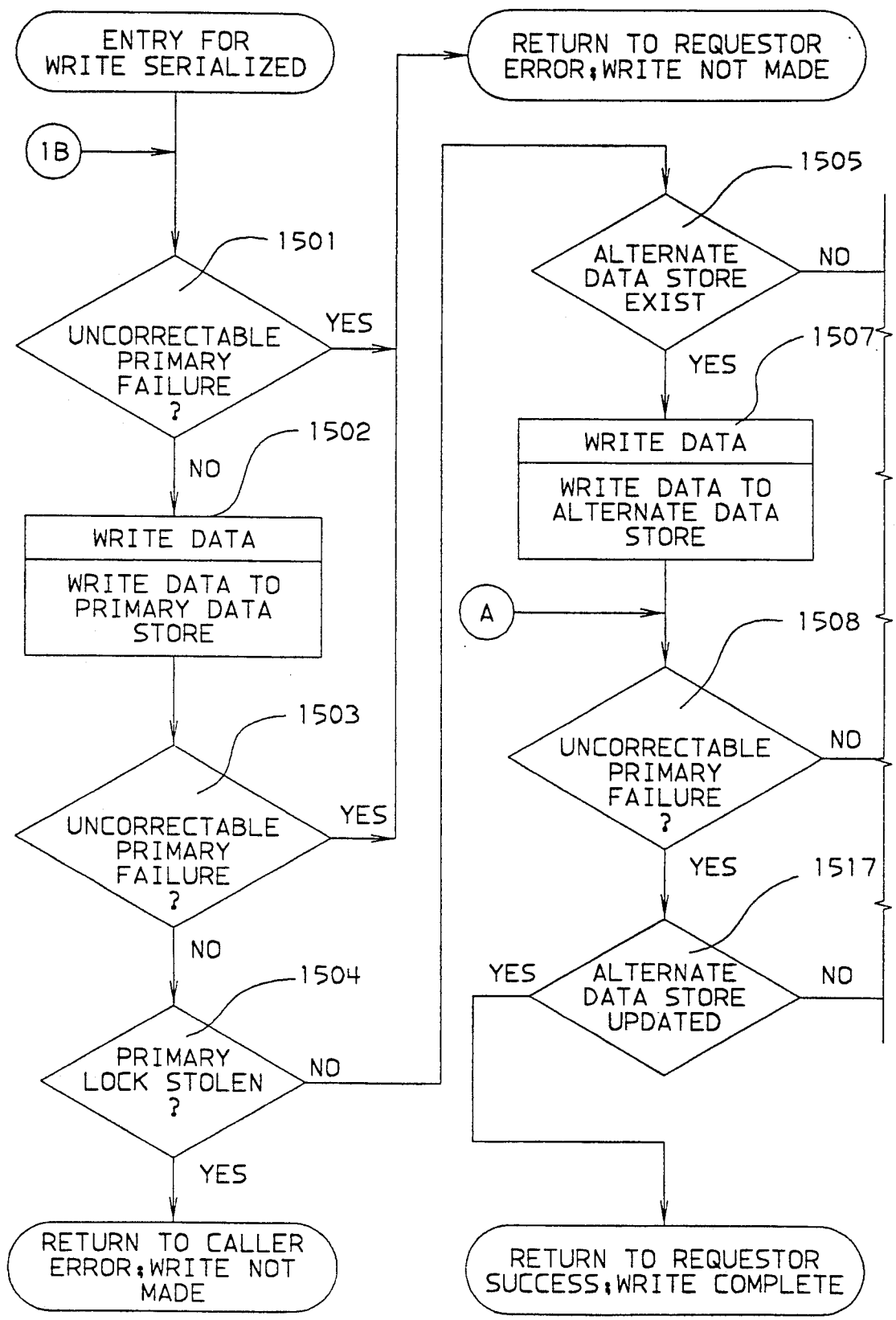
FIG. 15A WRITE SERIALIZED REQUEST

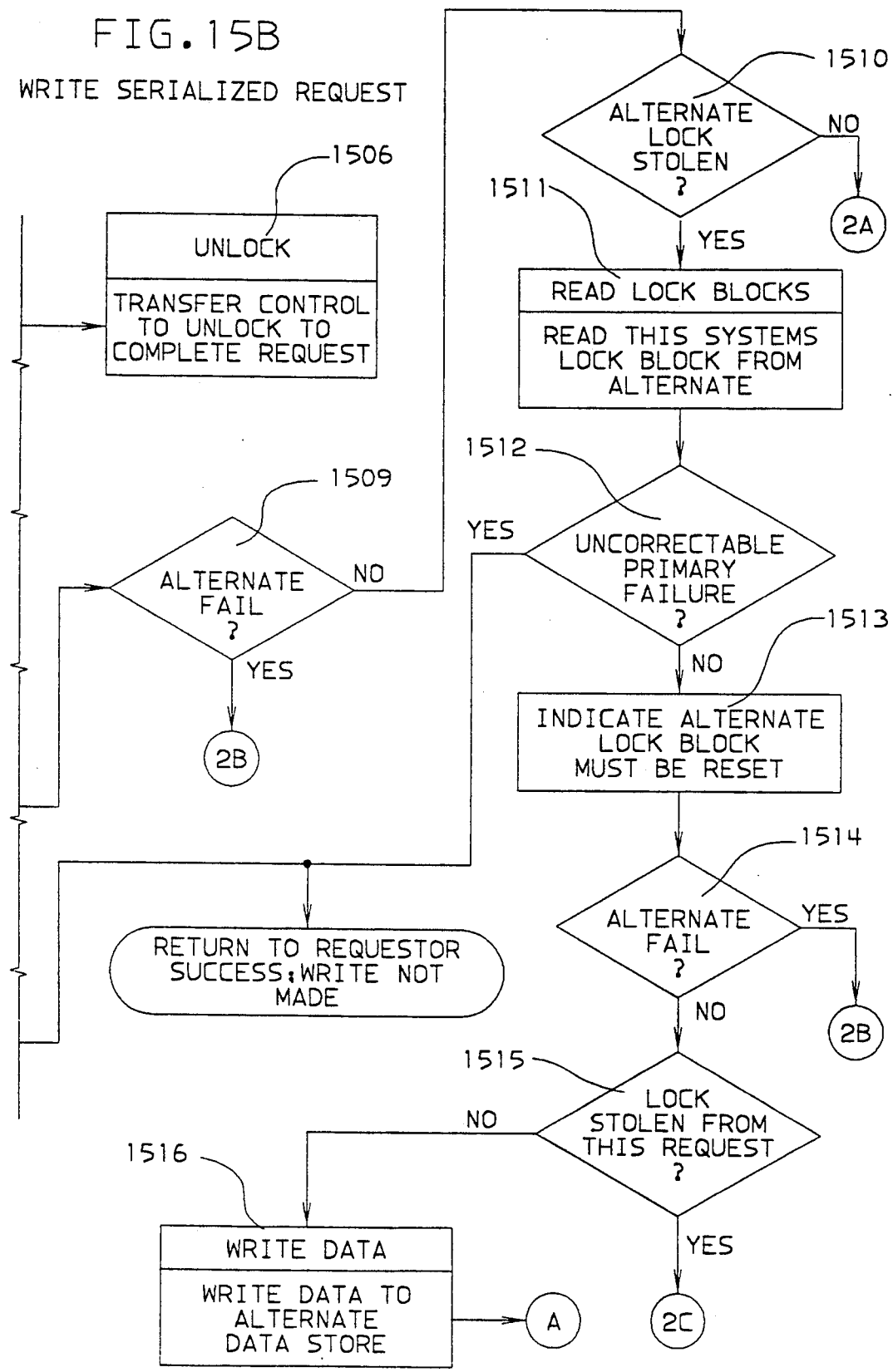

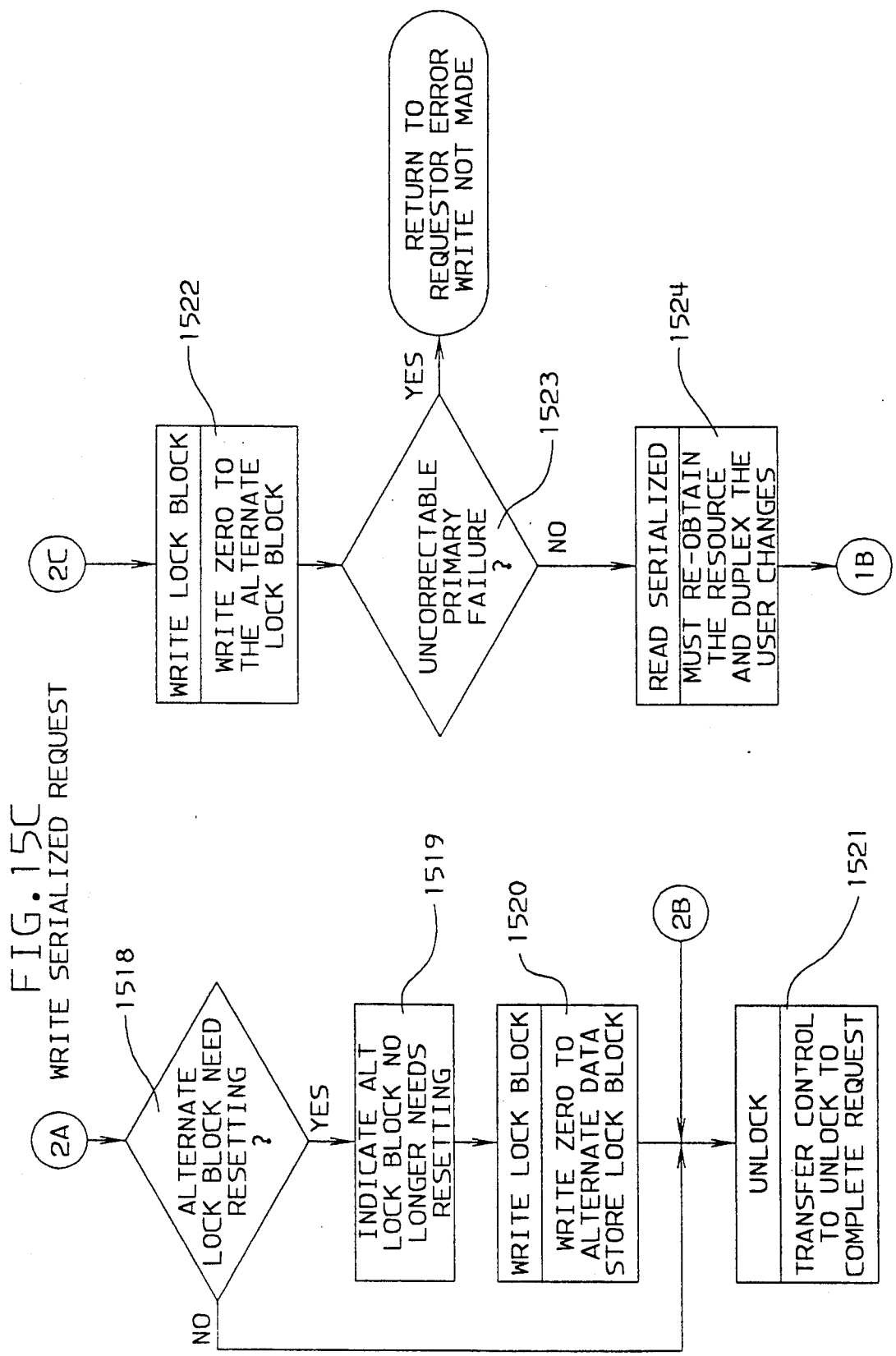

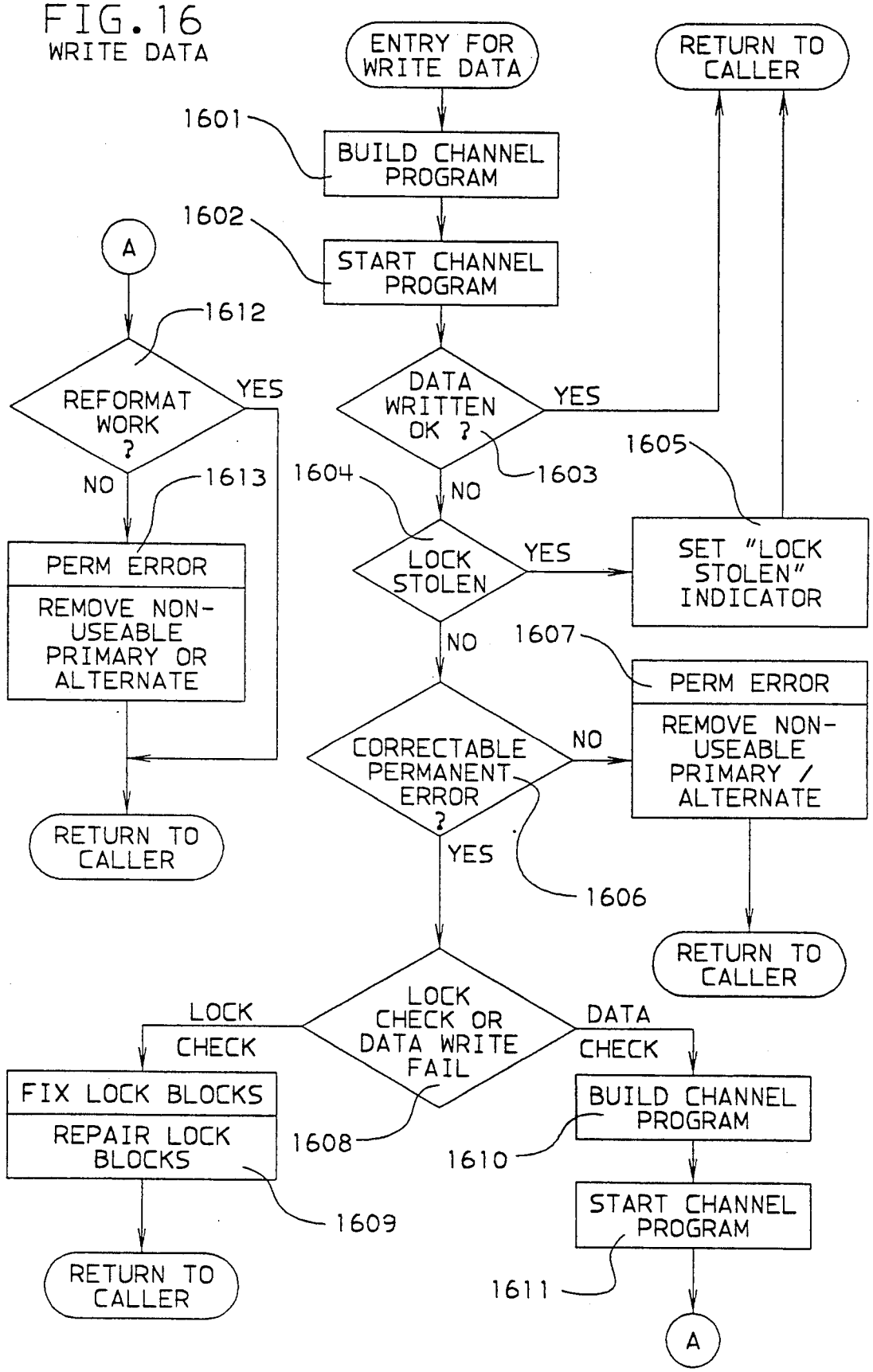

UNLOCK REQUEST

LOCK STEAL

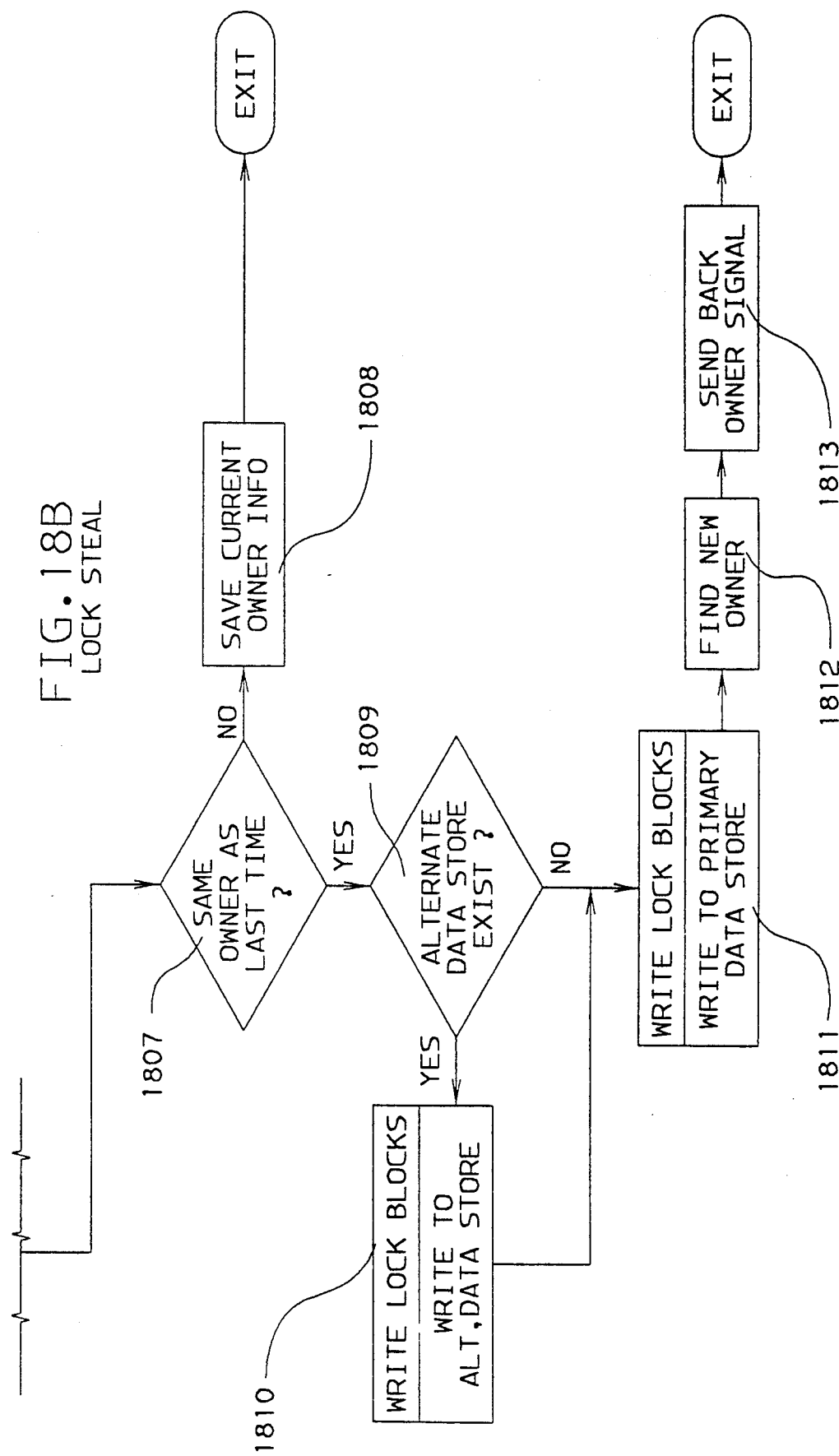

FIG. 19A

| | SYSTEM A | | SYSTEM B |
|---|---|---|---|
| 1901 | USER ISSUES REQUEST TO READ SERIALIZED RESOURCE X. | | |
| 1902 | WRITE THIS SYSTEM'S LOCK BLOCK FOR RESOURCE X. | | |
| 1903 | READ ALL LOCK BLOCKS FOR RESOURCE X. | | |
| 1904 | BY LOCK RULE 1 THIS SYSTEM OWNS RESOURCE X. | | |
| 1905 | READ DATA IN FOR RESOURCE X. | | |
| 1906 | READ TO THE READ SERIALIZED REQUESTOR INDICATING THAT RESOURCE X HAS BEEN READ. | | |
| | | 1907 | USER ISSUED REQUEST TO READ SERIALIZED RESOURCE X. |
| | | 1908 | WRITE THIS SYSTEM'S LOCK BLOCK FOR RESOURCE X. |
| | | 1909 | READ ALL LOCK BLOCKS FOR RESOURCE X. |
| | | 1910 | BY LOCK RULE 2 THIS SYSTEM MUST WAIT FOR RESOURCE X. |
| | | 1911 | WAIT FOR AN INDICATION THAT THIS SYSTEM IS NOW THE OWNER. |

FIG. 19B

| | SYSTEM A | | SYSTEM B |
|---|---|---|---|
| 1912 | USER ISSUES REQUEST TO WRITE SERIALIZED RESOURCE X. | | |
| 1913 | WRITE THE UPDATED USER DATA FOR RESOURCE X TO THE PRIMARY DATA STORE, CHECKING THAT THE RESOURCE IS STILL OWNED BY SYSTEM A. | | |
| 1914 | WRITE THE UPDATED USER DATA FOR RESOURCE X TO THE ALTERNATE DATA STORE, CHECKING THAT THE RESOURCE IS STILL OWNED BY THIS SYSTEM. | | |
| 1915 | WRITE THIS SYSTEM'S LOCK BLOCK FOR RESOURCE X TO UNLOCK RESOURCE X. | | |
| 1916 | READ ALL LOCK BLOCKS FOR RESOURCE X. | | |
| 1917 | FIND AND SIGNAL THE NEXT OWNER. | | |
| 1918 | RETURN TO THE WRITE SERIALIZED REQUESTOR INDICATING THE THE RESOURCE HAS BEEN WRITTEN. | | |
| 1919 | | | READ DATA FOR RESOURCE X. |
| 1920 | | | RETURN TO THE READ SERIALIZED REQUESTOR. |

| | | |
|---|---|---|
| SYSTEM A | SYSTEM B | SYSTEM C |
| 2101 USER ISSUES REQUEST TO READ SERIALIZED RESOURCE X. | | |
| 2102 WRITE THIS SYSTEM'S LOCK BLOCK FOR RESOURCE X. | | |
| 2103 READ ALL LOCK BLOCKS FOR RESOURCE X. | | |
| 2104 BY LOCK RULE 1 THIS SYSTEM OWNS RESOURCE X. | | |
| 2105 READ DATA IN FOR RESOURCE X. | | |
| 2106 RETURN TO THE READ SERIALIZED REQUESTOR. | | |
| | 2107 USER ISSUES REQUEST TO READ SERIALIZED RESOURCE X. | |
| | | 2108 USER ISSUES REQUEST TO SERIALIZED RESOURCE X. |
| | | 2109 WRITE THIS SYSTEM'S LOCK BLOCK FOR RESOURCE X. |
| | 2110 WRITE THIS SYSTEM'S BLOCK FOR RESOURCE X. | |
| | | 2111 READ ALL LOCK BLOCKS RESOURCE X. |

FIG. 21A

| SYSTEM A | SYSTEM B | SYSTEM C |
|---|---|---|
| | 2112  READ ALL LOCK BLOCKS FOR RESOURCE X. | |
| | 2113  WAIT FOR RESOURCE X. | |
| | | 2114  OWNERSHIP STATE IS INDETERMINATE. |
| | | 2115  UPDATE THIS SYSTEM'S LOCK BLOCK WITH A NEW TOD VALUE FOR RESOURCE X. |
| | | 2116  READ ALL LOCK BLOCKS FOR RESOURCE X. |
| | | 2117  FIND AND SIGNAL THE OWNER. |
| | | 2119  WAIT FOR OWNER SIGNAL. |
| 2118  LOCK OWNER SIGNAL RECEIVED & DISCARDED FOR RESOURCE X. | | |
| 2120  SYSTEM PLACED INTO STOP MODE. | | |
| | | 2121  SYSTEM DETECTS WAITING EXCESSIVE TIME FOR RESOURCE X. READ ALL LOCK BLOCKS FOR RESOURCE X TO DETERMINE CURRENT OWNER. |

FIG. 21B

| SYSTEM A | SYSTEM B | SYSTEM C |
|---|---|---|
| | 2122 SYSTEM DETECTS IT HAS WAITED AN EXCESSIVE AMOUNT OF TIME FOR RESOURCE X. THIS SYSTEM READS ALL LOCK BLOCKS FOR RESOURCE X TO DETERMINE WHO IS THE CURRENT OWNER. | 2123 DETERMINES THAT SYSTEM A IS IS OWNER. |
| | 2124 DETERMINES THAT SYSTEM A IS THE OWNER, AND WAITS. | 2125 SYSTEM DETECTS THAT IT HAS WAITED AN EXCESSIVE AMOUNT OF TIME FOR RESOURCE X. READS ALL LOCK BLOCKS FOR RESOURCE X TO DETERMINE WHO IS THE CURRENT OWNER. |
| | | 2126 DETERMINES THAT SYSTEM A IS THE OWNER AND WAS OWNER THE LAST TIME THIS SYSTEM CHECKED FOR EXCESSIVE WAIT. INITIATES A STEAL OF THE LOCK FOR RESOURCE X FROM SYSTEM A. |

FIG. 21C

| SYSTEM A | SYSTEM B | SYSTEM C |
|---|---|---|
| | | 2127 WRITE SEQUENCE NUMBER & TOD READ FROM RESOURCE X FROM THE PRIMARY DATA STORE FOR SYSTEM A TO THE ALTERNATE DATA STORE'S BLOCK FOR RESOURCE X FOR SYSTEM A. |
| | | 2128 WRITE A ZERO TO THE PRIMARY DATA STORE'S LOCK BLOCK FOR RESOURCE X FOR SYSTEM A. |
| | 2129 SYSTEM DETECTS THAT IT HAS WAITED AN EXCESSIVE AMOUNT OF TIME FOR RESOURCE X. READS ALL LOCK BLOCKS FOR RESOURCE X TO DETERMINE WHO IS THE CURRENT OWNER. | |
| | 2130 DETERMINES THAT SYSTEM B IS OWNER & WAS NOT OWNER LAST TIME THIS SYSTEM CHECKED FOR EXCESSIVE WAIT. RECOGNIZES IT HAS SOMEHOW BECOME OWNER & SIGNALS ITSELF THAT IT IS OWNER OF RESOURCE X. | |
| | | 2131 READ ALL LOCK BLOCKS IN FOR RESOURCE X. |

FIG. 21D

| SYSTEM A | SYSTEM B | SYSTEM C |
|---|---|---|
| | | 2132 FIND AND SIGNAL NEXT OWNER. |
| | 2133 LOCK OWNER SIGNAL IS RECEIVED FOR RESOURCE X. THIS SYSTEM IS OWNER OF RESOURCE X. | |
| 2134 SYSTEM IS RESTARTED BY THE OPERATOR. | | |
| | 2135 LOCK OWNER SIGNAL IS RECEIVED FOR RESOURCE X. THIS SIGNAL IS DISCARDED. | |
| | 2136 READ DATA IN FOR RESOURCE X. | |
| 2137 USER ISSUES REQUEST TO TO WRITE SERIALIZED RESOURCE X. | | |
| | 2138 RETURN TO READ SERIALIZED REQUESTOR. | |
| 2139 WRITE UPDATED USER DATA FOR RESOURCE X TO PRIMARY DATA STORE, CHECKING THE LOCK BLOCK FOR SYSTEM A TO ENSURE THAT RESOURCE IS STILL OWNED BY SYSTEM A. | | |
| 2140 UPDATE OF RESOURCE X WAS NOT SUCCESSFUL BECAUSE LOCK IS NO LONGER OWNED. RETURN TO WRITE SERIALIZED REQUESTOR INDICATING THE RESOURCE HAS NOT BEEN WRITTEN. | | |

| PRIMARY DATA STORE LOCK BLOCK A | PRIMARY DATA STORE LOCK BLOCK B | PRIMARY DATA STORE LOCK BLOCK C | ALT. DATA STORE LOCK BLOCK A | ALT. DATA STORE LOCK BLOCK B | ALT. DATA STORE LOCK BLOCK C |
| --- | --- | --- | --- | --- | --- |
| SEQUENCE:0 TOD:0 2201 | SEQUENCE:0 TOD:0 2202 | SEQUENCE:0 TOD:0 2203 | SEQUENCE:0 TOD:0 2204 | SEQUENCE:0 TOD:0 2205 | SEQUENCE:0 TOD:0 2206 |
| SEQUENCE:10 TOD:TOD1 2207 | SEQUENCE:0 TOD:0 2208 | SEQUENCE:0 TOD:0 2209 | SEQUENCE:0 TOD:0 2210 | SEQUENCE:0 TOD:0 2211 | SEQUENCE:0 TOD:0 2212 |
| SEQUENCE:10 TOD:TOD1 2213 | SEQUENCE:0 TOD:0 2214 | SEQUENCE:16 TOD:TOD2 2215 | SEQUENCE:0 TOD:0 2216 | SEQUENCE:0 TOD:0 2217 | SEQUENCE:0 TOD:0 2218 |
| SEQUENCE:10 TOD:TOD1 2219 | SEQUENCE:15 TOD:TOD3 2220 | SEQUENCE:16 TOD:TOD2 2221 | SEQUENCE:0 TOD:0 2222 | SEQUENCE:0 TOD:0 2223 | SEQUENCE:0 TOD:0 2224 |
| SEQUENCE:10 TOD:TOD1 2225 | SEQUENCE:15 TOD:TOD3 2226 | SEQUENCE:16 TOD:TOD4 2227 | SEQUENCE:0 TOD:0 2228 | SEQUENCE:0 TOD:0 2229 | SEQUENCE:0 TOD:0 2230 |
| SEQUENCE:10 TOD:TOD1 2231 | SEQUENCE:15 TOD:TOD3 2232 | SEQUENCE:16 TOD:TOD4 2233 | SEQUENCE:10 TOD:TOD1 2234 | SEQUENCE:0 TOD:0 2235 | SEQUENCE:0 TOD:0 2236 |
| SEQUENCE:0 TOD:0 2237 | SEQUENCE:15 TOD:TOD3 2238 | SEQUENCE:16 TOD:TOD4 2239 | SEQUENCE:10 TOD:TOD1 2240 | SEQUENCE:0 TOD:0 2241 | SEQUENCE:0 TOD:0 2242 |

FIG. 23A

| | SYSTEM A | | SYSTEM B | |
|---|---|---|---|---|
| 2301 | USER ISSUES REQUEST TO READ SERIALIZED RESOURCE X. | | | |
| 2302 | WRITE THIS SYSTEM'S LOCK BLOCK FOR RESOURCE X. | | | |
| 2303 | READ ALL LOCK BLOCKS FOR RESOURCE X. | | | |
| 2304 | BY LOCK RULE 1 THIS SYSTEM OWNS RESOURCE X. | | | |
| 2405 | READ DATA IN FOR RESOURCE X. | | | |
| 2306 | RETURN TO READ SERIALIZED REQUESTOR. | | | |
| | | 2307 | USER ISSUES REQUEST TO READ SERIALIZED RESOURCE X. | |
| | | 2308 | WRITE THIS SYSTEM'S LOCK BLOCK FOR RESOURCE X. | |
| | | 2309 | READ ALL LOCK BLOCKS FOR RESOURCE X. | |
| | | 2310 | WAIT FOR RESOURCE X. | |
| 2311 | SYSTEM IS PLACED INTO STOP MODE BY THE OPERATOR. | | | |

FIG. 23B

SYSTEM A

SYSTEM B

2312 — SYSTEM DETECTS IT HAS WAITED AN EXCESSIVE AMOUNT OF TIME FOR RESOURCE X. THIS SYSTEM READS ALL LOCK BLOCKS FOR RESOURCE X TO DETERMINE WHO THE CURRENT OWNER IS.

2313 — DETERMINES THAT SYSTEM A IS THE OWNER AND WAITS.

2314 — SYSTEM DETECTS IT HAS WAITED AN EXCESSIVE AMOUNT OF OF TIME FOR RESOURCE X. THIS SYSTEM READS ALL LOCK BLOCKS FOR RESOURCE X TO DETERMINE WHO THE CURRENT OWNER IS.

2315 — DETERMINES THAT SYSTEM A IS OWNER AND WAS THE OWNER OWNER LAST TIME THIS SYSTEM CHECK FOR EXCESSIVE WAIT. INITIATES A STEAL OF THE LOCK FOR RESOURCE X FROM SYSTEM A.

2316 — WRITE THE VALUE OF THE SEQUENCE NUMBER & TOD READ FROM SYSTEM A FROM RESOURCE X FROM THE PRIMARY DATA STORE TO THE ALTERNATE DATA STORE'S LOCK BLOCK FOR RESOURCE X FOR SYSTEM A.

FIG. 23C

SYSTEM B

2320 WRITE A ZERO TO PRIMARY DATA STORE'S LOCK BLOCK FOR RESOURCE X FOR SYSTEM A.

2321 READ ALL LOCK BLOCKS IN FOR RESOURCE X.

2325 FIND OWNER. SYSTEM B IS SIGNALLED INDICATING THAT IT IS THE OWNER OF RESOURCE X.

SYSTEM A

2317 OPERATOR RESTARTS THIS SYSTEM.

2318 USER ISSUES REQUEST TO WRITE SERIALIZED RESOURCE X.

2319 WRITE UPDATED USER DATA FOR RESOURCE X TO PRIMARY DATA STORE, CHECKING THAT RESOURCE IS STILL OWNED BY SYSTEM A.

2322 WRITE UPDATED USER DATA TO RESOURCE X TO ALTERNATE DATA STORE, CHECKING THAT RESOURCE IS STILL OWNED BY SYSTEM A.

2323 UPDATE OF RESOURCE X TO THE ALTERNATE DATA STORE WAS NOT SUCCESSFUL BECAUSE IS NO LONGER OWNED. ENSURE THAT DATA IS DUPLEXED.

2324 DETERMINE WHETHER LOCK WAS STOLEN FROM US OR FROM A PREVIOUS REQUEST ON THIS SYSTEM. READ IN ALL LOCK BLOCKS FOR RESOURCE X. THE ALTERNATE DATA STORE'S LOCK BLOCK FOR RESOURCE X FOR SYSTEM A IS CLEARED.

| | SYSTEM A | | SYSTEM B |
|---|---|---|---|
| | | | |
| | | 2326 | LOCK OWNER SIGNAL IS RECEIVED FOR RESOURCE X. THIS SYSTEM IS THE OWNER OF RESOURCE X. |
| 2327 | INVOKE READ SERIALIZED INTERNALLY. | | |
| | | 2328 | READ DATA IN FOR RESOURCE X. |
| 2329 | WRITE THIS SYSTEM'S LOCK BLOCK FOR RESOURCE X. | | |
| | | 2330 | RETURN TO READ SERIALIZED REQUESTOR INDICATING RESOURCE X HAS BEEN READ. |
| 2331 | READ ALL LOCK BLOCKS FOR RESOURCE X. | | |
| 2332 | SYSTEM MUST WAIT FOR RESOURCE X. | | |
| | | 2333 | USER ISSUES REQUEST TO WRITE SERIALIZED RESOURCE X. |
| | | 2334 | WRITE THE UPDATED USER DATA FOR RESOURCE X TO PRIMARY DATA STORE, CHECKING THAT RESOURCE IS STILL OWNED BY SYSTEM B. |
| | | 2335 | WRITE UPDATED USER DATA FOR RESOURCE X TO ALTERNATE DATA STORE, CHECKING THAT RESOURCE IS STILL OWNED BY THIS SYSTEM. |

SYSTEM B

2336 WRITE THIS SYSTEM'S LOCK BLOCK FOR RESOURCE X TO UNLOCK RESOURCE X.

2337 READ ALL LOCK BLOCKS FOR RESOURCE X.

2338 FIND AND SIGNAL THE NEXT OWNER.

2339 RETURN TO WRITE SERIALIZED REQUESTOR INDICATING THAT RESOURCE X HAS BEEN WRITTEN.

SYSTEM A

2340 LOCK OWNER SIGNAL IS RECEIVED FOR RESOURCE X. THIS SYSTEM IS NOW THE OWNER. READ DATA FOR RESOURCE X.

2341 RETURN TO INTERNAL READ SERIALIZED REQUESTOR INDICATING THAT RESOURCE HAS BEEN READ.

2342 WRITE DATA FOR RESOURCE X TO PRIMARY DATA STORE, CHECKING THAT RESOURCE IS STILL OWNED BY SYSTEM A.

2343 WRITE DATA FOR RESOURCE X TO ALTERNATE DATA STORE, CHECKING THAT RESOURCE IS STILL OWNED BY THIS SYSTEM.

FIG. 23F

SYSTEM A　　　　　SYSTEM B

2344　WRITE THIS SYSTEM'S LOCK BLOCK TO UNLOCK RESOURCE X.

2345　READ ALL LOCK BLOCKS FOR RESOURCE X.

2346　FIND THE NEXT OWNER.

2347　RETURN TO WRITE SERIALIZED REQUESTOR INDICATING THAT RESOURCE X HAS BEEN WRITTEN.

FIG. 24

| PRIMARY DATA STORE LOCK BLOCK 1 | PRIMARY DATA STORE LOCK BLOCK 2 | ALT. DATA STORE LOCK BLOCK 1 | ALT. DATA STORE LOCK BLOCK 2 |
|---|---|---|---|
| SEQUENCE:0<br>TOD:0<br>2401 | SEQUENCE:0<br>TOD:0<br>2402 | SEQUENCE:0<br>TOD:0<br>2403 | SEQUENCE:0<br>TOD:0<br>2404 |
| SEQUENCE:10<br>TOD:TOD1<br>2405 | SEQUENCE:0<br>TOD:0<br>2406 | SEQUENCE:0<br>TOD:0<br>2407 | SEQUENCE:0<br>TOD:0<br>2408 |
| SEQUENCE:10<br>TOD:TOD1<br>2409 | SEQUENCE:15<br>TOD:TOD2<br>2410 | SEQUENCE:0<br>TOD:0<br>2411 | SEQUENCE:0<br>TOD:0<br>2412 |
| SEQUENCE:10<br>TOD:TOD1<br>2413 | SEQUENCE:15<br>TOD:TOD2<br>2414 | SEQUENCE:10<br>TOD:TOD1<br>2415 | SEQUENCE:0<br>TOD:0<br>2416 |
| SEQUENCE:0<br>TOD:0<br>2417 | SEQUENCE:15<br>TOD:TOD2<br>2418 | SEQUENCE:10<br>TOD:TOD1<br>2419 | SEQUENCE:0<br>TOD:0<br>2420 |
| SEQUENCE:0<br>TOD:0<br>2421 | SEQUENCE:15<br>TOD:TOD2<br>2422 | SEQUENCE:0<br>TOD:0<br>2423 | SEQUENCE:0<br>TOD:0<br>2424 |
| SEQUENCE:10<br>TOD:TOD3<br>2425 | SEQUENCE:15<br>TOD:TOD2<br>2426 | SEQUENCE:0<br>TOD:0<br>2427 | SEQUENCE:0<br>TOD:0<br>2428 |
| SEQUENCE:10<br>TOD:TOOD3<br>2429 | SEQUENCE:0<br>TOD:0<br>2430 | SEQUENCE:0<br>TOD:0<br>2431 | SEQUENCE:0<br>TOD:0<br>2432 |
| SEQUENCE:0<br>TOD:0<br>2433 | SEQUENCE:0<br>TOD:0<br>2434 | SEQUENCE:0<br>TOD:0<br>2435 | SEQUENCE:0<br>TOD:0<br>2436 |

CONTROL BLOCK STRUCTURE

SHARED ACCESS SERIALIZATION FEATURING SECOND PROCESS LOCK STEAL AND SUBSEQUENT WRITE ACCESS DENIAL TO FIRST PROCESS

This is a continuation of copending application(s) Ser. No. 07/548,516 filed on Jul. 2, 1990.

BACKGROUND OF THE INVENTION

1. Field of the Invention

This invention relates to operating systems for computers and computer complexes. More particularly, this invention describes a mechanism and process for sharing data among different users of the computer or computer complex.

2. Background Art

Data sharing in a multiprocessor complex, or sysplex, is accomplished in a variety of ways depending on the location of the data to be shared, (e.g. main storage, or DASD) the nature of the access permitted (e.g., read-only; read-write; etc.) and the granularity of sharing (e.g., device level sharing, data set level sharing, or record level sharing). Common to virtually all sharing mechanisms is a locking mechanism, to insure that data being modified by one user is not referenced by another user until the modification is complete. An example of a locking mechanism used in the IBM MVS system is the RESERVE mechanism for serializing access to DASD data sets. As described in MVS/ESA SPL: Application Development Macro Reference (GC28-1857-1), RESERVE permits the reservation of a device for use by a particular task on a particular system. Using this mechanism, all data sets on a RESERVEd device will be unavailable to other tasks on other systems until the owning task releases the device. While insuring data integrity, the granularity of this mechanism is clearly not fine. Another mechanism, ENQ/DEQ (described in the same publication), allows a user to define and similarly control a serially reusable resource (i.e., a resource that can be shared among users, though only one can access it at a time). Still another scheme is described in IBM Technical Disclosure Bulletin, Vol. 22, No. 6, Nov. 1979, at pp. 2571-2573: this mechanism provides for record-level sharing of a data-set across different systems by means of the storing of a user-unique key, along with a time-of-day indicator, in an access record—to serve as a lock indicator to subsequent accessors.

Common to these and most similar schemes is a deficiency in that a resource locked by a user can become lost to other users if the system of the locking user becomes disabled for an extended period of time. Further, they provide no facilities or assistance in the event of damage to the data, nor do they deal with the situation where a backup data set is to be maintained for availability purposes.

SUMMARY OF THE INVENTION

In accordance with this invention, shared user data is stored on a primary data store. The primary data store contains control information in the form of lock blocks (one associated with each data-sharing system), suffix records, and check records. The suffix and check records are used to insure the integrity of the user data, and the lock blocks are used to allow a single sharing system to "lock" the data when necessary.

The invention further provides for an alternate data store, also containing control information, and initially identical to (duplexed with) the primary data store. When present, the alternate data store provides a greater level of data availability by allowing re-creation of damaged data. The alternate data store also is used in "lock stealing", wherein a second sharing system, requiring a resource locked by a first system, can "steal" the lock formerly held by the first system, indicate that the lock is "stolen" by manipulation of the control information in the primary and alternate data store, and so permit the first system to later resume processing in a nondisruptive manner.

It is an object of this invention to permit the efficient sharing of data among different users of a system or complex of systems, or sysplex.

Another object of this invention is to make shared data, locked by a stopped system, available to other systems in a sysplex.

Another object of this invention is to allow a temporarily stopped system to resume operation in a nondisruptive fashion, though other systems have accessed data that system had locked prior to its stoppage.

Another object of this invention is to recover damaged data without the necessity of switching to an alternate, or backup, data store.

A further object of this invention is to synchronize a new alternate data store without the necessity of temporarily suspending access to the primary data store during the synchronization process.

BRIEF DESCRIPTION OF THE DRAWINGS

FIG. 4 is a block diagram showing the control structures relating to each user data item.

FIG. 5 is a block diagram showing the structure used to control access to a resource.

FIGS. 8A and 8B are flow diagrams illustrating control flow for READ DATA processing.

FIGS. 9A and 9B are flow diagrams illustrating control flow for permanent error processing.

FIGS. 14A and 14B are flow diagrams illustrating control flow for lock owner signal processing.

FIGS. 15A, 15B and 15C are flow diagrams illustrating control flow for WRITE SERIALIZED request processing.

FIG. 16 is a flow diagram illustrating control flow for write data processing.

FIGS. 18A and 18B are flow diagrams illustrating control flow for lock steal processing.

FIGS. 19A and 19B are tables showing control flow for a read serialized example from multiple systems for the same resource.

FIGS. 21A, 21B, 21C, 21D and 21E are tables showing control flow for a first lock steal processing example.

FIG. 22 is a table showing the lock block state changes for the example of FIG. 21.

FIGS. 23A, 23B, 23C, 23D, 23E and 23F are tables showing control flow for a second lock steal processing example.

FIG. 24 is a table showing the lock block state changes for the example of FIG. 23.

DESCRIPTION OF THE PREFERRED EMBODIMENT

Figure 1:
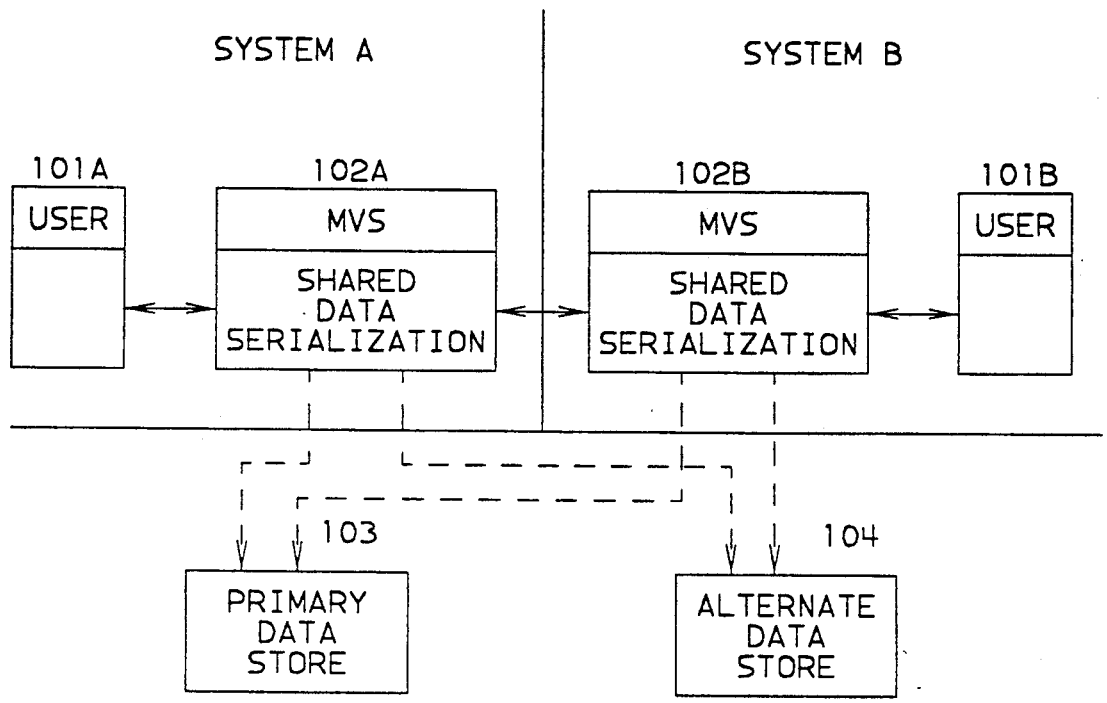
FIG. 1 is a block diagram indicating the relationship between the Shared Data Access Serialization user program, the user data on DASD, and the instances of the Shared Data Access Serialization on each system. Although only two systems are depicted, more than two systems can participate in this relationship.
Figure 2:
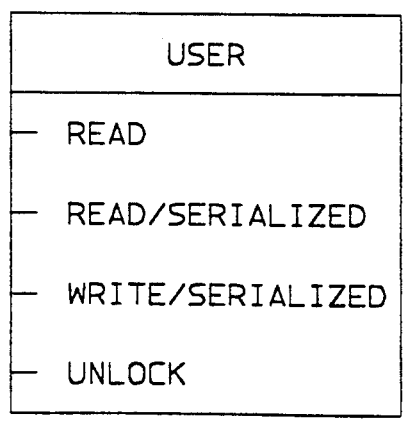
FIG. 2 is a block diagram depicting the services available to the Shared Data Access Serialization user.

FIG. 1 shows a high level view of Shared Data Access Serialization. Shared Data Access Serialization provides for serialization of updates to the user data maintained on shared DASD. This serialization is performed at a low level of granularity, a single user record or resource, while insuring fairness of access, and tolerating failures.

Figures 3, 6:
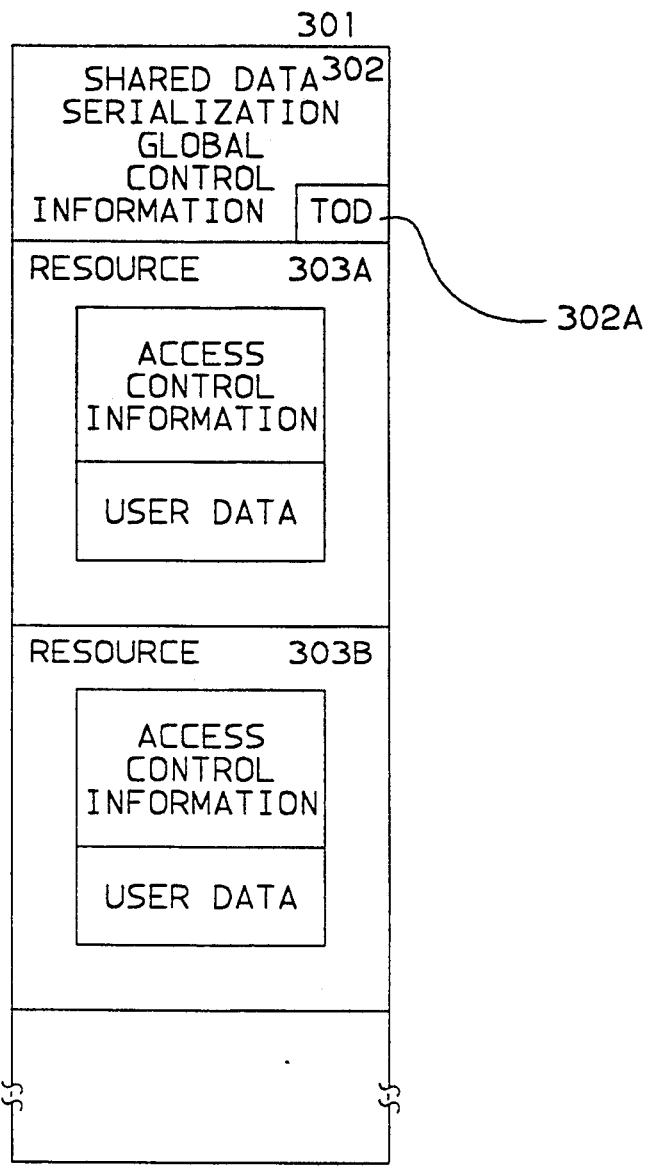
FIG. 3 is a block diagram depicting the content of the shared data store used by Shared Data Access Serialization in managing user data.
FIG. 6 is a block diagram showing the structure used to ensure data integrity of the resource. Both Suffix and check records have the same structure.

The data store used to maintain the user resources is typically contained on a DASD device. Shared Data Access Serialization maintains global control information in the data store (FIG. 3, item 302). A primary data store (FIG. 1 at 103) contains user data, which may optionally be duplexed in an alternate data store (FIG. 1 at 104). Each data store contains its own control information. Therefore, both the primary and the alternate data store will contain control information used to access the data in that particular data store (see the discussion on data duplexing for more information on primary and alternate data stores). This information includes a map of logical resource names to physical location and data attributes, and is used to map the name of the data given on a user request to the physical data behind the resource of interest. This conventional mapping is not relevant to the actual serialization protocols and will not be discussed further.

Each resource contained in a data store has several types of resource level control information associated with it. This control information is used to control access to the resource, and is used to control recovery and reliability of the user data. (See FIG. 3 at 303.)

The access control information comprises a set of lock blocks. There is one lock block for each system that may be involved in sharing the resource. FIG. 4 shows the relationship of the lock blocks, 401, to the resource's user data, 402. This figure also shows that there is one lock block for each system which may share the resource. In this example there are "n" systems which may share the resource. Each system is assigned ownership of a lock block and only one system can own any given lock block. Ownership of a lock block is assigned at system initialization time using information contained in the global control information of the data store. A system assigned lock block three owns lock block three. Ownership of a lock block position and ownership of a specific resource are not the same. Ownership of a lock block position does not imply ownership of a resource.

A lock block is a count/key/data record. The key portion of the record is the critical part in the serialization process; the data part of the record is not important and not needed in the serialization process. As shown in FIG. 5, the key, 501, comprises a system sequence number, uniquely assigned at system initialization using information contained in the global control information, and a time-of-day (TOD) value, used to order requests to access the resource. The normal state of a lock block is unlocked or all zeros. The locked state, which shows intent to update the resource, is reflected by a nonzero key field in at least one lock block.

In addition to access control information, the resource contains control information which is used to ensure data integrity. Suffix records are used to ensure that the user data contained in the associated physical data record is complete and consistent. As shown in FIG. 4 at 404A and 404B, the suffix record is physically part of the user data record, although not visible to the user of the data. The single record write time-of-day (TOD) value maintained in the suffix record, FIG. 6 at 604, is used to determine the completeness or consistency of a single physical record. The check record, shown in FIG. 4 at 403, in addition to the suffix record, is used to ensure data integrity for a multi-record write operation. The suffix record alone is not sufficient to ensure data integrity when more than one physical block is written for a request. All physical records actually written may have been written successfully, but the resource as a whole will be inconsistent if all the intended physical records comprising the multi-record write operation have not been written. The multi-record write time-of-day (TOD) value maintained in the check record and each suffix record are used to ensure that all the physical blocks comprising a resource are logically consistent.

Sequence numbers are maintained in both the suffix and the check records. There is one sequence number field for each system that shares the data store. The sequence number is used by a system to determine if the data that it has written to the primary data store has been propagated to alternate data store during certain error conditions. During recovery from these error conditions, the use of these sequence numbers allows Shared Data Access Serialization to report to its user that either a user change has been successfully written to the data store or that the change was not made and the user must restart the update sequence of read serialized/change data/write serialized.

The data store used to maintain Shared Data Access Serialization data must have certain properties. Once the data store device (a DASD device) starts a request from one system it must either complete the request from that system or terminate the request with an error prior to initiating a request from another system. That is, requests must not be interlaced by the data store device. The operation of the request may be halted at any point but the interruption must be reported as an exception to the Shared Data Access Serialization. Data written to the data store must be processed in the order presented to the data store. That is, the data presented to the data store may not be transferred from the processor to the record on the data store in random or interleaved order. This is because the suffix record, physically the last part of the data store record, is used for consistency checking. In order for the consistency checking to work correctly, the suffix record must be written after all user data has been written. If the data transfer to a data store must be terminated prior to completion of the entire data transfer, the data that was not transferred must be set to zeros on the data store. It is this inconsistent data in the check record (a single record write time of day cannot be zero, FIG. 6 at 604) that allows for data consistency checking. The data store device must allow for conditional requests. That is, the request must be able to test the value of a lock (the value of a record's key) and conditionally execute further request operations (such as writing data to some other record).

Data duplexing allows Shared Data Access Serialization to provide for error correction and recovery. Data duplexing is an option of Shared Data Access Serialization and is not required to provide for serialized access to data. If one elects to not use data duplexing, many of the error recovery features of Shared Data Access Serialization are lost resulting in an exposure to system availability.

Shared Data Access Serialization uses two data stores to achieve duplexing, a primary (FIG. 1 at 103) and an alternate (104). The primary and alternate data stores are synchronized during initialization of the first system to use the data stores. Synchronization ensures that all the data on the primary data store is copied to the alternate data store. The alternate data store is then capable of being used as the primary data store should an uncorrectable error occur on the primary. During normal processing, data written to the primary data store is also written to the alternate data store. This maintains the alternate data store as a reliable replacement and backup for the primary.

An alternate data store may be made available to Shared Data Access Serialization either when Shared Data Access Serialization is first initialized or at any time thereafter. Making an alternate data store available is not disruptive to the normal processing of user requests to serialize a resource. That is, user requests are processed without excessive delay while Shared Data Access Serialization is synchronizing the alternate data store with the primary data store.

The alternate data store is used to provide for both error correction and recovery of any error encountered on the primary. This recovery is accomplished at either a local or a global level.

Global error recovery is necessary when an uncorrectable error occurs on the primary data store. This includes errors that prevent the entire data store from being accessed, such as loss of all paths to the data store, or when local recovery of a record or set of records fails, which can occur as the result of a defective storage media (bad data record). Global recovery requires all the systems sharing the damaged primary data store to stop using it. These systems will then discontinue use of the primary to satisfy data requests and begin use of the full functional alternate data store. Provisions are also made for activating another data store as an alternate and synchronizing this new alternate with the primary.

Local error recovery is attempted when it appears that an error is isolated to a specific record or set of records on the primary data store. For example, a record has been successfully read (that is, data transfer from the data store to the processor was successful) but the suffix record indicates that the user data is not logically consistent. This could occur if another system sharing the data store failed during data transfer to the data store and did not transfer a complete consistent record. The suffix record in this case would not contain the expected values, thus indicating that the data is possibly invalid. Another case of local failure is when a multi-record write is started but not completed by a system (a multi-record write is required when user data spans more than one physical record). In this case, each physical record that comprises the logical record is complete. The suffix record for any of these physical records would indicate that the physical record is valid. However, the set of physical records is not consistent. This is detected by the fact that some of the multi-write time-of-day values contained in the suffix records will not match the multi-write time-of-day value contained in the check record. (See FIG. 4 at 403 and FIG. 6 at 603.)

Note that the above local problems would normally be detected by the system which experienced the problem causing the bad data store information and that system would attempt recovery. The suffix records and check records allow any system to detect the error and attempt the recovery. This is an important attribute since the system where the error originated might suffer problems that prevent it from correcting the error and possibly from reporting the error to the other systems sharing the data store. Were it not for the suffix and check record processing, the user data on the data store would not be reliable.

Shared Data Access Serialization provides the user several services which allow access to a resource: READ, READ SERIALIZED, WRITE SERIALIZED and UNLOCK.

READ is an unserialized access of a named resource. It does not prevent access of the same resource from other systems. The READ service does not alter the lock state of the resource nor does it look at the lock state of the resource. Therefore, READ can be issued for a resource that is currently locked by another system and complete prior to the unlock of the resource by the other system.

READ SERIALIZED is a controlled access to a named resource and implies an intent to update the resource. Since the resource may be changed, serialization must be obtained prior to accessing the data. The resource's lock, FIG. 4 at 401, and FIG. 5, must first be obtained. The resource may not be read until the lock has been obtained. That is, this system must own the lock, and therefore the resource, prior to reading any data associated with the resource.

WRITE SERIALIZED is a controlled update of a named resource. The resource must have been accessed by a preceding READ SERIALIZED request. The resource is updated only if the lock obtained by the preceding READ SERIALIZED request is still held by this system. Once the data is successfully written, this system's lock is released; the resource is unlocked for this system. The next system waiting for the lock, if there is another system waiting, is informed that it is now the owner of the resource. If the lock is no longer held, the WRITE SERIALIZED request is failed and the requestor is notified of this action. The resource is not updated when the lock is no longer held.

UNLOCK is a way to release the lock obtained for a named resource by this system via a READ SERIALIZED request without altering the contents of the user data. The user data portion of the resource maintained by Shared Data Access Serialization is not modified. The resource is released or unlocked for this system. The next system waiting for the lock, if there is another system waiting, is informed that it is now the owner of the resource.

The ability of a system to lock user data is a very important one in terms of being able to share the data between two or more systems. Shared Data Access Serialization provides this ability at a low level of granularity. However, in order to have continuous availability of the data with no operator involvement some means must be provided to protect the user data from becoming inaccessible. Inaccessibility of data can happen if the data was locked by a system which is either no longer functioning and therefore unable to release the lock or when a system is delayed for an extensive period of time, possibly be being stopped.

Shared Data Access Serialization provides, transparent to either the user of the data or the system operator, a mechanism whereby a system waiting for a resource for too long can safely take ownership of that resource away from another system. This is called stealing the lock. Stealing the lock must be accomplished in such a way as to not jeopardize the integrity of the data associated with the lock. The system from which the lock is stolen must not be able to continue execution and, thinking it owns the lock, write data to the resource. That is, stealing the lock must work just as well against a temporarily stopped system as one that is no longer running. In addition, the temporarily stopped system must be able to recover from having the lock stolen from it.

Lock steal uses the access control information associated with the resource to ensure data integrity of a resource while still allowing the resource to be assigned to a new owner. See FIG. 4, item 401A, 401B, etc. and FIG. 5. The new owner is also selected by using the access control information.

The ability to steal a lock is dependent on the usage of the access control information by the READ SERIALIZED and WRITE SERIALIZED operation. (See the READ SERIALIZED and WRITE SERIALIZED sections of this document for more information on their particular processing.) The READ SERIALIZED operation records information in a lock block associated with the resource and gains ownership of the resource prior to reading in the resource data. The data is read in from the data store and is presented to the user. The user updates the data, then invokes the WRITE SERIALIZED operation requesting that the data be written. WRITE SERIALIZED then writes the data to the data store ensuring that the lock contains the same value as set by the corresponding READ SERIALIZED operation. The update attempt is failed if the lock does not contain the correct information. The lock will not contain the correct information when a lock steal has occurred since lock steal alters the contents of the lock.

USER REQUEST PROCESSING

READ Operation

The READ operation (explained more fully in FIG. 7 and the accompanying text below) allows the user to access a resource stored on the data store. The user has indicated by using the READ operation that there is no intent to update the information read and therefore no reason to prevent access of the data by any other system.

Shared Data Access Serialization conventionally uses the resource name or identifier from the read request and the global control information (302) from the data store to locate the specific resource in the data store and to determine the resource's attributes (such as record format and size).

The data store is referenced at various times during READ processing. While accessing the data store, READ may experience problems which require that error recovery be initiated on the data store. A READ operation may encounter problems accessing the lock block information on the data store or referencing the resource data. See the discussion and the end of the READ SERIALIZED section for information on resource data recovery.

READ SERIALIZED Operation

The READ SERIALIZED operation (outlined in this section and explained more fully in FIG. 10 and the accompanying text below) and the WRITE SERIALIZED service (outlined in the next section) allow the user to access and update a shared resource in a controlled serialized manner. In order for the user to update a shared resource on the data store, the user must first lock the resource and read the resource in from the data store. This is accomplished by requesting Shared Data Access Serialization to perform a READ SERIALIZED request for a specific name resource. When Shared Data Access Serialization has completed the READ SERIALIZED request, the resource has been locked, preventing updates of this resource by other users of the data store, and read in from the data store. The resource is available for processing by the user.

When the reader finishes processing the resource, any changes to the resource can be committed to the data store by requesting via a WRITE SERIALIZED request that Shared Data Access Serialization update the resource. See the next section for more details on the WRITE SERIALIZED service.

After processing the resource, the user may decide that no changes are to be made to the resource on the data store. The user may invoke the Shared Data Access Serialization UNLOCK service to release the serialization on the resource without committing any changes to the data store. A subsequent section contains details on the UNLOCK service.

Shared Data Access Serialization conventionally uses the resource name or identifier from the READ SERIALIZED request and the global control information 302 from the data store to locate the specific resource in the data store and to determine the resource's attributes (such as record format and size).

Since this is a serialized read, the resource lock, FIG. 4 at 401A, 401B, etc., must be obtained prior to accessing any data. Obtaining the lock is a multiple step operation. The first step in obtaining a resource is to generate this system's lock key and to record this lock key into the appropriate lock block in the resource's access control information. The appropriate lock block to be used by this system was determined at system initialization time. Each system owns one of the lock blocks associated with a resource (401A, 401B, etc.). Ownership is determined from information contained in the global control information of the data store. The same lock block in the set of lock blocks for a resource (401C for example) is owned by a system for all resources.

The lock key comprises a system sequence number and a time-of-day value. (See FIG. 5 at 501.) The system sequence number is obtained at system initialization time and is unique for each system sharing the data store. The global control information contained in the data store is incremented by initializing systems to generate the next unique system sequence number. A system will use the same system sequence number throughout its processing. (See FIG. 3 at 302.) The time-of-day value is a time obtained from the processor. A new time value is obtained each time a lock key is to be obtained for a user by Shared Data Access Serialization.

Once the key has been generated, it is written to the appropriate lock block in the data store. This is the first step in obtaining a lock and records in the data store the intent of this system to use the resource associated with this set of lock blocks.

Thus far, all Shared Data Access has done is indicate its intent to use the resource. This system must now determine who is the owner of the resource. This is called lock rule processing. There are three lock rules that are used to determine ownership. All the lock blocks associated with the resource are read from the data store. By the first lock rule, a system is the resource owner if all but that system's lock blocks are zero. No other system is interested in this resource.

By the second lock rule, a system is definitely not the owner if at least one lock block other than the system's lock block is not zero (at least one other system is interested in the resource) and all nonzero lock blocks have time-of-day values that are older than the system's time-of-day value. This system must wait for use of the resource. Lock ownership will be passed to this system by another system when the other system resets its lock block lock key to zero and determines which system is the next system in order to use the resource. That is, this system will wait until all systems with older time-of-day values have processed, each in turn.

The third lock rule deals with the case where at least one other system's time-of-day value is younger than a first system's time-of-day value. This condition can arise because the act of obtaining a time stamp and recording interest in a resource are not atomic. That is, two requests may be interleaved. System A gets a time stamp followed by System B getting a time stamp and recording that time stamp in the data store. Subsequently, System A records its time stamp and finds the time stamp of System B which is younger.

The ownership state is indeterminate in this case. To resolve this, the first system will generate a new time-of-day value, produce an updated lock key using this new time-of-day value and write its lock block with this updated lock key. When the lock block update is complete, the first system will read the lock blocks for all systems and find the system with the oldest time-of-day value. The system with the oldest time-of-day value is informed that it is the owner. Informing a system that it is the owner when it already knows it is the owner is acceptable. The first system then waits for notification that is has become the owner.

Once a system has determined (lock rule one) that it is the owner or has been informed by another system that it is the owner (lock rule two or lock rule three), it can read the user data from the data store to complete the user request. The user is informed that the data is available.

As noted, the data store is referenced at various times during READ SERIALIZED processing. While accessing the data store, READ SERIALIZED may experience problems which require that error recovery be initiated on the data store. The error recovery to be taken is dependent on which part of the data store is damaged. A READ SERIALIZED operation may encounter problems accessing the lock block information on the data store or referencing the resource data.

If the lock blocks are damaged (determined by an attempt to write or read the lock blocks resulting in a permanent read or write error), an attempt is made to reformat the lock blocks. Reformatting physically recreates the track containing the lock block information for this resource on the data store. Formatting writes are used instead of normal write operations. Since lock blocks control access to the resource, repair of the lock blocks must be done in such a way as to temporarily stop access to the specific resource whose lock blocks are damaged. The current owner of the resource will lose ownership since all control information will be lost as a result of the repair. Waiters will lose their spot in line. The owner and all waiters will have to re-attempt to gain ownership. In effect, the repair of lock blocks becomes a mass steal of the lock from all systems currently interested in this resource. Since lock block repair is effectively a steal operation, lock blocks are reformatted on both the alternate and the primary data stores, regardless of which data store the damage was detected on. This is necessary to safely effect the stopping of the usage of the resource. (See FIG. 18 for more detail on steal processing and FIGS. 11, 12 and 13 for more information on lock block processing and repair.)

If an error is encountered reading in the resource's data from the primary data store, an attempt is made to read the data in from the alternate data store. The alternate data store contains a duplexed image of the primary data store. The error encountered could either be a permanent error attempting to read the data from the primary data store or information contained in the suffix or check record could indicate that a physical record is not complete or that one of several physical records is not logically consistent with the other physical records comprising the resource. See FIG. 8A for more information on the recovery attempted on a READ DATA operation.

WRITE SERIALIZED Operation

The WRITE SERIALIZED operation (explained more fully in FIG. 15 and the accompanying text below) allows the user to update a resource stored on the data store in a controlled manner. The user must read the data in via the READ SERIALIZED operation, update the data and then invoke the WRITE SERIALIZED operation to copy the changed data back to the data store. Shared Data Access Serialization will write the updated data to both the primary and the alternate data store.

In order to process certain types of errors, Shared Data Access Serialization maintains data sequence numbers for each resource. Data sequence numbers reflect the level of data with respect to a given system. A new data sequence number is generated each time a system writes data to the data store. The data sequence numbers are maintained in the check record. See FIG. 4, item 403 and FIG. 6, item 602A, 602B, etc. There is one data sequence number for each system sharing the data store. Each system uses its data sequence number to determine the result of the data update during certain error recovery operations.

A system increments its data sequence number in the local copy of the check records (read in by the READ SERIALIZED operation) in preparation for possible recovery.

Now that the new data sequence number is generated, the primary data store can be updated. The UPDATE operation is comprised of the following sequence of actions. These actions must be done via a single atomic operation to the data store. First, a system's lock block is checked to determine if the resource is still owned by this system. It must contain the same nonzero value written by the READ SERIALIZED request. Any change in the state of the lock blocks value indicates that another system has stolen the lock and therefore the resource from this system. A stolen lock will prevent the data update portion of this operation from taking place. The WRITE SERIALIZED operation is terminated and the user is informed that his UPDATE operation failed because of a stolen lock. The user can redo the operation starting from the READ SERIALIZED operation. Second, assuming that the lock is still held, one or more user data records, along with their corresponding suffix records, will be written to the data store. And last, the check record is written. The check record contains, among other things, the updated data sequence number for this system (the data sequence number for other systems is unaltered).

Once the primary data store has been updated, the alternate data store can be updated. The alternate data store update comprises the following sequence of actions, all accomplished with a single atomic operation against the data store. First, this system's lock block is checked to determine if the resource is still owned by this system. The lock block must be all zeros, the normal state of the lock block on the alternate data store. Any nonzero value in the lock block indicates that another system has stolen the lock and therefore the resource from this system. A stolen lock will prevent the data update portion of this operation from taking place. Second, assuming that the lock is still held, one or more user data records, along with their corresponding suffix records, will be written to the alternate data store. And last, the check record is written.

If the primary data store failed, was removed, and the alternate data store became the primary data store while this process was attempting to update data on the alternate data store (now the primary data store), this WRITE SERIALIZED operation is terminated. What is reported to the user of the WRITE SERIALIZED operation is dependent on the completion state of the alternate data store update. If the alternate operation was not started when this WRITE SERIALIZED operation was interrupted for the primary data store failure, then the new primary data store (formerly the alternate) does not reflect the user change. This is effectively a stolen lock since the all zero lock block of the alternate is now in the primary. The issuer of WRITE SERIALIZED is informed that the lock was stolen and the issuer can retry his operation starting with the READ SERIALIZED (the lock must be reacquired). If the alternate WRITE operation completed successfully prior to the alternate data store becoming the primary data store then the user changes are now reflected in the primary data store. The user is informed that the WRITE SERIALIZED operation was successful. The resource does not have to be unlocked since the primary with its zero lock blocks is effectively an unlocked resource.

If the WRITE to the alternate data store was successful, or the alternate data set totally failed and is no longer useable (Shared Data Access Serialization can continue without an alternate data store), or if no alternate data store is being used (an alternate data store is optional) then the user data update has been successfully processed. The WRITE SERIALIZED operation is completed by releasing the resources' lock for this system. This is accomplished by invoking the unlock operation which unlocks the resource for this system and communicates the success of the WRITE SERIALIZED operation to the user.

If the WRITE to the alternate data store was not successful because of the lock checking (the lock on the alternate was not zero) then the lock was stolen from this system. It must be determined if the lock was stolen from this WRITE SERIALIZED operation or from a previous WRITE SERIALIZED operation on this system.

Steal processing, running on some system other than the one which owns the lock, will have determined that the lock has been held too long by a single system (our system) and will take ownership of the resource away from this system by altering the content of its lock block on both the primary and alternate data stores. The content of the lock block on the alternate data store is modified first, followed by altering the content or value of the lock block on the primary data store. Specifically, the alternate data store lock block value is changed from zero to the value found by steal in the primary data store's lock block (the system sequence number and time-of-day value generated by READ SERIALIZED). The primary data store's lock block value is set to zeros. The system whose lock is being stolen may possibly complete its operation between the time steal determined who to steal from and the time it actually steals the lock. This is no problem for either lock steal or the target system. The next operation against the resource from the target system must determine however whether steal was aimed at it or a previous request.

WRITE SERIALIZED must determine if steal was aimed at this operation or a previous one. In order to do this, WRITE SERIALIZED must examine the value in its alternate lock block. If the value of the lock (a copy of what the READ SERIALIZED has placed in the primary data store's lock block) does not match what READ SERIALIZED wrote there then the lock steal was aimed at a previous request. WRITE SERIALIZED attempts to write the data again as described earlier, this time checking the alternate lock for this new value rather than the more normal zero value. If the write is successful this time, then the lock block on the alternate data store is reset to all zeros in order to prevent repeated extra processing in the future.

If the value of the lock block in the alternate data store does match, then the lock was stolen from this system for the current WRITE SERIALIZED operation. The caller of the WRITE SERIALIZED service on this system will have committed his changes to the primary but not to the alternate data store. However, the changes may not have been duplexed. Until it is certain that the changes are duplexed, the user cannot be informed that his operation completed. It cannot be assumed that the stealing system will accomplish the duplexing since the stealing system might not have completed the process of READ SERIALIZED, UPDATE and WRITE SERIALIZED that would ensure the duplexing of this system's change. Therefore, Shared Data Access Serialization ensures the duplexing, without relying on the system which stole the lock. To this end, WRITE SERIALIZED internally invokes READ SERIALIZED. This causes the lock to be reacquired in a normal fashion and the data to be read in again. Note that the data may or may not have changed several times since we started because of activity on other systems. The only goal is to ensure that it is duplexed at whatever level currently exists. After the READ SERIALIZED is complete, the WRITE SERIALIZED is attempted to both primary and alternate data stores again.

As noted, the data store is referenced at various times during WRITE SERIALIZED processing. While accessing the data store, WRITE SERIALIZED may experience problems which require that error recovery be initiated on the data store. The error recovery to be taken is dependent on which part of the data store is damaged. A WRITE SERIALIZED operation may encounter problems accessing the lock block information on the data store or referencing the resource data.

See the discussion and the end of the READ SERIALIZED section for information on lock block recovery.

If an error is encountered writing the resource's data to the primary or alternate data store, an attempt is made to recreate the data in the failed data store. Reformatting (recreating) physically restructures the track or tracks containing the data for this resource on the data store. Formatting writes are used instead of normal WRITE operations. See FIG. 16 for more information on WRITE DATA and repair processing.

UNLOCK Operation

The UNLOCK operation (explained more fully in FIG. 17 and the accompanying text below) allows the user to cancel a previous READ SERIALIZED request without updating any data on the data stores. It is also used by the WRITE SERIALIZED operation to complete its processing.

UNLOCK alters the access control information for a resource to remove from the information the indication that this system is interested in the resource. (See detail below.) It then looks at the access control information to determine what other system, if any, should own the resource next. If a next owner is found, UNLOCK will notify that system that it is now the owner.

The data store is referenced at various times during UNLOCK processing. While accessing the data store, UNLOCK may experience problems which requires that error recovery be initiated on the data store. An UNLOCK operation may encounter problems accessing the lock block information on the data store. See the discussion and the end of the READ SERIALIZED section for information on lock block recovery.

READ

Figure 7:
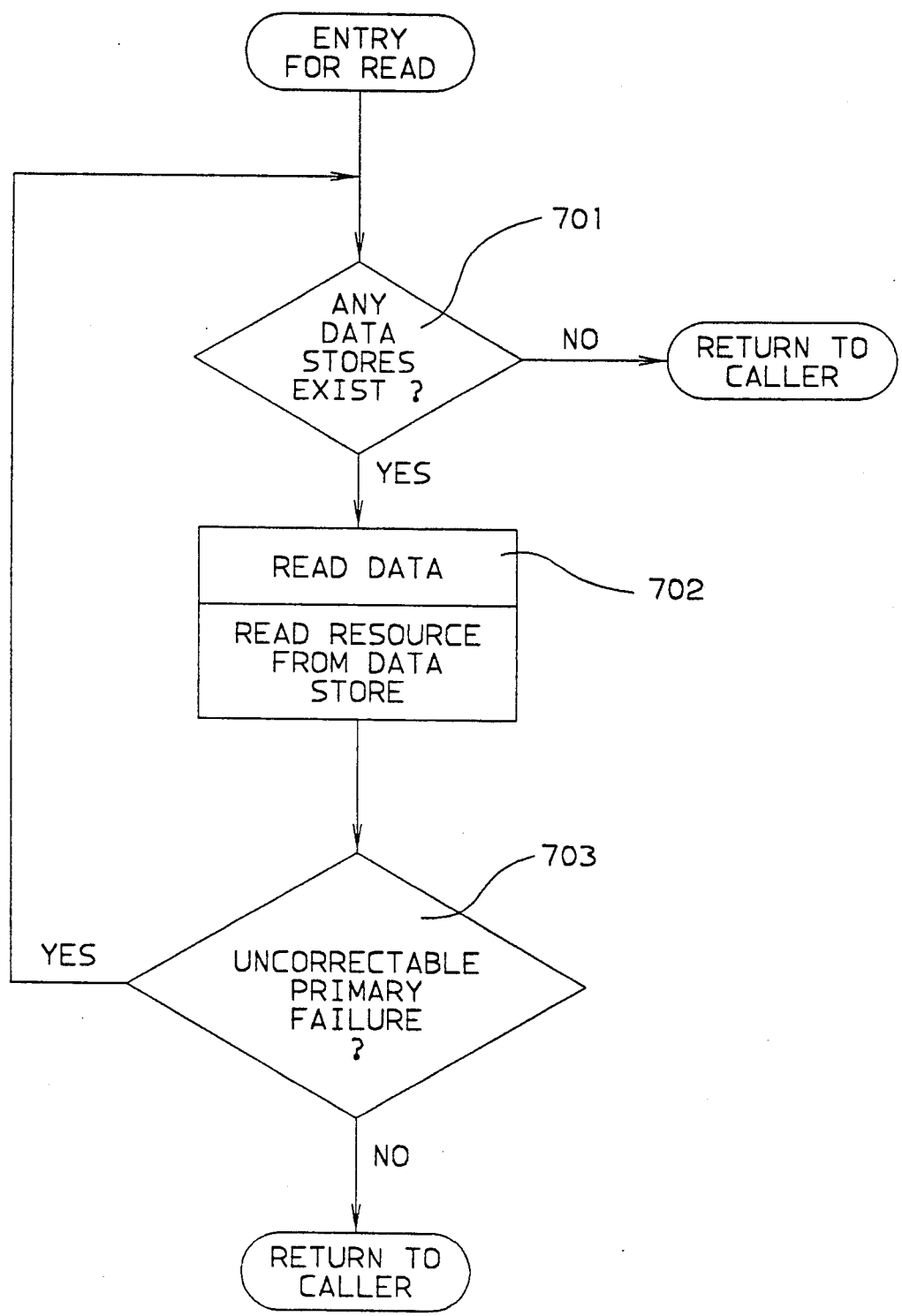
FIG. 7 is a flow diagram illustrating control flow for READ request processing.
Figure 25:
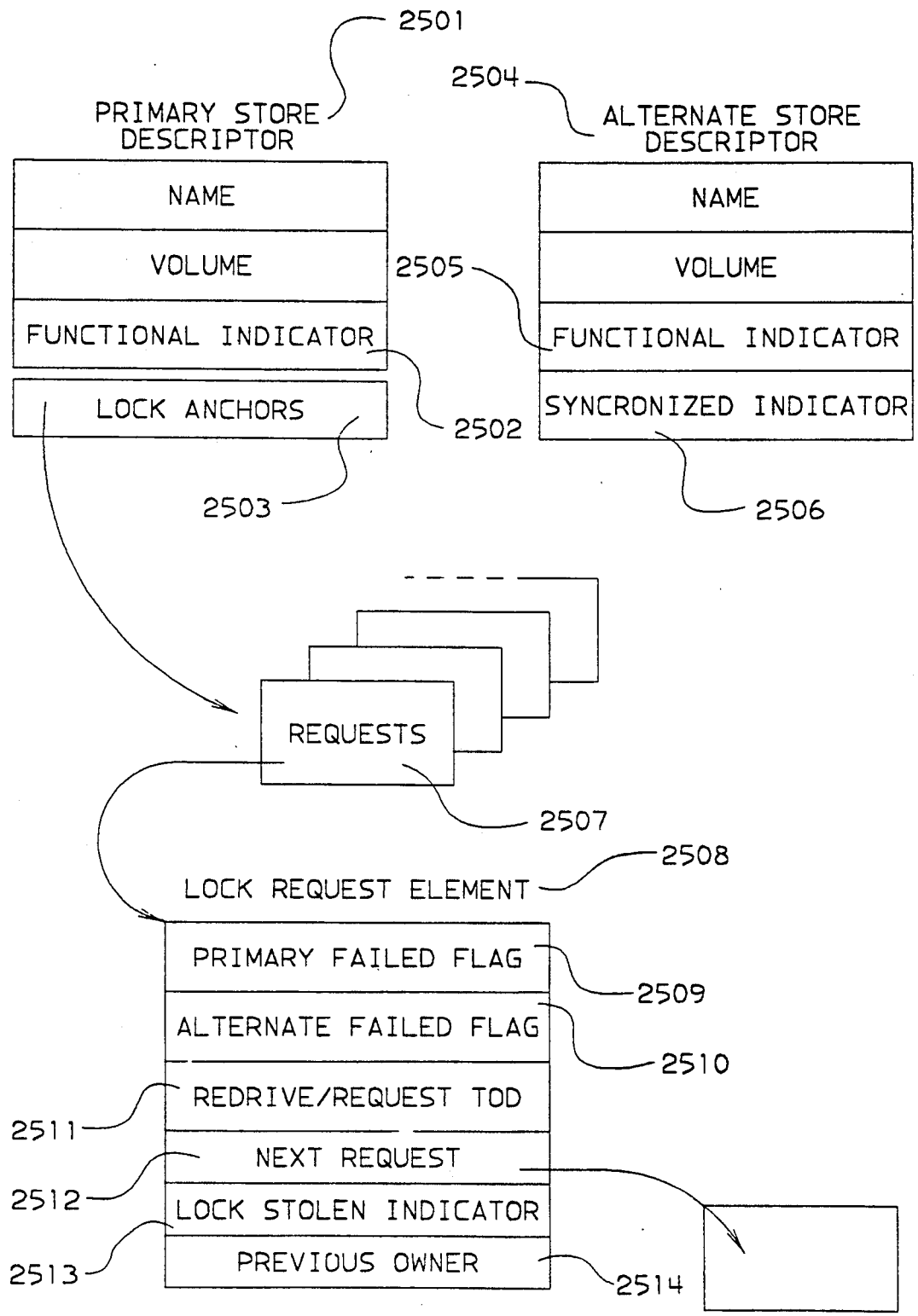
FIG. 25 is a block diagram showing the control block structure for the primary store descriptor, the alternate store descriptor, and lock request elements.

In FIG. 7 at 701 a test is made whether any data stores exist. (That is, whether there is a primary data store. This is indicated in FIG. 25 by the "functional" indicator 2502 in the Primary Store descriptor 2501.) If the test at 701 indicated that no primary existed, return is made to the caller. If the test indicated that a primary existed, the READ DATA routine is invoked 702, to read the resource from either the primary or alternate data store. The details of READ DATA are shown in FIG. 8. After return from READ DATA, a test is made 703 whether there was an uncorrectable failure of the primary data store. If there was, the test at 701 is reexecuted as indicated above. If the data was either successfully read from the primary or alternate, then return is made to the caller.

READ DATA

FIG. 8 illustrates the control flow for READ DATA processing. At 801, a channel program is built to read the resource from the primary data store. Then, 802, the channel program is started and its completion is awaited. At 803, a test is made whether the data was successfully read by the channel program. If so, 804, a determination is made if the data is reliable by examination of the suffix and check records. This consistency check is accomplished by checking to insure that the time-of-day value for multi-record writes (FIG. 6 at 603) within each suffix record and the check record is equal to the value in every other suffix record and the check record, and that the time-of-day value for single record writes (FIG. 6 at 604) in each suffix record and check record is equal to the time-of-day value within the Shared Data Access Serialization global control information (FIG. 3 at 302A). Next, 805, a test is made whether the data was in fact reliable. If it was reliable, return is made to the caller. If not, processing continues as shown in FIG. 8 at 807. If the test at 803 indicated that the data was not read successfully from the primary data store, a test is made at 806 whether the error was a correctable permanent error or not. Whether or not an error is considered correctable is an indication of whether or not the entire data store is considered inaccessible, or simply a single record is considered in error. For example, a return code indicating that there was a channel program check would be considered an uncorrectable permanent error. A return code indicating an incorrect record length would be considered a correctable permanent error. If the permanent error was considered not correctable, permanent error processing is invoked (808) to remove the nonusable primary data store. This processing is indicated below in the description of FIG. 9. Return is then made to the caller. A test is made at 807 whether a synchronized alternate exists. (Indicated by indicator 2506, FIG. 25.) If the test at 807 indicates that a synchronized alternate does not exist, permanent error processing is invoked as indicated above at 808, and return is made to the caller. If a synchronized alternate does exist, a channel program is built 809 to read the resource from the alternate data store, and this channel program is initiated 810. Its completion is then awaited.

A test is then made 811 whether the channel program read the data successfully. If so, 812, a determination is made whether the data just read is reliable. This determination is done as indicated in the description of 804 above. A test is next made if the data was reliable 813.

If so, return is made to the caller. If not, permanent error processing is invoked 814 to remove the nonusable primary store, and is again invoked 815 to remove the nonusable alternate data store. Return is then made to the caller. If the test at 811 indicated that the data was not read successfully from the alternate data store, permanent error processing is invoked as indicated above at 814 and 815, and return is made to the caller.

Permanent Error Processing

FIGS. 9A and 9B illustrate control flow for permanent error processing. At 901 the identification for the system encountering the permanent error is saved locally. Next, 902, serialized requests on the system are stopped by stopping the task that processes serialization requests. Then a test is made at 903 whether the failure was a failure of the alternate data store. If so, 904, an indication that the alternate failed is set 2510, the operator is notified, and the alternate is removed from use by turning off the functional indicator (FIG. 25 at 2505). Next, a test is made 905 whether the failure was a primary failure. (This test is made immediately made after step 903 if there was not a failure of the alternate data store.) If there was a primary failure, 906, the operator is notified, an indication is set that the primary data store failed, and it is removed from use by turning off the functional indicator (FIG. 25 at 2502). Then, 907, (or following step 905 if there was no primary failure) other systems are signalled (with the data set name and volume serial of the failing data set) about this error (for example, by use of a channel-to-channel communication). Next, 908, a test is made whether an alternate data store exists and the primary has failed. If so, an indication that the alternate failed is set 909 and the alternate is removed from use by turning off the functional indicator (FIG. 25 at 2505). The alternate is subsequently used as the primary (910) (by moving the alternate store descriptor information (2504) into the primary (2501)). If the test at 908 indicated that either the primary did not fail or the alternate does not exist, a test is made 911 whether the alternate exists. If not, the system is terminated 912. If an alternate does exist (and also following the processing described above for step 910), a test is made 913 whether all systems have seen this error (by comparing the locally saved system identifiers with the list of participating systems in the data store's global control information 302). If not, 914, the other systems which have not seen it are signalled of the permanent error and additional signalling from these systems is awaited 915. If all systems have have seen the error, serialized requests for this system are restarted 916 (by restarting the task that processes serialization requests), and the routine is exited. On an entry for a signal from another system or as a result of a timer expiring the identification of this system is saved in a local area 917, and processing continues as indicated above at 913.

READ SERIALIZED Request

Figure 10A:
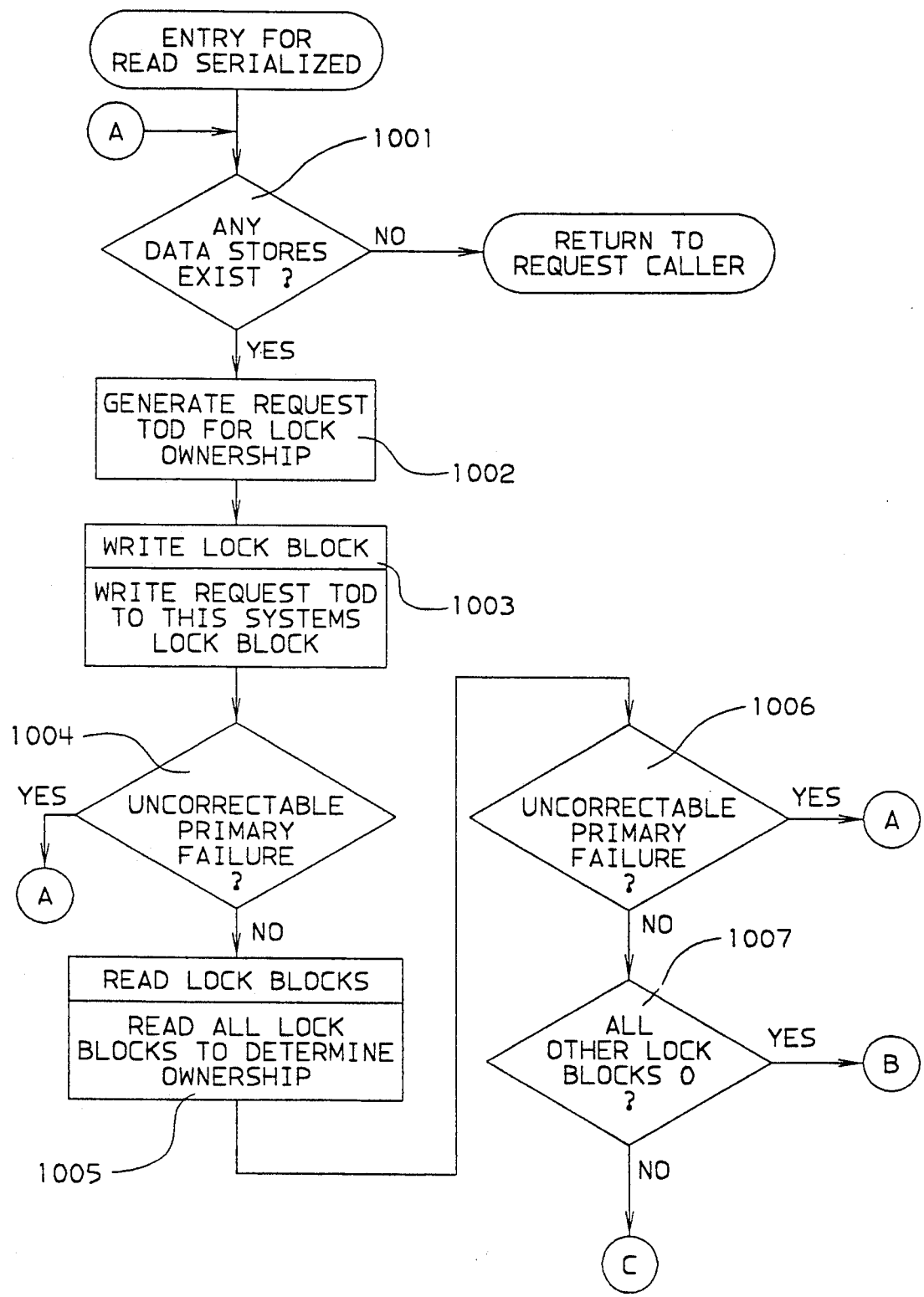
FIGS. 10A, 10B and 10C are flow diagrams illustrating control flow for READ SERIALIZED request processing.
Figure 10B:
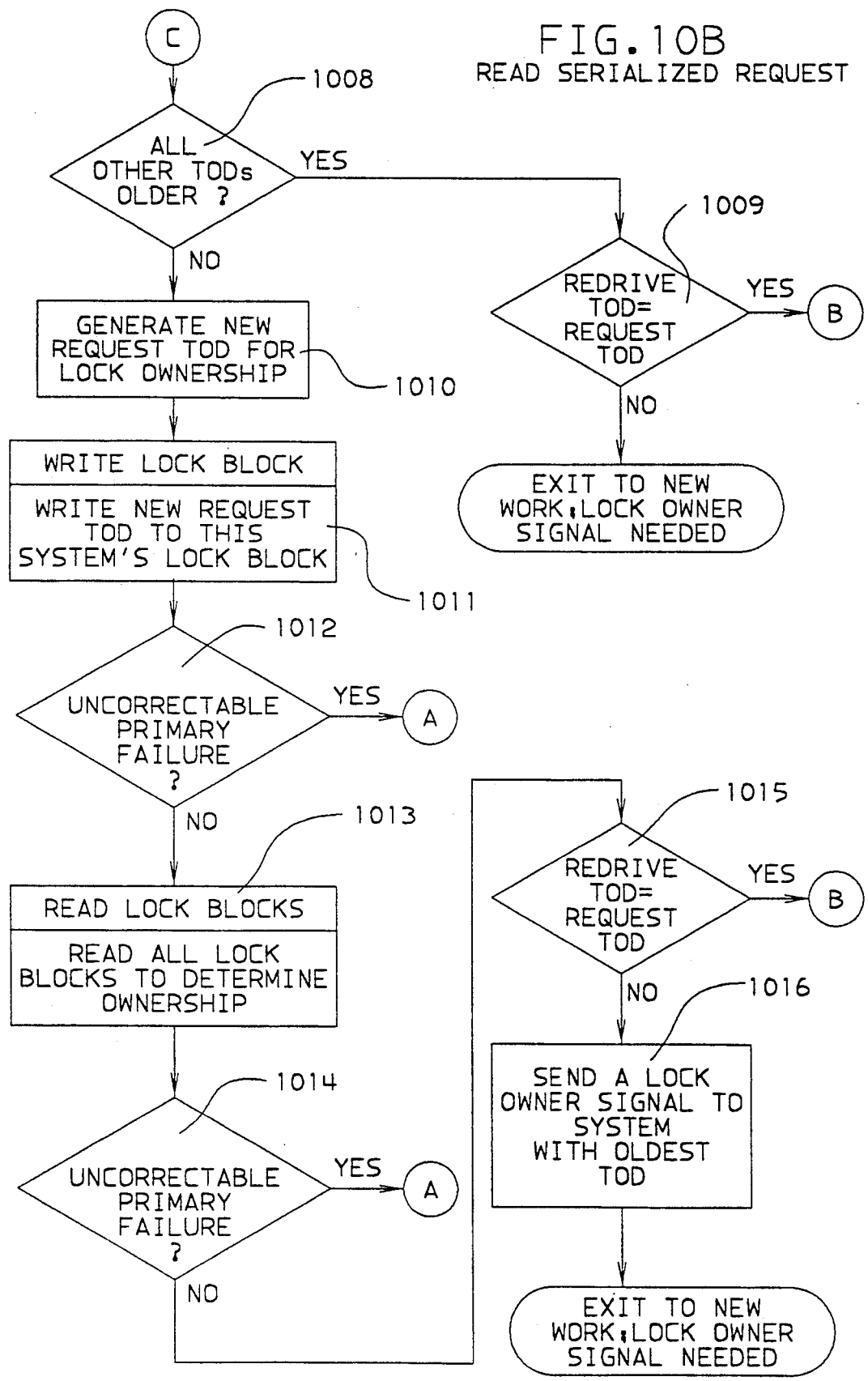
Figure 10C:
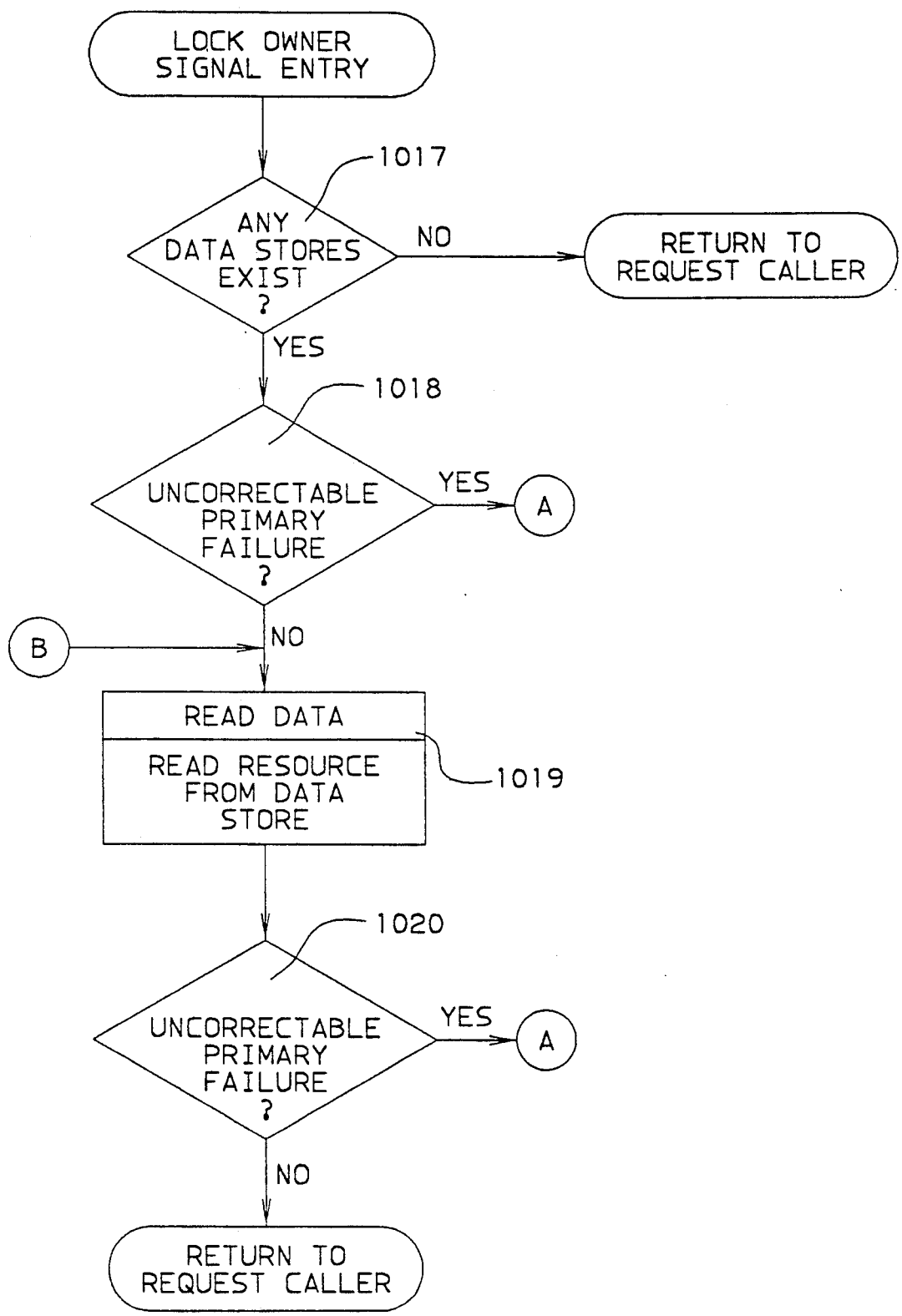

FIG. 10 illustrates the control flow for a READ SERIALIZED Request. At 1001, a test is made whether any data stores exist (2501). If a primary data store does not exist, return is made to the requestor. If a primary does exist, a request TOD for lock ownership is generated 1002 and the request is queued to the lock anchor for that resource (FIG. 25 at 2503). Next, 1003, write lock block processing is invoked to write the request TOD to this systems lock block in the primary data store. This processing is explained more fully at FIG. 13. The lock block that is written by write lock block processing will contain the system sequence number associated with this system, and the current TOD value. This lock block is indicated in FIG. 5 at 501. After return from write lock block processing, a test is made 1004 whether there was an uncorrectable failure of the primary data store. If not, read lock block processing is invoked to read all lock blocks from the primary data store and thus determine resource ownership 1005. Read lock block processing is illustrated more fully in FIG. 11. After return from read lock block processing, a test is made 1006 whether there was an uncorrectable failure of the primary data store. If not, a test is made whether all other lock blocks equal zero 1007. A yes answer to the test at 1007 indicates by lock rule 1 that this system owns the resource and processing continues at 1019 as will be described below. If the test at 1007 indicated that all other lock blocks are not equal to zero, there is contention for the resource. A test is then made 1008 whether all other TODs are older than this TOD. If all other TODs are older than this TOD, then, by lock rule 2, this system is not the owner of the resource. A test is then made at 1009 whether the redrive TOD is equal to the request TOD. This test must be made because even though this system was not the owner when READ SERIALIZED request processing read lock blocks at 1005, it is possible that lock owner signal processing ran asynchronously during READ SERIALIZED request processing and this system has since become the owner of the resource. Therefore, if the test at 1009 indicates that the redrive TOD is equal to this request TOD, we have now become the owner of the resource and processing continues as indicated below at 1019. If the redrive request TOD is not equal to this request TOD, this system is still not the owner of the resource, and the routine is exited. A lock owner signal will be needed in the future. If the test at 1008 did not indicate that all other TODs are older than this TOD, then by lock rule 3 resource ownership is indeterminate and 1010 a new request TOD for a lock ownership is generated. Next, 1011, write lock block processing is invoked to write a new request TOD to this systems lock block in the primary data store. Write lock block processing is explained more fully in FIG. 13. On return from write lock block processing, a test is made 1012 whether there was an uncorrectable failure of the primary data store. If not, read lock block processing is invoked 1013 to read all lock blocks from the primary data store to determine ownership. (See FIG. 11.) On return from read lock block processing, a test is made whether there was an uncorrectable error of the primary data store. If not, a test is made 1015 whether the redrive TOD is equal to the request TOD for the same reasons as explained above at 1009. If these values are equal, then this system has become the owner of the resource and processing continues at 1019 as will be explained below. If these values are not equal, a lock owner signal is sent to the system with the oldest TOD 1016. The routine is then exited, to await a lock owner signal.

At 1019, read data processing is invoked to read the resource from the data store. (Read Data Processing is outlined in FIG. 8.) After return from read data processing, a test is made 1020 whether an uncorrectable failure of the primary data store occurred. If not, return is made to the request caller. When lock owner signal processing (FIG. 14 - which will be described more fully below) receives a lock owner signal and determines that the signal is valid for this system, it invokes read serialized processing at block 1017. At 1017, a test is made whether any data stores exist. If not, return is made to the request caller. If a primary data store does exist, a test is made 1018 whether there was an uncorrectable failure of the primary data store. If not, processing continues at block 1019 as described above.

If any of the tests above (1004, 1006, 1012, 1014, 1018, 1020) indicated an uncorrectable failure of the primary data store, READ SERIALIZED processing is reinvoked at 1001 as explained above.

Read Lock Blocks

Figure 11:
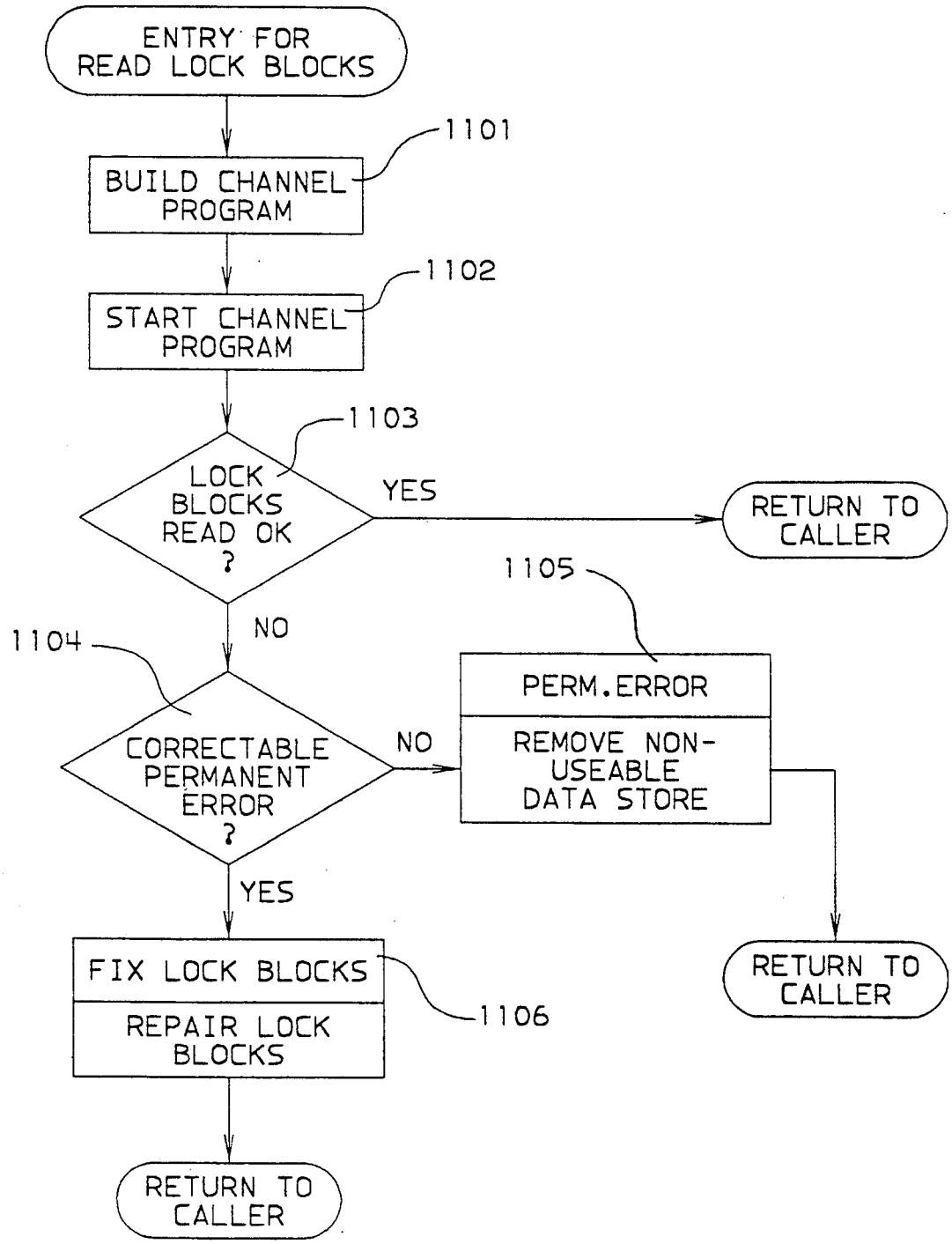
FIG. 11 is a flow diagram illustrating control flow for read lock blocks processing.

FIG. 11 illustrates the control flow for read lock blocks processing. At 1101, a channel program is built to read lock blocks from the primary or alternate data store. At 1102, the channel program is started and its completion is awaited. A test is then made, 1103, whether the lock blocks were read successfully. If so, return is made to the caller. If not, a test is made 1104 whether there was a correctable permanent error. If not, permanent error processing is invoked 1105 to remove the nonusable primary or alternate data store. Permanent error processing is described in FIG. 9. Return is then made to the caller. If there was a correctable permanent error, fix lock block processing is invoked 1106 to repair the lock blocks. Fix lock block processing is described in FIG. 12. Return is then made to the caller.

Fix Lock Block Processing

Figure 12:
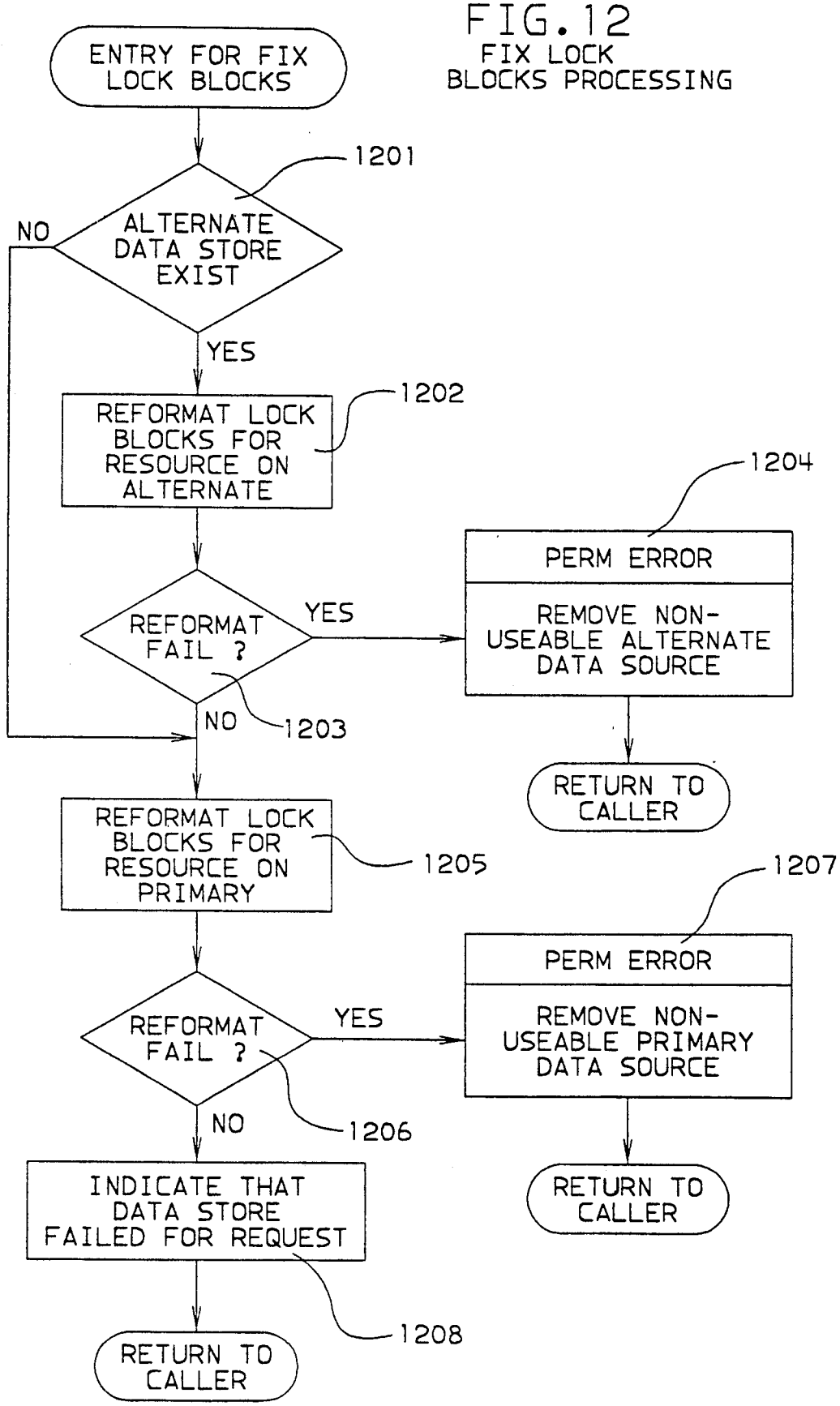
FIG. 12 is a flow diagram illustrating control flow for fix lock blocks processing.

FIG. 12 illustrates the control flow for fix lock block processing. At 1201, a test is made whether an alternate data store exists (2505). If one does exist, the lock blocks for this resource are reformatted on the alternate data store 1202. The reason the reformatting is done of the lock blocks on the alternate data store before the lock blocks on the primary data store is that fixing lock blocks is logically a mass lock steal operation and as will be shown below in lock steal processing, lock stealing writes first to the alternate data store, then to the primary data store. (See FIG. 18.) FIG. 4 shows the relationship of the lock blocks to the resource. Since the lock blocks are being reformatted, any previous TOD value in the lock blocks is lost. The number of lock blocks indicates the number of systems that are capable of sharing the resource—that is, the number of systems that can share this particular data store. A test is then made at 1203 whether the reformatting was successful or not. If not, permanent error processing is invoked 1204 to remove the nonusable alternate data store. Permanent error processing is described at FIG. 9. Return is then made to the caller. If the reformat was successful, the lock blocks for the resource on the primary data store are reformatted 1205. This processing at 1205 is also executed if the test at 1201 indicated that an alternate data store did not exist. A test is then made 1206 whether this reformatting of lock blocks on the primary data store was successful or not. If not, permanent error processing is invoked 1207 to remove the nonusable primary data store. Permanent error processing is described in FIG. 9. Return is then made to the caller. If the reformatting of the lock blocks was successful, an indication is set that the data store failed for the request 1208. The indicator reflects the primary or alternate data store, depending on whether the read lock block processing was entered to read lock blocks from the primary or the alternate data store. Return is then made to the caller.

WRITE LOCK BLOCK Processing

Figure 13:
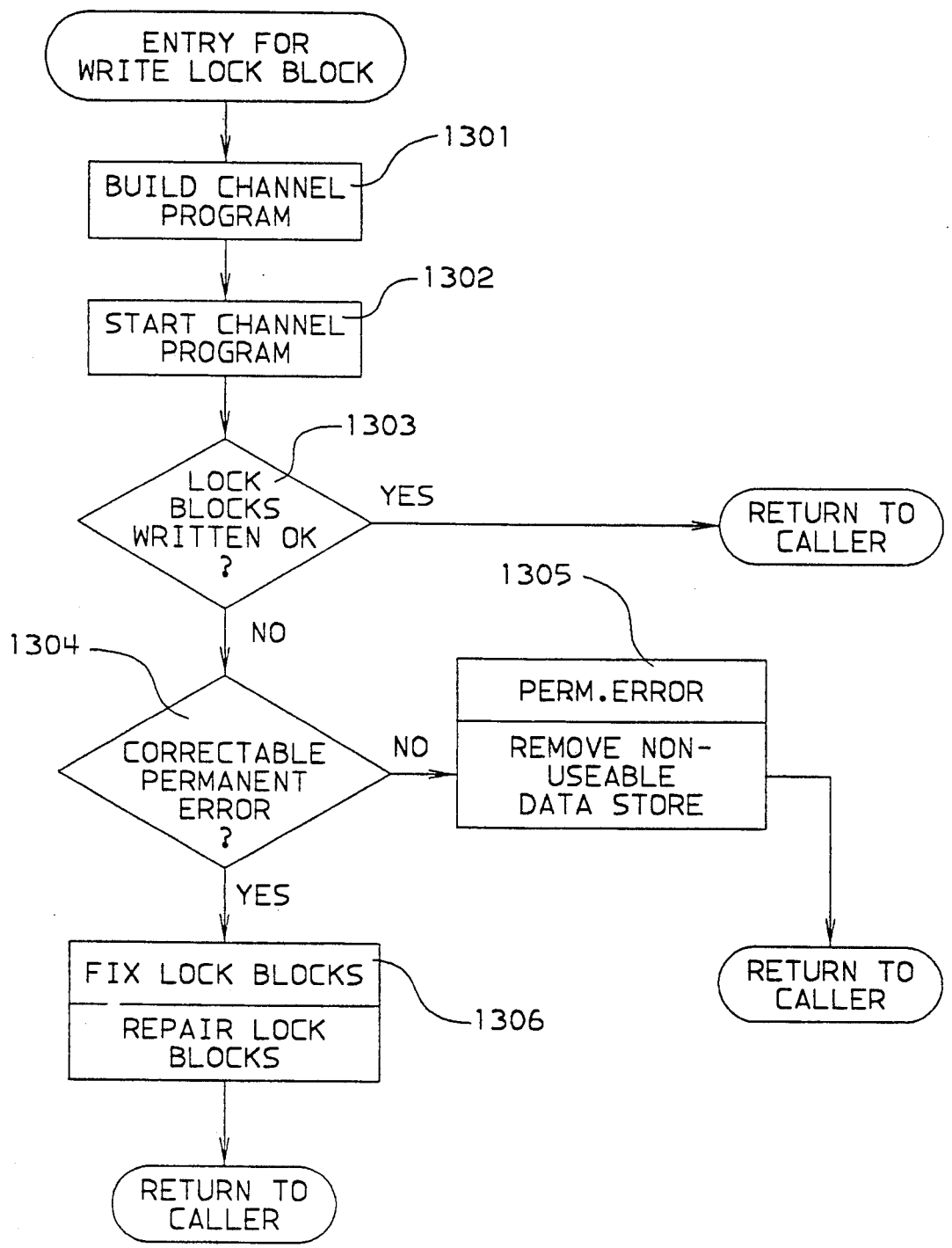
FIG. 13 is a flow diagram illustrating control flow for write lock blocks processing.

FIG. 13 illustrates the control flow for WRITE LOCK BLOCK processing. At 1301, a channel program is built to write lock block to the primary or alternate data store. At 1302, the channel program is started and its completion is awaited. A test is then made, 1303, whether the lock block was written successfully. If so, return is made to the caller. If not, a test is made 1304 whether there was a correctable permanent error. If not, permanent error processing is invoked 1305 to remove the nonusable primary or alternate data store. Permanent error processing is described in FIG. 9. Return is then made to the caller. If there was a correctable permanent error, fix lock block processing is invoked 1306 to repair the lock blocks. Fix lock block processing is described in FIG. 12. Return is then made to the caller.

RECEIVED LOCK OWNER SIGNAL Processing

Figure 14B:
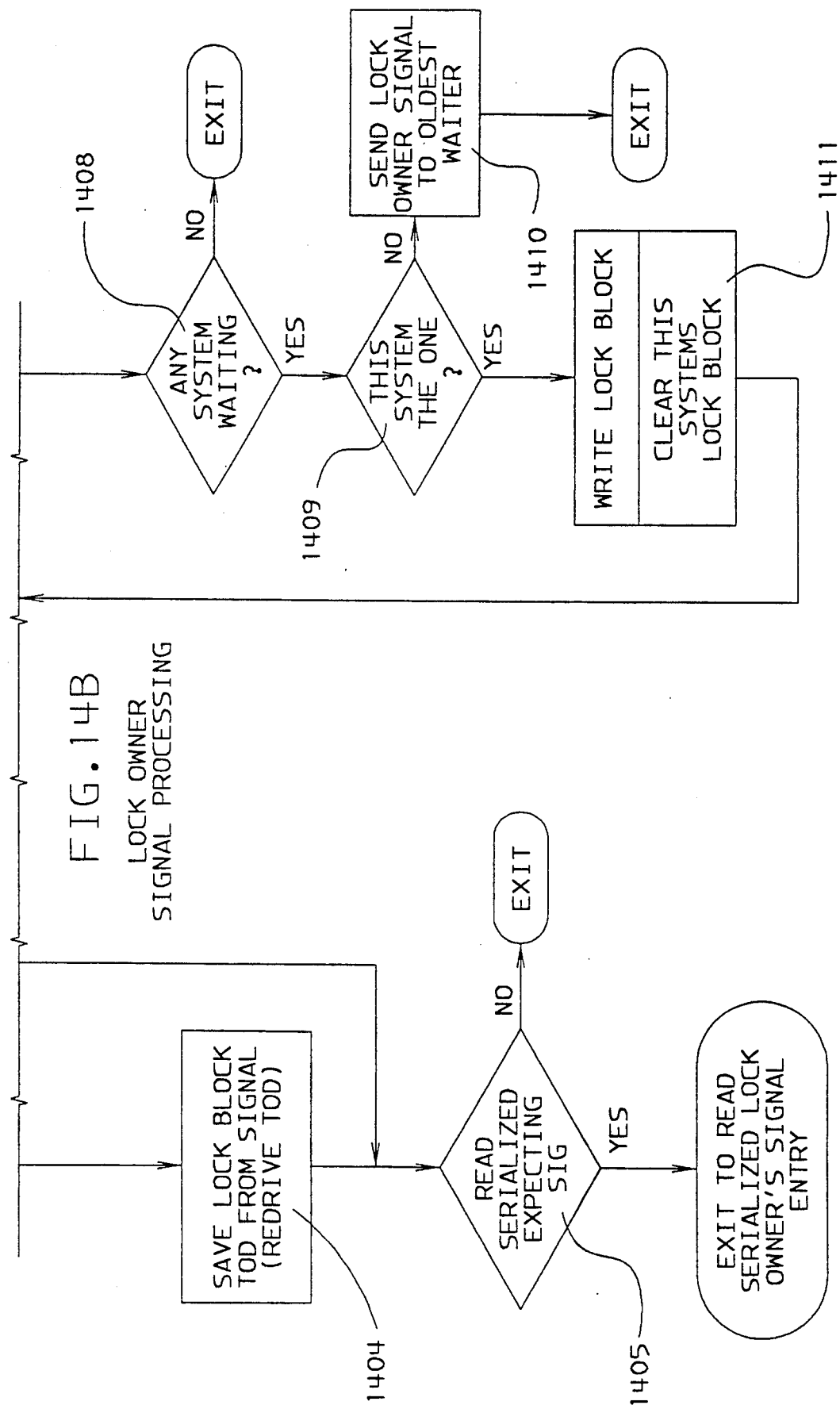

FIG. 14 illustrates the control flow for the receipt of a lock owner signal. On receipt of the signal, a test is made 1401 whether the data store is the same as when the signal was sent. (An ID for the primary data store is sent with the signal, and is checked against the current primary data store in use on this system.) If not, the routine is exited indicating an invalid lock owner signal and the signal is discarded. If so, a test is made whether there are any requests pending for the given resource 1402. (The lock anchor for the specific resource (FIG. 25 at 2503 is checked.) If the test at 1402 indicated that there are requests for the resource, then a test is made whether this signal is the "newest" signal 1403. This test is made by comparing the request TOD of the input signal to the redrive TOD in the request element (2511) (to discard "old" signals). If the request TOD is newer, then the request TOD from the signal is saved 1404 in the redrive TOD field 2511 of the lock request element. (This is done to allow READ SERIALIZED to detect if it has become the owner of the resource—FIG. 10 at 1009 and 1015.) If it is not the newest signal, then this saving is bypassed. Next, 1405, a test is made whether READ SERIALIZED processing is expecting a lock owner signal. (That is, whether READ SERIALIZED exited after receiving a NO response to the test 1009 or 1015 in FIG. 10.) If it was not expecting a LOCK OWNER SIGNAL, the routine is exited. If such a signal was expected, then exit is made to READ SERIALIZED lock owner signal processing (FIG. 10 at 1017). If the test at 1402 indicated that there are no requests for the given resource on this system (e.g., perhaps a redundant signal was received which no longer applies) then the read lock block processing is invoked 1406 to read all lock blocks from the primary data store. A test is then made 1407 whether there was a failure of the primary data store in reading the lock blocks. If so, the routine is exited. If not, a test is made 1408 whether any system is waiting for this resource. If not, (i.e., all lock blocks are equal to zero), the routine is exited. If there is a system waiting for lock owner signal, then a test is made whether this system is the one which is waiting 1409 (determined because each system knows its lock block number). If not, the lock owner signal is sent to the oldest waiter, 1410, and the routine is exited. The lock owner's signal will include the owner's request TOD (obtained from his lock block), and the ID (data set name and volume serial) of the primary data store. If this system is the waiting system, write lock block processing in invoked 1411 to clear this system's lock block. (It is not really waiting.) (This implies an error condition where the data store and this system got out of synchronization.) Processing then continues at 1406.

WRITE SERIALIZED Request Processing

FIG. 15 illustrates the control flow for WRITE SERIALIZED request processing. At 1501, a test is made whether there has been an uncorrectable error of the primary data store. If so, return is made to the requestor with an error indication. No write is issued. If not, write data processing is invoked 1502 to write data to the primary data store. Write data processing is illustrated in detail in FIG. 16. (The request TOD is passed to WRITE DATA for lock verification checking.) Next, 1503, a test is made whether an uncorrectable failure of the primary data store occurred in writing the data. If so, again return is made to the requestor with an error indication that the write was not made. If not, a check is made whether the primary lock was stolen before the data was written to the primary 1504. If so, an error return is made to the caller indicating that the write was not completed. If not, a test is made whether an alternate data store exists 1505. If it does not exist, UNLOCK processing is invoked 1506 to transfer control to unlock to complete the WRITE SERIALIZED request. UNLOCK processing is described in more detail in FIG. 17. If an alternate data store does exist, WRITE DATA processing is invoked 1507 to write data to the alternate data store. (A zero value is passed to WRITE DATA for lock verification checking.) Data processing is described in more detail in FIG. 16. Next, 1508, a test is made for an uncorrectable failure of the primary data store. If no such failure occurred, a test is made 1509 for an uncorrectable failure of the alternate data store. If no such failure occurred, a test is made 1510 whether the alternate lock was stolen. If it was stolen, read lock block processing is invoked 1511 to read this systems lock block from the alternate data store. Read lock block processing is described in more detail in FIG. 11. Next, 1512, a test is made for an uncorrectable failure of the primary data store. If no such failure occurred, an indication is set that alternate lock block need resetting 1513. Next, 1514, a test for a failure of the alternate data store is made. If no failure occurred, a test is made whether the lock was stolen from this request 1515. If it was not, WRITE DATA processing is invoked 1516 to write data to the alternate data store. (The TOD of the lock just read is passed to WRITE DATA for lock verification checking.) WRITE DATA processing is described in more detail in FIG. 16. Next, the test at 1508 is executed and processing continues from that point as indicated above. If the test at 1508 indicated that there was an uncorrectable failure of the primary data store, a test is made 1517 whether the alternate data store was successfully updated. If so, return is made to the requestor indicating a successful write completed. If not, return is made to the requestor with an error indication that the write was not made. This same error return is made if the test at 1512 indicated an uncorrectable failure of the primary data store.

If the test at 1510 indicated that the alternate lock was not stolen, a test is made 1518 whether the alternate lock block need resetting. If so, 1519, the indication of this need is reset, and, 1520, write lock block processing is invoked to write zero to the alternate data store lock block. Next, (or if a NO indication to the test at 1518 was received) UNLOCK processing is invoked 1521 to transfer control to unlock to complete the WRITE SERIALIZED request. UNLOCK processing is described in more detail in FIG. 17. If the test at 1515 indicated that the lock was stolen from this request, write lock block processing is invoked 1522 to write zero to the alternate lock block. Next, 1523, a test for an uncorrectable failure of the primary data store is made. If such a failure occurred, return is made to the requestor indicating an error situation and that the write was not made. If there was not such failure, READ SERIALIZED processing is invoked 1524 to reobtain the resource and duplex the user changes. READ SERIALIZED processing is described in more detail in FIG. 10. Processing then continues with the test at 1501, as described previously. A yes answer to the test at 1509, or 1514, also results in the invocation of UNLOCK processing as indicated for 1521.

WRITE DATA

FIG. 16 illustrates the control flow for WRITE DATA processing. At 1601, a channel program is built to write the resource to the primary or alternate data store (the first part of the channel program verifies that this system's lock block still contains the key value provided by the caller. An "equal" compare means that the lock is still owned, and the channel program can still continue). At 1602, the channel program is started and its completion is awaited. A test is then made, 1603, whether the data was successfully written. If so, return is made to the caller. If not, a test is made 1604 whether the lock had been stolen. If so, the "lock stolen" indicator in the lock request element (2513) is set 1605, and return is made to the caller. If the lock was not stolen, a test is made 1606 whether there was a correctable permanent error. If not, permanent error processing is invoked 1607 to remove the nonusable primary or alternate data store. Permanent error processing is described in more detail in FIG. 9. If the error was correctable, a test is made whether the error was because of a lock block problem or a data write failure. If a data write failure, a channel program is built 1610 to reformat the track of the data store, and the channel program is started 1611 and its completion awaited. A test is then made 1612 whether the reformatting was successful. If so, return is made to the caller. If not, permanent error processing is invoked 1613 to remove the nonusable primary or alternate data store. If the test at 1608 indicated a lock block problem, fix lock block processing is invoked 1609 to repair the lock blocks, and return is made to the caller. Fix lock block processing is described in more detail at FIG. 12.

UNLOCK REQUEST

Figure 17:
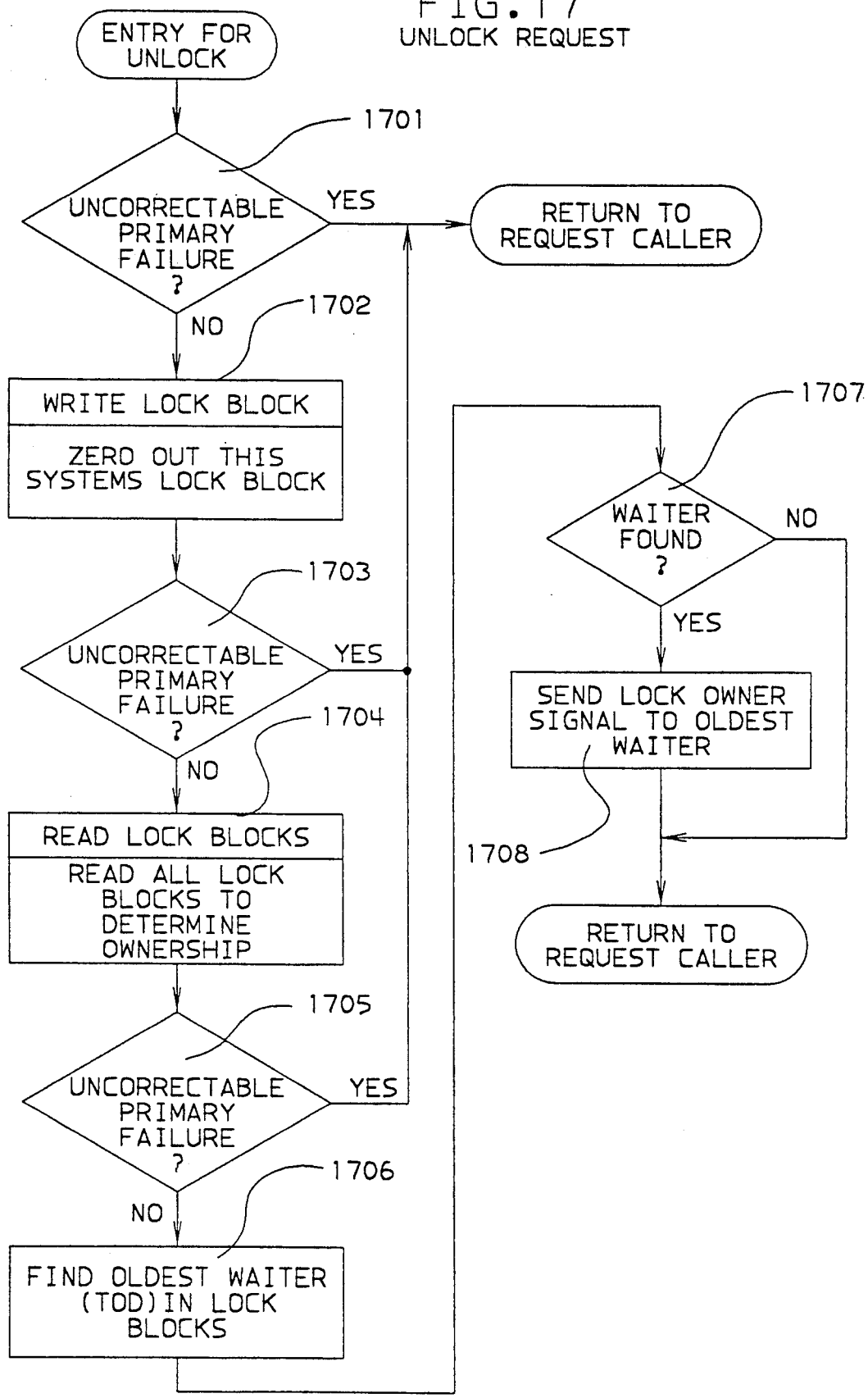
FIG. 17 is a flow diagram illustrating control flow for UNLOCK request processing.

FIG. 17 illustrates the control flow for UNLOCK request processing. At 1701 a test is made if there was an uncorrectable failure of the primary data store. If so, return is made to the request caller. If not, write lock block processing is invoked 1702 to zero out this system's lock block on the primary data store. This indicates that the resource is no longer needed by this system. Write lock block processing is illustrated in more detail in FIG. 13. Next, a test is made 1703 for an uncorrectable failure of the primary data store. If such a failure occurred, return is made to the request caller. If not, read lock block processing is invoked 1704 to read all lock blocks from the primary data store and thus determine resource ownership. Read lock block processing is described in more detail in FIG. 11. Next, 1705, a test is again made for an uncorrectable failure of the primary data store. If so, return is made to the request caller. If not, 1706, the oldest waiter (oldest TOD) is found among the lock blocks. Then, 1707, a test is made whether such a waiter was found. If not, return is made to the request caller. If so, a lock owner signal is sent to this oldest waiter 1708, including his request TOD (obtained from his lock block) and the ID of the data store (the data set name and volume serial).

LOCK STEAL Processing

Figure 18A:
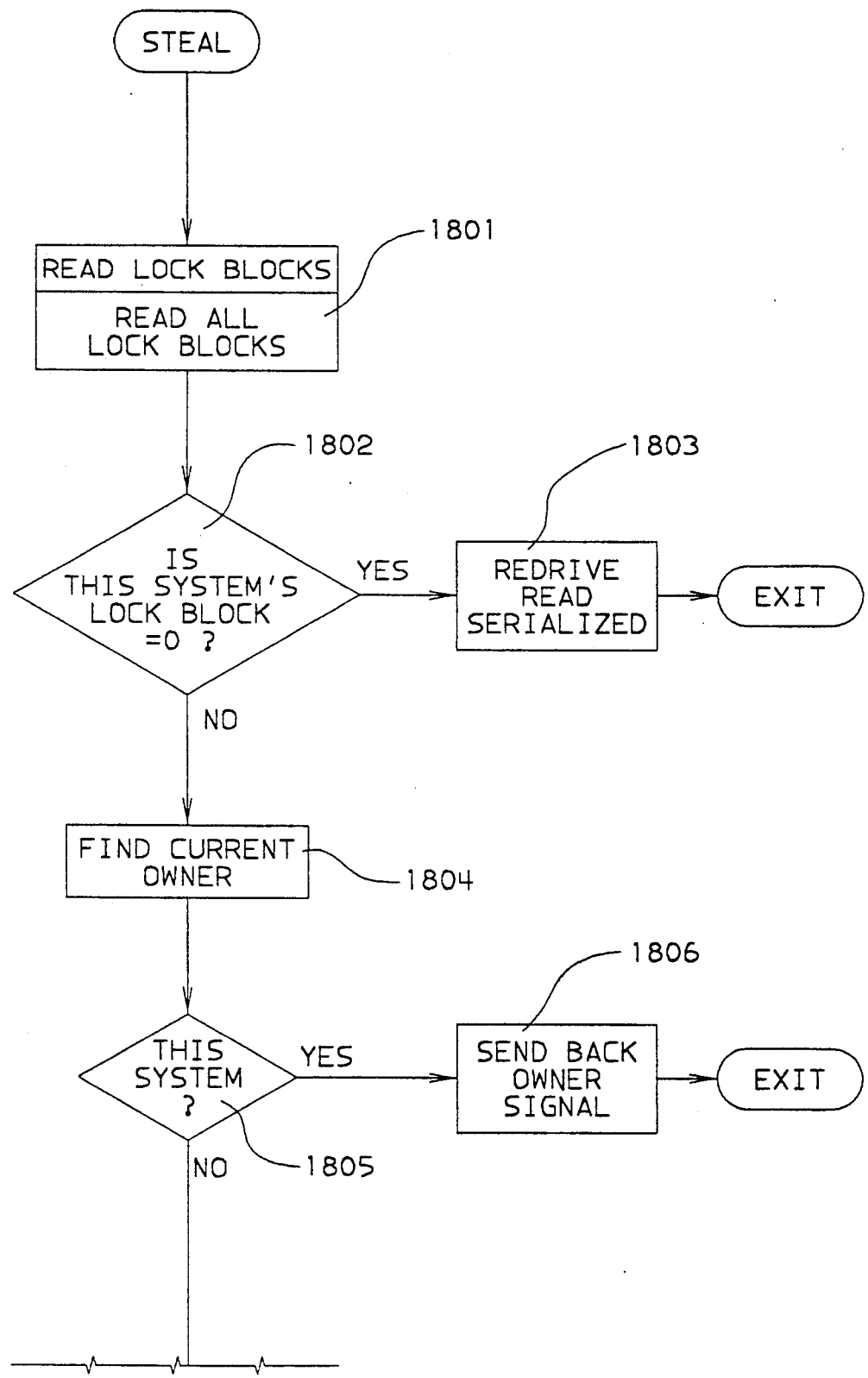
Figure 27:
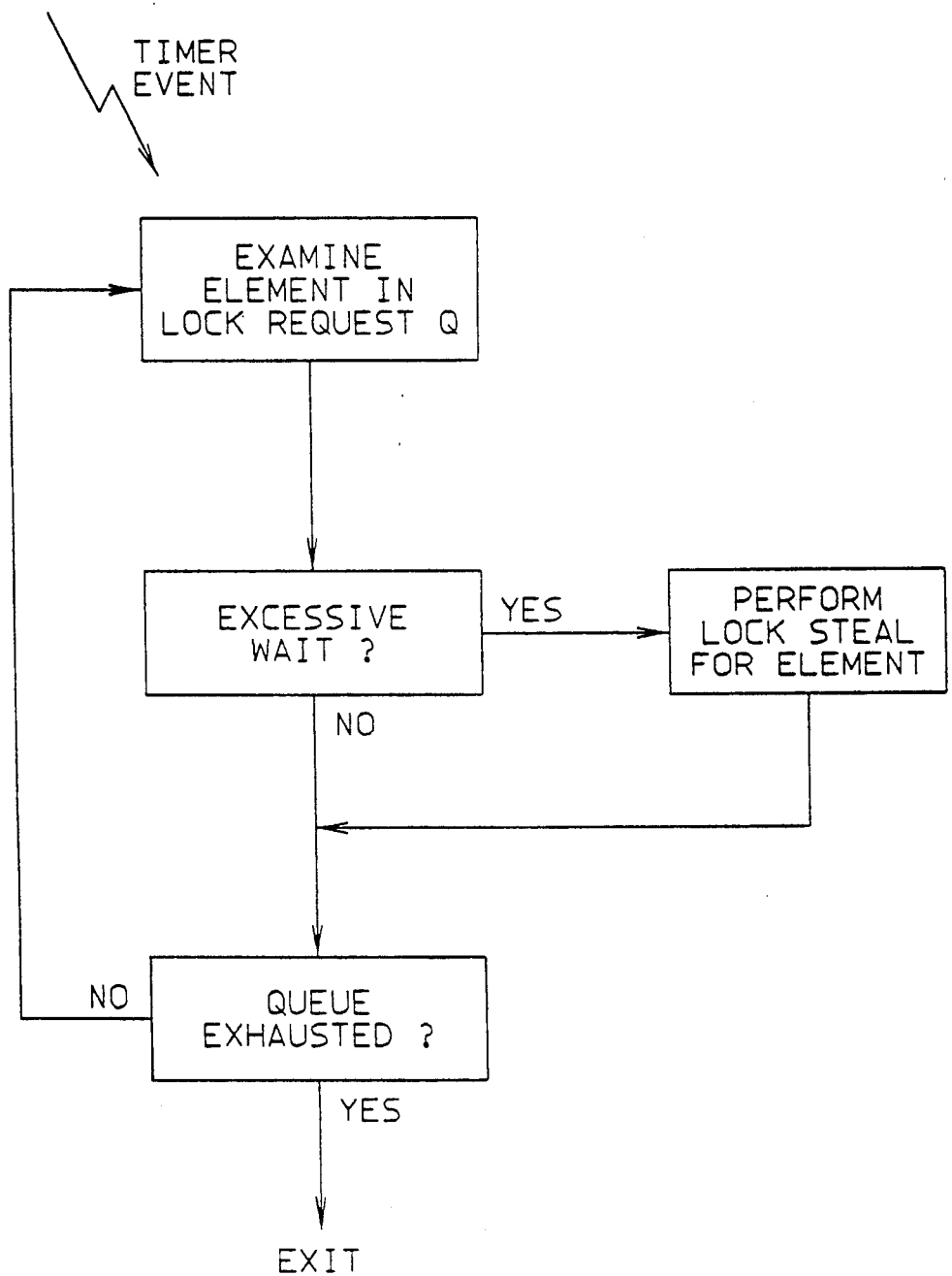
FIG. 27 is a flow diagram showing control flow for detecting that lock steal processing is required for a lock request element.

FIG. 18 illustrates the control flow for LOCK steal processing. Lock steal processing is initiated as the result of timer driven processing (see FIG. 27) that examines all the lock request elements for this system to determine those that have been waiting for a resource an excessive amount of time. (The frequency of invocation and definition of "excessive" must not be too short to unnecessarily steal, nor too long that failing systems impede performance of systems that are functional. In the preferred embodiment, the invocation interval is 6 seconds, and the "excessive" definition is 12 seconds.) At 1801, read lock block processing is invoked to read all lock blocks from the primary data store. Read lock block processing is described in more detail in FIG. 11. At 1802, a test is made whether the current systems lock block is equal to zero. (This could happen, for example, in the following case: System A obtains the lock for resource X; subsequently, System B attempts to access X, sees System A's lock block set, and waits for a lock owner signal—then is stopped for some reason; System C attempts to access X, sees A and B's lock block set, and waits for a lock owner signal; System A then releases X (lock block TOD now zero), and stops for some reason before sending a lock owner signal to B; System C then runs lock steal and, seeing B as "owner" (oldest nonzero TOD), steals the lock from B (B's TOD is now zero). Finally, B is restarted, and lock steal runs—since B has waited a long time—and finds its TOD zero!) If so, READ SERIALIZED is redriven from the beginning, and the routine is exited. If not, the current owner is found 1804. (Oldest TOD from lock blocks.) A test is then made 1805 whether the current owner is this system. If so, a lock owner signal is sent to this system 1806, and the routine is exited. If not, a test is made whether the owner is the same as the last time 1807. (Previous owner was saved at 1808 in 2514.) If the owner is different from the last time, the current owner information is saved 1808 in the request element (2514), and the routine is exited. If the same owner, a test is made whether an alternate date store exists. If so, WRITE lock block processing is invoked 1810 to WRITE the current owner's request TOD obtained from the primary data store, to the current owner's lock block on the alternate data store. Then WRITE lock block processing is invoked 1811 to write a zero TOD to the current owner's lock block on the primary data store. The new owner is then found 1812 (by finding the oldest request TOD from the primary lock blocks), and a lock owner is signal is sent to the new owner 1813. The routine is then exited.

New Alternate Processing

FIG. 26 illustrates the control flow for New Alternate Processing. New Alternate Processing is required when a new alternate data store is to be initialized and placed into service. The processing is initiated with an operator command, or because of a signal from another system within a system complex which itself has received an operator command. At 2601 a test is made whether this processing request is the initial request signal. If so, 2602, a further test is made whether the operator request came from the system operator of this particular system. If so, 2603, an indication is set that this system is responsible for synchronizing the new alternate data store. (Synchronized means that the alternate data store is a duplicate of the primary data store.) If the request was not from this system, 2604, the system must stop using the current alternate data store because the system which received the operator command would have already removed the current alternate data store from service. A test is then made, 2605, whether the new alternate data store is usable. (That is, is it possible to locate the volume and data set for the new alternate indicated in the operator command.) If not, 2606, a test is made whether the request came from this system. If not, an "alternate failed" signal is sent to all other participating systems, and the routine is exited. If the request did come from this system, the routine is simply exited. The test at 2605 indicated that the new alternate is usable, a test is made 2608 whether the request came from this system. If so, 2609, the system must stop using the current alternate. Then, 2610, the system starts using the new alternate, and marks it as not synchronized (indicating that it is not yet ready to be used as a primary data store). The synchronized indicator is illustrated in FIG. 25 at 2506. Then, 2611, a test is made whether the request came from this system. If not, an "alternate accepted" signal is sent 2612, and a timer is set 2613. The purpose of setting a timer is to insure that the system does not have to wait for an unreasonable amount of time for another system to synchronize the alternate data store. If the test at 2611 indicated that the request did come from this system, a test is made 2614 whether this system is the only system using the data store. (This may be determined by the global control information in the primary data store. See FIG. 3 at 302.) If this is the only system using the data store, synchronized alternate processing is invoked 2615 to synchronize the alternate data store with the primary data store, and the routine is exited. If other systems are using the data store, 2616, an initial request signal is sent to all other systems. Then a timer is set 2617, and the routine is exited.

Figure 26A:
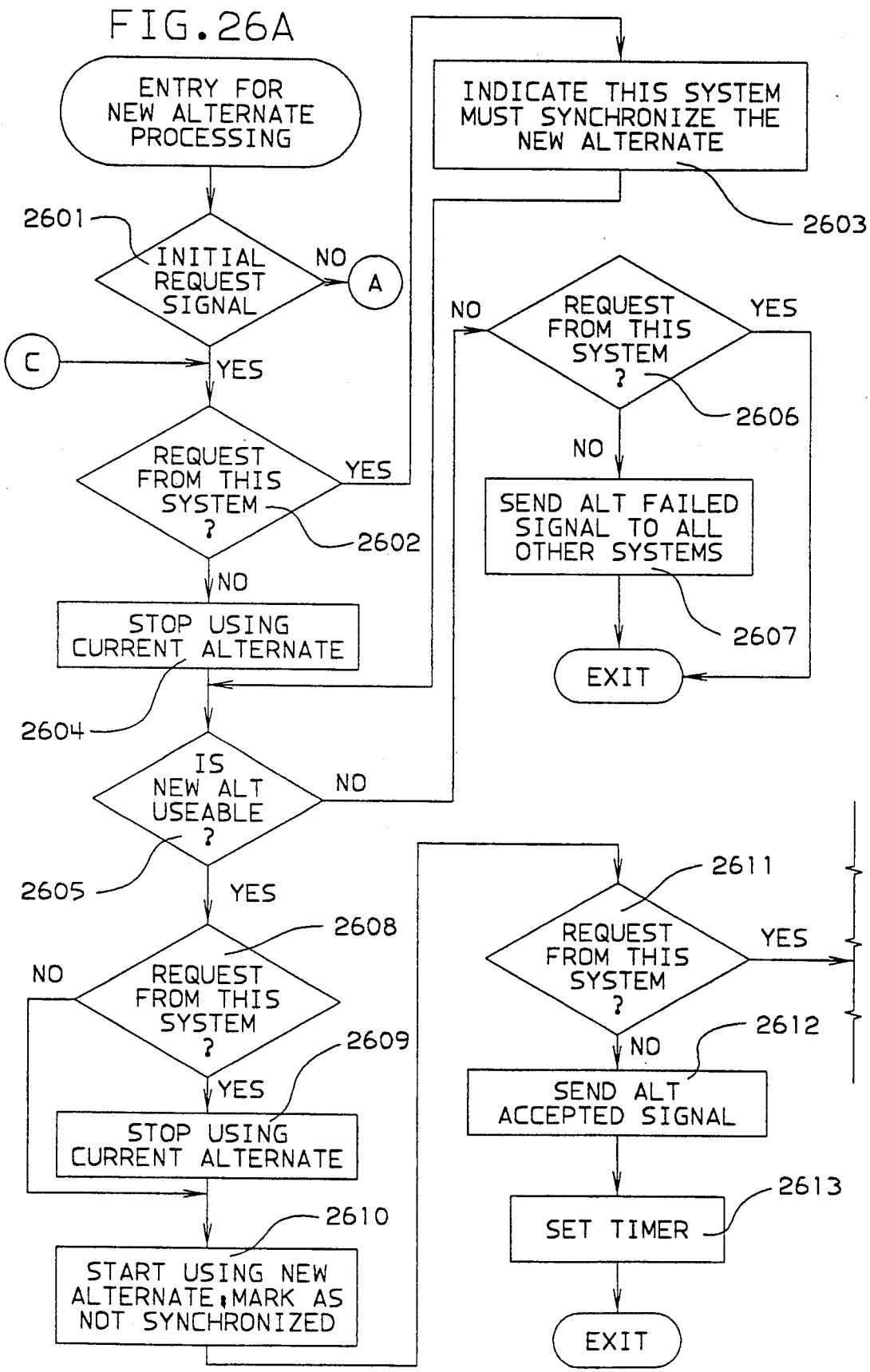
FIGS. 26A, 26B, 26C, 26D, and 26E are flow diagrams showing control flow for "New Alternate" processing.
Figure 26B:
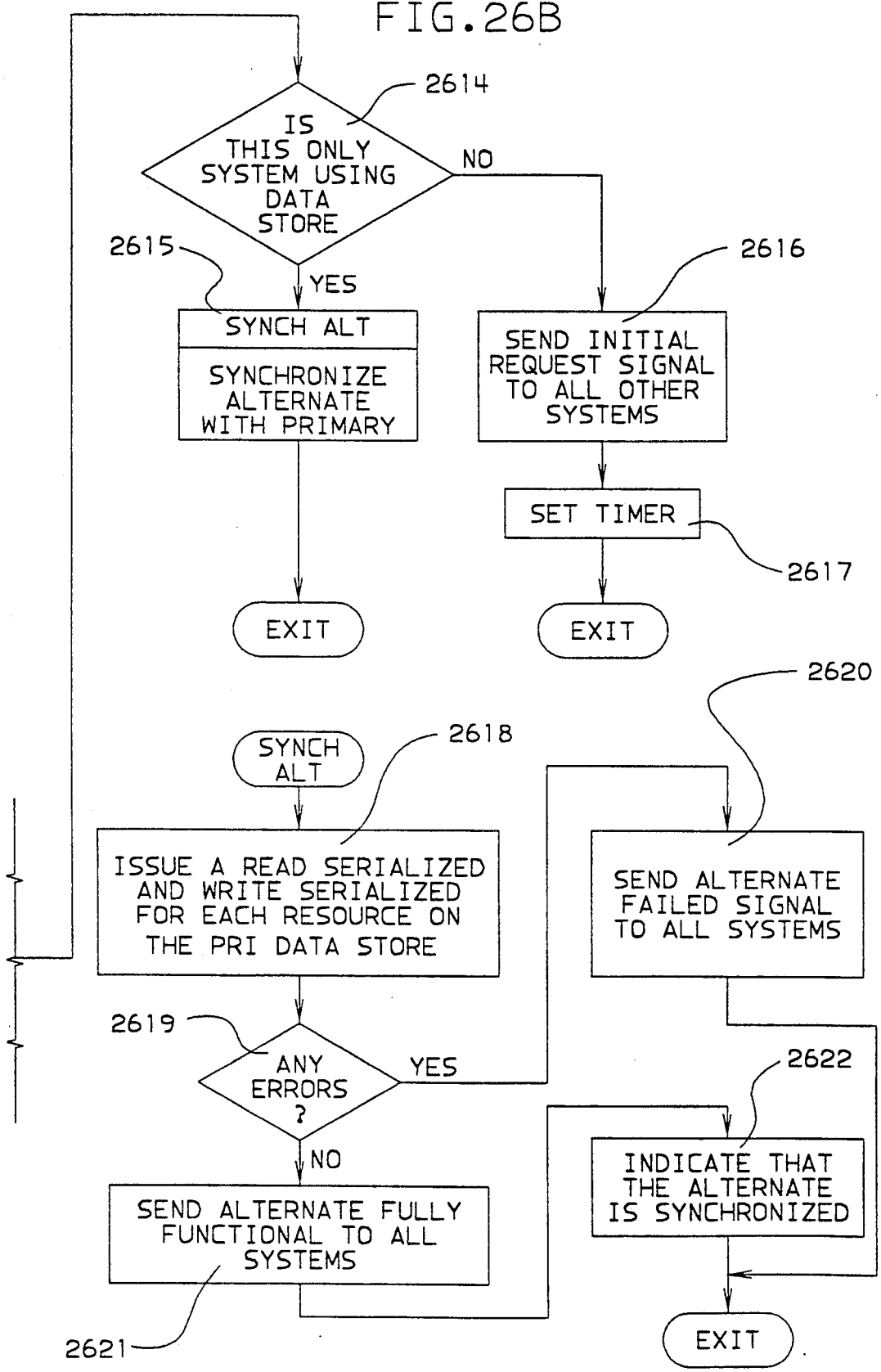
Figure 26C:
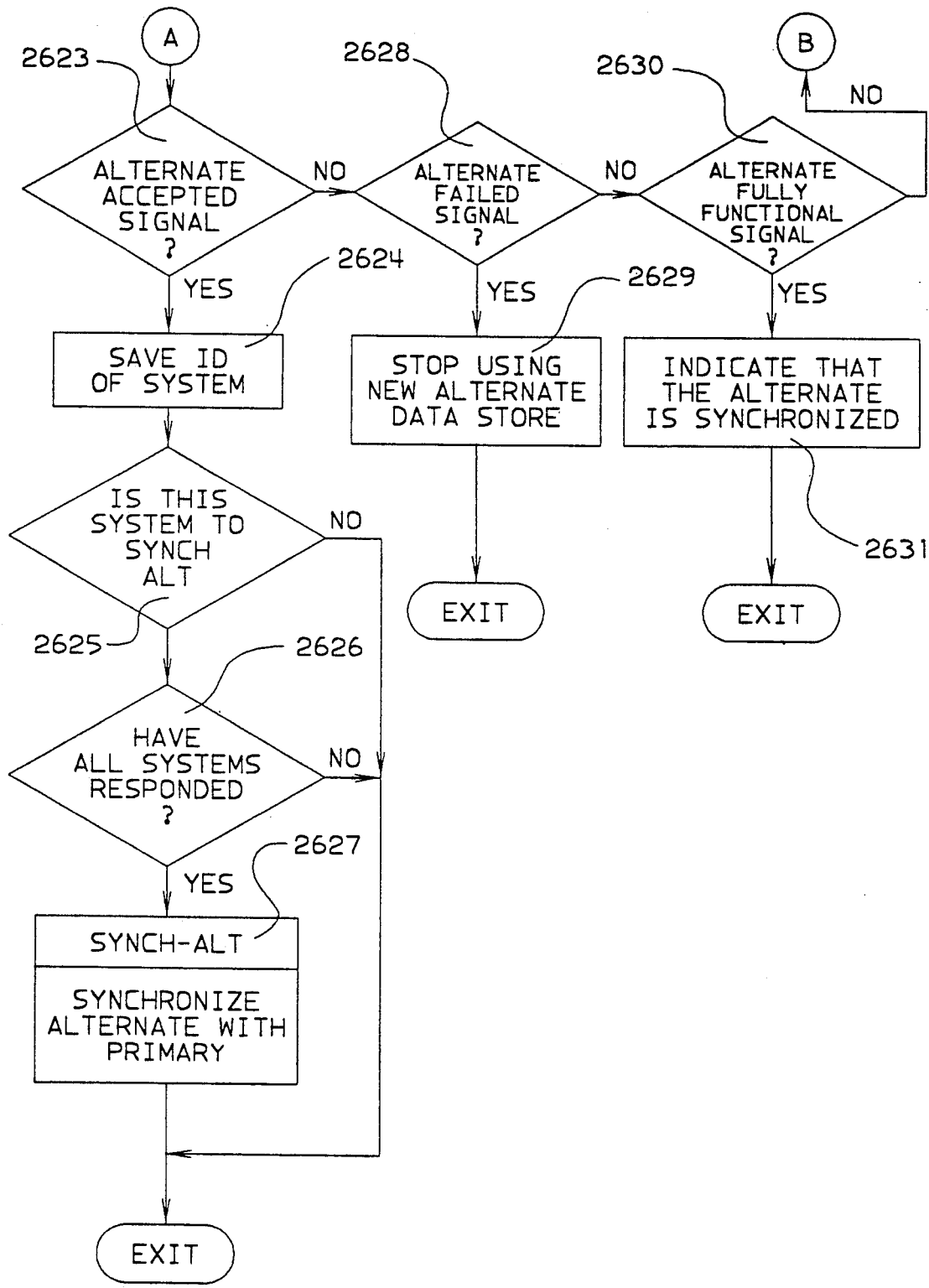
Figure 26D:
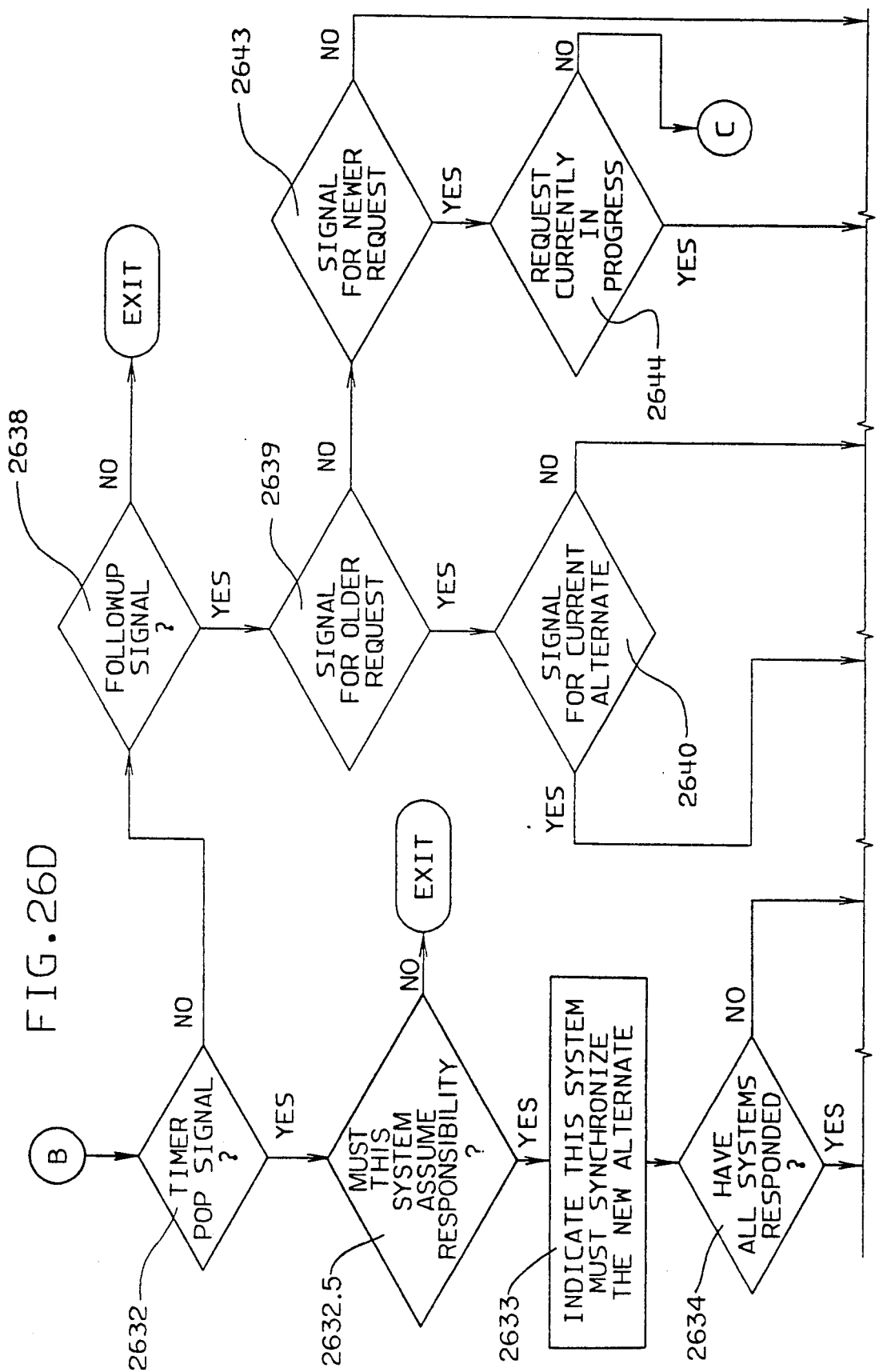
Figure 26E:
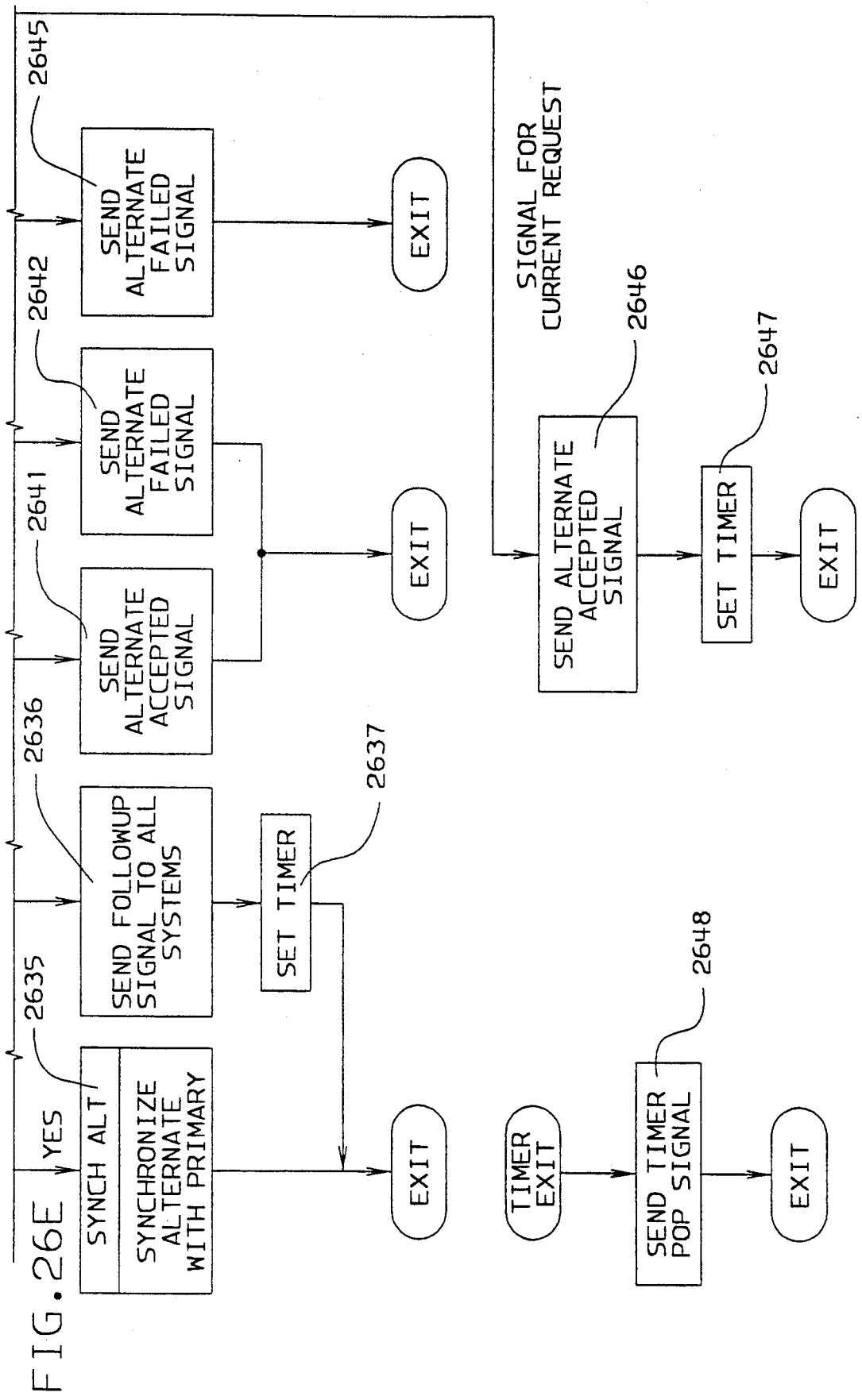

Synchronize alternate processing is illustrated at the lower portion of FIG. 26B. First, 2618, a READ SERIALIZED and a WRITE SERIALIZED are issued for each resource on the primary data store. (The global control information (FIG. 3 at 302) indicates what resources are involved.) A test is then made 2619 whether any errors occurred in the reading or writing. If errors did occur, 2620, an "alternate failed" signal is sent to each other participating system, and the routine is exited. If there were no errors, 2621, an "alternate functional" system is sent to each other participating system. The synchronized indicator is then set, 2622 (see FIG. 25 at 2506), and the routine is exited.

If the test at 2601 indicated that this was not the initial request for new alternate processing, a test is made 2623 whether the signal received was an "alternate accepted" signal. If so, the identifier of the system sending the signal is saved 2624, and a test is made 2625 whether the current system is the system which must synchronize the alternate data store. (Recall that the system with this responsibility was identified and saved at 2603.) If the current system is not the system which must do the synchronization, the routine is exited. If the current system is the system which must synchronize, a test is made whether all participating systems have yet responded 2626. If not, the routine is exited. If so, 2627, synchronize alternate processing is invoked to synchronize the alternate data store with the primary data store. If the test at 2623 indicated that this was not an "alternate accepted" signal, a test is made 2628 whether it was an "alternate failed" signal. If so, the new alternate data store is removed from use by this system 2629, and the routine is exited. If it was not an "alternate failed" signal, a test is made 2630 whether is was an "alternate functional" signal. If so, the alternate synchronized indicator is set 2631 (see FIG. 25 at 2506), and the routine is exited. If it was not an alternate functional signal, a test is made 2632 whether it was a timer expiration signal. If so, a test is made at 2632.5 to determine if this system must assume responsibility for synchronizing the alternate data store. This system will assume responsibility if the system currently responsible is no longer active (the global control information, FIG. 3 at 302, contains an array of systems using the data store and indicates if the system is active). If this system is not to assume responsibility to synchronize the new alternate, this routine exits. If it is to assume responsibility, this is indicated at 2633. Next, 2634, a test is made whether all systems have responded. (Note that the global control information, FIG. 3 at 302, indicates all participating systems.) An asynchronous task may monitor the condition of all participating systems, to determine whether any one of them is taken out of service—for example, by having each participating system update a "heartbeat" field in a commonly accessible data field at regular intervals. The lack of such a heartbeat would mean that the asynchronous task must update the global control information to remove this system from the list of participating systems.

If all participating systems have responded, 2635, synchronize alternate processing is invoked to synchronize the alternate data store with the primary data store, and the routine is exited. If all system have not yet responded, 2636, follow-up signals are sent to all participating system, and a timer is set 2637. (In this embodiment, the timer value is set to expire after 20 seconds.) If the test at 2632 did not indicate a timer pop signal, a test is made 2638 whether this signal was a follow-up signal. (As indicated, for example, at 2636.) If not, the routine is exited. If it was a follow-up signal, 2639, a test is made whether the signal is a signal with a TOD older than the current request. If so, a test is made 2640 whether the signal was for the current alternate data store. If so, an "alternate accepted" signal is sent, 2641, and the routine is exited. If it was not for the current alternate, an "alternated failed" signal is sent, 2642, and the routine is exited. If the test at 2639 indicated that the signal was not for an older request, a test is made 2643 whether the TOD for this signal is for a newer than the current request. If so, 2644, a test is made whether the request is currently in progress. (Indicated by an internal status indicator.) If so, 2645, an "alternate failed" signal is sent to fail this request (this could occur, for example, because two systems must be trying to bring up different alternate data stores), and the routine is exited. If the request is not currently in progress, this indicates that the current system lost the initial request signal, and "new alternate" processing is reinstituted at 2602. If the test at 2643 did not indicate a newer request, this means that the signal must be for the current request. In this case, an "alternate accepted" signal is sent 2646, the timer is set, and the routine is exited. The reason for sending the "alternate accepted" signal is that it is possible that the previously sent signal may have been lost.

The expiration of a timer simply requires the sending of a timer pop signal 2648.

EXAMPLES

The present invention is most readily understood in the context of examples of its use in multi-system environments:

READ/WRITE SERIALIZED Example

Figure 20:
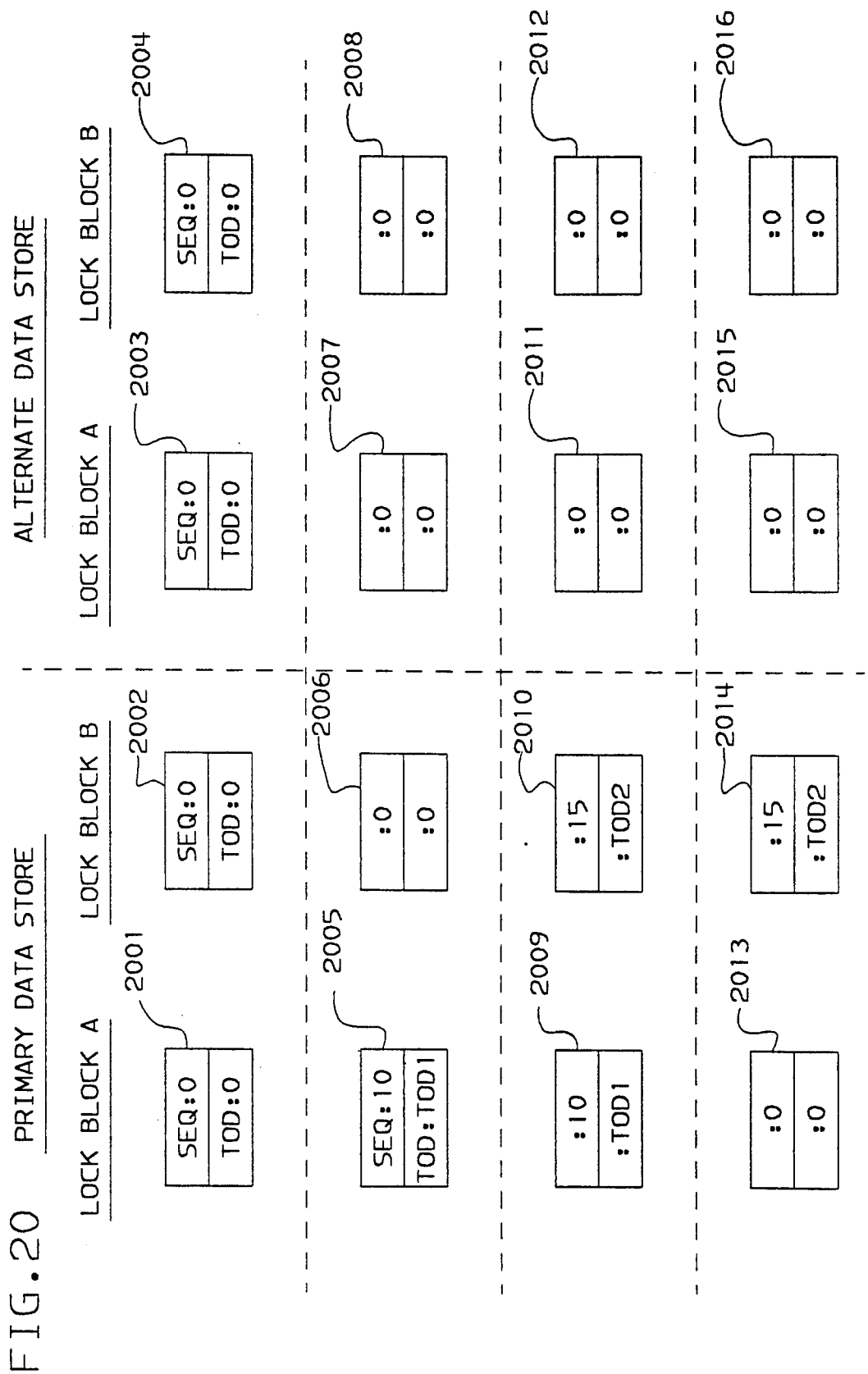
FIG. 20 is a table showing the lock block state changes for the example of FIG. 19.

FIG. 19 is an example of READ/WRITE SERIALIZED processing from multiple systems for the same resource. It shows control flow on each of two systems designated as System A and System B. At 1901 a user issues a request to READ SERIALIZED resource X. FIG. 20 at 2001, 2002, 2003 and 2004 show the state of the lock blocks at the beginning of this READ SERIALIZED request. All lock block fields are initially zero. In response to the user request, System A's lock block for resource X is written at 1902. FIG. 20 at 2005 shows the contents of the lock block for System A after this step is complete. The sequence number 10 has been inserted into the block to designate System A, and the time-of-day value for this request, TOD1, is now entered into the time-of-day field. The other lock blocks associated with resource X, 2006, 2007 and 2008, are unchanged. Next, all lock blocks for resource X are read 1903. Since, as noted, all lock blocks except those associated with System A are zero, by lock rule 1 System A owns resource X 1904. Next, 1905, the data for resource X is read into storage. Then return is made to the READ SERIALIZED requestor, 1906, with an indication that resource X has been successfully read.

Now, 1907, a user from System B issues a request to READ SERIALIZED resource X. A System B lock block for resource X is written to the primary data store 1908. FIG. 20 at 2010 shows the contents of this lock block. The sequence number 15 is associated with System B, and the time-of-day, TOD2, is the time of day value associated with the request to write System B's lock block. All other lock blocks on the primary and alternate data store, 2009, 2011, and 2012, are unchanged. System B next reads all lock blocks for resource X, 1909. Applying lock rule 2, 1910, System B must wait for resource X, since all the nonzero lock block values are older than System B's lock block value. That is, TOD1, 2009, is older than TOD2, 2010. System B now waits 1911 for an indication that System B is now the owner of resource X. During this period of waiting, requests for other resources or records will not be delayed.

Next, 1912, the System A user issues a request to WRITE SERIALIZED resource X. After a check that the resource is still owned by System A, 1913, the updated user data for resource X is written to the primary data store. Since lock block A 2009 still contains a sequence number of 10 and a TOD value of TOD1, the resource is still owned, and the data update is successful. Next, 1914, the updated user data for resource X is written to the alternate data store, checking that the resource is still owned by System A. Ownership implies that lock block A must contain a sequence number of zero, and a TOD value of 0. Since this is the case, FIG. 20 at 2011, the resource is still owned, and the data update is successful. Next, 1915, System A's lock block for resource X is written to the primary data store to unlock resource X. That is, lock block A is set to all zeroes, FIG. 20 at 2013. Next, all lock blocks for resource X are read 1916. This allows System A to find the next owner 1917. The next owner is the system associated with the oldest time-of-day field. In the example, this is the system whose sequence is 15, FIG. 20 at 2014, i.e., System B. System A now informs System B that it is the owner. Finally, 1918, System A returns to be WRITE SERIALIZED requestor, indicating that the resource has been written. System B, having been notified by System A that it is now the owner of resource X, reads the data for resource X 1919. Having done this, System B returns to be READ SERIALIZED requestor, indicating that the resource X has been read, 1920.

Lock Steal Processing Example 1

FIG. 21 illustrates an example of lock steal processing where the lock is stolen before the system successfully writes data to the primary data store. The example illustrates control flow on three interrelated systems, designated as System A, System B, and System C.

At 2101, a user issues a request to READ SERIALIZED resource X. FIG. 22 at 2201, 2202, 2203, 2204, 2205 and 2206 shows state of the lock blocks at the beginning of this READ SERIALIZED request. All lock block fields are initially zero. In response to the user request, System A's lock block for resource X is written at 2102. FIG. 22 at 2207 shows the content of the lock block for System A after this step is complete. The sequence number 10 has been inserted into the block to designate System A, and the time-of-day value for this request, TOD1, is now entered into the time-of-day field. The other lock blocks associated with resource X, 2208, 2209, 2210, 2211 and 2212, are unchanged. Next, all lock blocks for resource X are read 2103. Since, as noted, all lock blocks except those associated with System A are zero, by lock rule 1 System A owns resource X 2104. Next, 2105, the data for resource X is read into storage. Then return is made to the READ SERIALIZED requestor, 2106, with an indication that resource X has been successfully read. Now, 2107, a user from System B issues a request to READ SERIALIZED resource X. At a slightly earlier time, 2108, a user from System C issues a request to READ SERIALIZED resource X. System C writes its lock block for resource X to the primary data store. This lock block is illustrated in FIG. 22 at 2215. System B's lock block for resource X is also written to the primary data store, FIG. 21 at 2110. FIG. 22 at 2220 illustrates the content of this lock block. System C then reads all lock blocks for resource X, FIG. 21 at 2111, and System B reads all lock blocks for resource X, 2112. System B discovers that all the nonzero lock block values are older than its lock block value. That is, it notes that TOD1 (FIG. 22 at 2219), and TOD2 (2221) are older than TOD3 (2220). Applying lock rule 2, System B must wait for resource X, until it receives a signal that it is the owner of this resource. During this time, requests for other resources or records will not be delayed. Meanwhile, 2114, System C discovers that at least one system has a younger TOD than its TOD (TOD3 (FIG. 22 at 2220) is younger than TOD2 (2221))

so that, applying lock rule 3, the ownership state of the resource X is indeterminate. System C then updates its lock block with a new TOD value for resource X, FIG. 21 at 2115. FIG. 22 at 2227 shows the new state of this lock block, with TOD4 the new TOD value. System C next reads all lock blocks for resource X, FIG. 21 at 2116. System C then searches 2117 for the system with the oldest TOD among the lock blocks and determines that this is System A (TOD1 (FIG. 22 at 2225) is the oldest of the three TODs at this point). System C signals this ownership to System A. System A receives this ownership signal at 2118, but, already knowing that it is the owner of resource X, it ignores this signal.

For an unrelated reason, System A is now placed into stop mode by the system operator, FIG. 21 at 2120. This will eventually cause all waiting systems, System C and System B, to note that they have been waiting for resource X for an excessive amount of time. At 2121, System C detects that it has been waiting for resource X for an excessive amount of time, so it reads all lock blocks for resource X to determine the current owner. Similarly, 2122, System B detects that it has waited an excessive amount of time for resource X, so it reads all lock blocks for this resource to determine the current owner. At 2123, and 2124, System C and System B determine that System A is the owner of resource X, (System A has the oldest TOD) and then continue to wait. Once again, at 2125, System C detects that it has waited for resource X an excessive amount of time, so reads all lock blocks for this resource to determine the current owner. Determining that System A is the current owner, (System A has the oldest TOD) and noting that System A was recorded as the owner the last time this system checked for excessive wait, System C initiates a steal of the lock for resource X from System A 2126. To accomplish this steal, 2127, the sequence number and TOD read from resource X from the primary data store that was associated with System A, FIG. 22 at 2225, is now written by System C to the alternate data store's lock block for resource X for System A. FIG. 22 at 2234 illustrates this lock block's value in the alternate data store. Note that the primary data store's lock blocks, 2231, 2232 and 2233 are unchanged, as are the alternate data store lock blocks for Systems B and C, 2235 and 2236. Next, zero values are written to the primary data store's lock block for resource X for System A, by System C (FIG. 21 at 2128). This new primary data store lock block associated with System A is illustrated in FIG. 22 at 2237.

Next, System B detects that it has waited an excessive amount of time for resource X, and so reads all lock blocks for this resource to determine the current owner, FIG. 21 at 2129. System B determines that it is the owner of resource X (it has the oldest TOD read from the lock blocks) but was not the owner the last time that System B checked for excessive wait. Recognizing that it has somehow become the owner, it signals itself of this ownership (FIG. 21 at 2130). Meanwhile, 2131, System C reads all lock blocks for resource X. System C then determines which system should be the next owner of resource X, FIG. 21 at 2132. This next owner will be System B (oldest TOD). System C signals System B indicating that it (System B) is now the owner of resource X. At 2133, a signal is received by System B indicating that it (System B) is now the owner of resource X (System B receives a "lock owner" signal— see FIG. 14) at 2135 the second lock owner signal is received by System B for resource X which, knowing already that it is the owner, discards this signal. (That is, lock owner signal processing is exited without causing READ SERIALIZED to be invoked at the lock owner's signal entry.) At 2134, System A's operator restarts the system, having accomplished whatever tasks it was stopped for. At 2136, System B, the new owner of resource X, reads the data that it wishes in for resource X. It then returns to the READ SERIALIZED requestor, indicating that resource X has been successfully read (2138). At 2137, a System A user issues a request to WRITE SERIALIZED resource X. The updated System A user data for resource X is attempted to be written to the primary data store, checking its lock block to ensure that resource X is still owned by System A, 2139. Since the value of its lock block is no longer set to its sequence number 10—rather, it has been zeroed out as explained previousl—see FIG. 22 at 2237, System A determines that it no longer owns resource X, so the WRITE SERIALIZED request is not successful (FIG. 21 at 2140), and return is made to the WRITE SERIALIZED requestor indicating that resource X has not successfully been written.

Lock Steal Processing Example 2

FIG. 23 illustrates an example of lock steal processing with a lock is stolen after the system successfully writes data to the primary data store but before the WRITE to the alternate data store.

At 2301, a user issues a request to READ SERIALIZED resource X. FIG. 24 at 2401, 2402, 2403, and 2404, shows the state of the lock blocks at the beginning of this READ SERIALIZED request. All lock block fields are initially zero. In response to the user request, System A's lock block for resource X is written at 2302. FIG. 24 at 2405 shows the content of the lock block for System A after this step is complete. The sequence number 10 has been inserted into the block to designate System A, and the time-of-day value for this request, TOD1, is now entered into the time-of-day field. The other lock block associated with resource X, 2406, 2407, and 2408 are unchanged. Next, all lock blocks for resource X are read 2303. Since, as noted, all lock blocks except those associated with System A are zero, by lock rule 1 System A owns resource X 2304. Next, 2305, the data for resource X is read into storage. Then return is made to the READ SERIALIZED requestor, 2306, with an indication that resource X has been successfully read. Now, 2307, a user from System B issues a request to READ SERIALIZED resource X. System B's lock block for resource X is written to the primary data store, FIG. 23 at 2308. FIG. 24 at 2410 illustrates the content of this lock block. System B next reads all lock blocks for resource X, FIG. 23 at 2309. System B discovers that all the nonzero lock block values are older than its lock block value. That is, it notes that TOD1 (FIG. 24 at 2409), is older than TOD2 (2410). Applying lock rule 2, System B must wait for resource X, until it receives a signal that it is the owner of this resource. During this time, requests for other resources or records will not be delayed.

For an unrelated reason, System A is now placed into stop mode by the system operator, FIG. 23 at 2311. This will eventually cause all waiting systems (in this case System B) to note that they have been waiting for resource X for an excessive amount of time (see the explanation for FIG. 18—Lock Steal Processing). At 2312, System B detects that it has been waiting for resource X for an excessive amount of time, so it reads all lock blocks for resource X to determine the current owner. At 2313, System B determines that System A is the owner of resource X (oldest TOD) and then continues to wait. Once again, at 2314, System B detects that it has waited for resource X an excessive amount of time, so reads all lock blocks for this resource to determine the current owner. Determining that System A is the current owner, 315, (oldest TOD) and noting that System A was recorded as the owner the last time this system check for excessive wait, System B initiates a steal of the lock for resource X from System A. To accomplish this steal, 2316, the sequence number and TOD read from resource X from the primary data store that was associated with System A, FIG. 24 at 2409, is now written by System B to the alternate data store's lock block for resource X for System A. FIG. 24 at 2415 illustrates this lock block's value in the alternate data store. Note that the primary data store's lock blocks, 2413 and 2414, are unchanged, as is the alternate data store lock block for System B 2416.

At 2317, System A's operator restarts the system, having accomplished whatever tasks it was stopped for. At 2318, a System A user issues a request to WRITE SERIALIZED resource X. The updated System A user data for resource X is written to the primary data store, checking its lock block to ensure that resource X is still owned by System A, 2319. Note that System B has not yet zeroed out System A's lock block for resource X, so that System A believes that it still owns resource X. Now, 2320, System B writes a zero to the primary data store's lock block for resource X for System A. FIG. 24 at 2417 depicts this new lock block. Then, 2321, System B reads all lock blocks for resource X. Now, 2322, System A attempts to write the updated user data for resource X to the alternate data store, checking that the resource is still owned by System A (see description of FIG. 16, WRITE DATA—for the verification performed by the channel program). This write however is unsuccessful, 2323, because the lock is no longer owned by System A.

Although the update of resource X to the alternate data store was not successful, the updated data has been written to the primary data store previously, at 2319. This updated data has been exposed to other users of this resource. Therefore, it would not be correct to inform the System A user that the write was unsuccessful. Rather, it will be necessary to insure that the data is duplexed, 2323. In order to do this, it is first necessary to determine 2324 whether the lock was stolen from the request currently being processed on this system, or from a previous request on this system. This system's lock block is read in for resource X and the alternate lock block is cleared (see FIG. 15 starting at 1511). Meanwhile, at 2325, the owner of resource X is being determined on System B (oldest TOD). System B is determined to be the owner, and is signalled indicating that it is the owner of resource X. At 2326, System B receives its own signal that it is the owner of resource X. On System A, 2327, READ SERIALIZED is invoked internally as a first step toward backing up the user change on the alternate data store. At 2328, System B reads data in for resource X. At 2329, as a first step in the READ SERIALIZED processing invoked internally, System A's lock block for resource X is written to the primary data store. The contents of this lock block are illustrated in FIG. 24 at 2425, with TOD3 being the time-of-day of the present request. At 2330, return is made to the READ SERIALIZED requestor indicating that resource X has been successfully read by System B. At 2331, again, as part of the READ SERIALIZED process invoked internally at 2327, all lock blocks for resource X are read. Since all the nonzero lock block values are older than System A's lock block value, (TOD2 is older than TOD3), System A must wait for resource X by lock rule 2 (FIG. 23 at 2332). At 2333, the user on System B issues a request to WRITE SERIALIZED resource X. The updated user data for resource X is then written to the primary data store, checking that the resource is still owned by System B 2334 (see the description of the channel program verification in FIG. 16). Next, 2335, the updated user data for resource X is written to the alternate data store, checking that the resource is still owned by System B Next, 2336, System B's lock block for resource X is written to unlock resource X (FIG. 24 at 2430).

All lock blocks for resource X are read at 2337 and the next owner is determined 2338. A lock owner signal is sent to System A. Return is then made to the WRITE SERIALIZED requestor at 2339, indicating that resource X has been successfully written At 2340, System A receives a signal that it is now the owner of resource X. It then reads the data in for resource X. This data will consist of the changes it originally made, along with System B's changes. At 2341 return is made to the READ SERIALIZED requestor indicating that the resource has been successfully read. In this case, the requestor was WRITE SERIALIZED processing, since it was an internal READ SERIALIZED request. At 2342, the (just read) data for resource X is written to the primary data store, checking that the resource is still owned by System A. Then, 2343, the data for resource X is written to the alternate data store, again checking that the resource is still owned by this system (channel program verification—see FIG. 16). System A's lock block is then written to the primary data store as all zeroes to unlock resource X 2344. FIG. 24 illustrates this at 2433. All lock blocks for resource X are then read at 2345, and the next owned is determined 2346. Note that no lock owner signal is sent since no one is waiting for resource X at this time. Return is then made to the WRITE SERIALIZED requestor with an indication that resource X has been successfully written 2347. Both the primary and alternate data store now contain the combination of System A and System B's changes.

Although the foregoing description and the system illustrated in the drawings are considered to illustrate the preferred embodiment of the invention, various changes and modifications will occur to one skilled in the art without departing from the scope of the invention.

What is claimed is:

1. In a multi-system central electronic complex (CEC) comprising systems each having main storage, system resources, an operating system for managing said system resources, and shared data residing on external module, a method for controlling access to said shared data comprising the steps of:
   A) placing a shared resource element of said shared data into a primary data store on the external media;
   B) associating with said shared resource element access control information on said primary data store, said access control information comprising lock blocks, each of the lock blocks being uniquely associated with one of the systems;
   C) in response to a first Read Serialized access request by a first process on a first system, granting to said first process, by means of an exclusive access control method utilizing said access control information on said primary data store, exclusive access to the shared resource element in said primary data store and reading said shared resource element into the main storage;
   D) modifying, by said first process, said shared resource element in the main storage;
   E) in response to a second Read Serialized across request for the shared resource element by a second process on a second system, said exclusive access control method recognizing ownership of said shared resource element by said first system, and recording said second Real Serialized access request in said access control information;
   F) determining, by an excessive wait detection method that the wait by said second process for the shared resource element has been excessive and passing exclusive control of the resource to said second system by a lock-stealing method, said lock-stealing method comprising the step of modifying said access control information on said primary data store to reflect said lock stealing;
   G) in response to a Write Serialized access request for the shared resource element by the first process, to write back said source element as modified, said exclusive access control method recognizing said modifying of said access control information on said primary data store, and rejecting said Write Serialized access request.

2. The method of claim 1, further comprising the step of constructing a substantially similar copy of the primary data store in an alternate data store, the alternate data store also having access control information comprising lock blocks.

3. The method for controlling access of claim 2 in which said exclusive access control method comprises the steps of:
   A) generating a lock key associated with said first system;
   B) writing said lock key to one of the lock blocks associated with said shared resource element, and associated with said first system, on the primary data store;
   C) reading all lock blocks associated with said resource from the primary data store;
   D) using said lock blocks to resolve ownership of said resource.

4. The method of claim 3 in which said step of using said lock blocks comprises the steps of:
   A) identifying said first system as owner of said shared resource element of the primary data store if all lock blocks associated with said resource, except those also associated with said first system, are zero;
   B) identifying said first system as not owner of said shared resource element on the primary data store if at least one lock block associated with said shared resource element, but not associated with said first system, is nonzero, and each of said nonzero lock blocks has a time-of-day value older than that of said first system; and having said first system wait for notice of ownership of said shared resource element;
   C) if steps (A) and (B) do not apply, identifying an indeterminate ownership situation; generating, by said first system, a new time-of-day value; updating with said new time-of-day value all lock blocks associated with said shared resource element and with said first system; reading all lock blocks associated with said shared resource element; determining which of said read lock system associated with the one of said read lock blocks with the oldest time-of-day value that said second system is now owner of said shared resource element.

5. The method of claim 4 in which the lock-stealing method comprises the steps of:
   A) writing the lock block associated with the primary data store, associated with a former resource owner to the secondary data store;
   B) zeroing the lock block associated with the former resource owner in the primary data store;
   C) determining which waiting system has been waiting the longest for the resource, and signalling said waiting system that it has exclusive control of the shared resource element.

6. The method of claim 2 further comprising the steps of:
   A) determining that the primary data source has a defective record by comparing a check record with a suffix record associated with the defective record;
   B) performing local error correction on the primary data store using said alternate data store.

7. The method of claim 2 further comprising the steps of:
   A) determining that the primary data store is uncorrectably in error;
   B) substituting the alternate data store for said primary data store;
   C) dynamically creating a new alternate data store.

8. In a multi-system central electronic complex (CEC) comprising systems each having main storage, system resources, an operating system for managing said system resources, and shared data residing on external media, a serialization mechanism for controlling access to said shared data comprising:
   A) a primary data store comprising a shared resource element having shared data;
   B) within said primary data store, exclusive access means for a first system in said complex acquiring exclusive access to the shared resource element on the primary data store;
   C) a global control element within said primary data store;
   D) Read Serialized means for requesting and obtaining exclusive ownership of said shared resource element by a requesting process in said first system, comprising:
      i) update means for updating said exclusive access means with a record of said requesting;
      ii) notify means for notifying said requesting process of success or failure of said requesting;
   E) lock steal means for stealing exclusive ownership of said shared recourse element from said first system, said lock steal means comprising:
      i) detection means for determining that said first system is failed or temporarily stopped, and
      ii) preemption means for a second system preempting said first system and passing to a waiting system exclusive access to the resource of said shared data when said first system is failed or temporarily stopped, said preemption means updating said exclusive access means to indicate said stealing;
   F) Write Serialized means for writing back exclusively owned resources to said primary data store, comprising:
      i) verify means for checking said exclusive access means to determine whether said stealing has been indicated, and
      ii) notify means to notify said requesting process of a request rejected when said stealing has been indicated.

9. The multi-system CEC of claim 8 further comprising an alternate data store substantially similar to the primary data store.

10. The multi-system CED of claim 9 in which the exclusive access means comprises a lock block having a system-related lock key associated with each shared resource element on the primary data store, said lock key having a system sequence number field and a time-of-day value field, said fields associated with a particular system having zero values on the primary data store when the particular system does not require the shared resource element; and having nonzero values on the primary data store when the particular system acquires exclusive control of the shared resource element.

11. The multi-system CED of claim 8 in which the detection means comprises a timer-driven routine for comparing the waiting system's wait time against an "excessive wait" interval.

* * * * *